United States Patent
Niitani

(10) Patent No.: US 12,436,374 B2
(45) Date of Patent: Oct. 7, 2025

(54) MICROSCOPE, OBSERVATION METHOD, AND PROGRAM

(71) Applicant: NIKON CORPORATION, Tokyo (JP)

(72) Inventor: Yamato Niitani, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 11 days.

(21) Appl. No.: 18/371,512

(22) Filed: Sep. 22, 2023

(65) Prior Publication Data

US 2024/0019677 A1    Jan. 18, 2024

Related U.S. Application Data

(63) Continuation of application No. PCT/JP2022/012028, filed on Mar. 16, 2022.

(30) Foreign Application Priority Data

Mar. 25, 2021 (JP) .................................. 2021-051951

(51) Int. Cl.
  *G02B 21/00* (2006.01)
  *G01N 21/41* (2006.01)

(52) U.S. Cl.
  CPC .......... *G02B 21/008* (2013.01); *G01N 21/41* (2013.01); *G01N 2021/4173* (2013.01)

(58) Field of Classification Search
  CPC ...... G02B 21/008; G02B 21/06; G02B 21/36; G02B 21/6458; G02B 21/41
  See application file for complete search history.

(56) References Cited

U.S. PATENT DOCUMENTS 8,866,107 B2    10/2014 Cui
10,379,329 B2    8/2019 Ue
(Continued)

FOREIGN PATENT DOCUMENTS

JP    2015-219501 A    12/2015
WO    2020/108948 A1    6/2020

OTHER PUBLICATIONS

Jul. 2, 2024 Office Action issued in Japanese Patent Application No. 2023-509081.
(Continued)

*Primary Examiner* — Kathleen V Nguyen
(74) *Attorney, Agent, or Firm* — Oliff PLC

(57) ABSTRACT

A microscope includes light-transmitting-optical-system that irradiates specimen with illumination-light, light-receiving-optical-system that receives signal-light emitted from the specimen, phase-modulation-element that adds predetermined phase distribution to the illumination-light or the signal-light, phase-distribution-measuring-unit that measures first phase distribution, which corresponds to specimen-induced aberration at sampling point of the specimen, at each of a plurality of the sampling points, phase-distribution-calculation-unit that creates phase-data-model showing an amount of phase change which the illumination-light or the signal-light receives when the illumination-light or the signal-light passes through predetermined position in the specimen based on the plurality of first phase distributions, and calculates a second phase distribution which is added to the illumination-light or the signal-light in order to detect detection point of the specimen in a state in which specimen-induced aberration is reduced based on the phase-data-model, and phase-distribution-setting-unit that sets the second phase distribution to the phase-modulation-element.

15 Claims, 25 Drawing Sheets

(56) References Cited

U.S. PATENT DOCUMENTS

2017/0089837 A1    3/2017  Matsumoto et al.
2018/0143137 A1*   5/2018  Matsumoto .......... G02B 21/365
2022/0019067 A1    1/2022  Anhut et al.

OTHER PUBLICATIONS

Dec. 3, 2024 Office Action issued in Japanese Patent Application No. 2023-509081.
Jun. 7, 2022 International Search Report issued in International Patent Application No. PCT/JP2022/012028.
Jun. 7, 2022 Written Opinion issued in International Patent Application No. PCT/JP2022/012028.

* cited by examiner

MICROSCOPE, OBSERVATION METHOD, AND PROGRAM

CROSS-REFERENCE TO RELATED APPLICATION

Priority is claimed on Japanese Patent Application No. 2021-051951, filed on Mar. 25, 2021. The present application is a continuation application of International Application PCT/JP2022/012028, filed on Mar. 16, 2022. The contents of the above applications are incorporated herein.

BACKGROUND

Technical Field

The present invention relates to a microscope, an observation method, and a program.

When the inside of a biological specimen is observed with an optical microscope, aberration caused by distortion of a surface shape of the specimen or by 3-dimensional non-uniformity of a refractive index of the specimen occurs, and imaging performance is decreased. A method of correcting aberration caused by such an observed specimen using an aberration correction element (phase modulation element) such as a deformable mirror and obtaining a microscope image with a high image quality has been proposed (U.S. Pat. No. 8,866,107). In addition, a method of calculating spherical aberration correction amounts at different z positions using interpolation or function approximation based on spherical aberration correction amounts calculated at a plurality of z positions has been also proposed (U.S. Pat. No. 10,379,329).

SUMMARY

According to a first aspect, a microscope includes a light transmitting optical system configured to irradiate a specimen with illumination light from a light source; a light receiving optical system configured to receive signal light emitted from the specimen; a phase modulation element that is provided in at least one of the light transmitting optical system and the light receiving optical system and that is configured to add a predetermined phase distribution to the illumination light or the signal light; a phase distribution measuring unit configured to measure a first phase distribution, which corresponds to specimen-induced aberration at a sampling point of the specimen, at each of a plurality of the sampling points; a phase distribution calculation unit that is configured to create a phase data model showing an amount of phase change which the illumination light or the signal light receives when the illumination light or the signal light passes through a predetermined position in the specimen based on the first phase distributions measured at each of a plurality of sampling points, and that is configured to calculate a second phase, distribution which is added to at least one of the illumination light and the signal light by the phase modulation element in order to detect at least one detection point of the specimen in a state in which specimen-induced aberration is reduced based on the phase data model; and a phase distribution setting unit configured to set the second phase distribution to the phase modulation element.

According to a second aspect, an observation method is an observation method of irradiating a specimen with illumination light from a light source, detecting a signal light emitted from the specimen, and observing the specimen, the method including measuring a first phase distribution, which corresponds to specimen-induced aberration, at each of a plurality of sampling points of the specimen; creating a phase data model showing an amount of phase change which the illumination light or the signal light receives when the illumination light or the signal light passes through a predetermined position in the specimen based on the first phase distributions measured at each of the plurality of sampling points and calculating a second phase distribution which is added to at least one of the illumination light and the signal light in order to detect at least one detection point of the specimen in a state in which specimen-induced aberration is reduced based on the phase data model; and detecting the detection point by adding the second phase distribution to at least one of the illumination light and the signal light.

According to a third aspect, a program is a program that controls at least a part of a microscope system configured to observe a specimen, the program causing a processing device including a computer to execute reading position information of a plurality of sampling points of the specimen and information related to a first phase distribution corresponding to aberration signal light occurring in illumination light or signal light emitted from the specimen at each of the sampling points, and causing the processing device to create a phase data model showing a phase change amount which the illumination light or the signal light receives when the illumination light or the signal light passes through a predetermined position in the specimen based on the position information of the plurality of sampling points and the information related to the first phase distribution of the plurality of sampling points and to calculate a second phase distribution which is added to at least one of the illumination light and the signal light in order to detect at least one detection point of the specimen in a state in which specimen-induced aberration is reduced based on the phase data model.

BRIEF DESCRIPTION OF THE DRAWINGS

Microscope of First Embodiment

Figure 1:
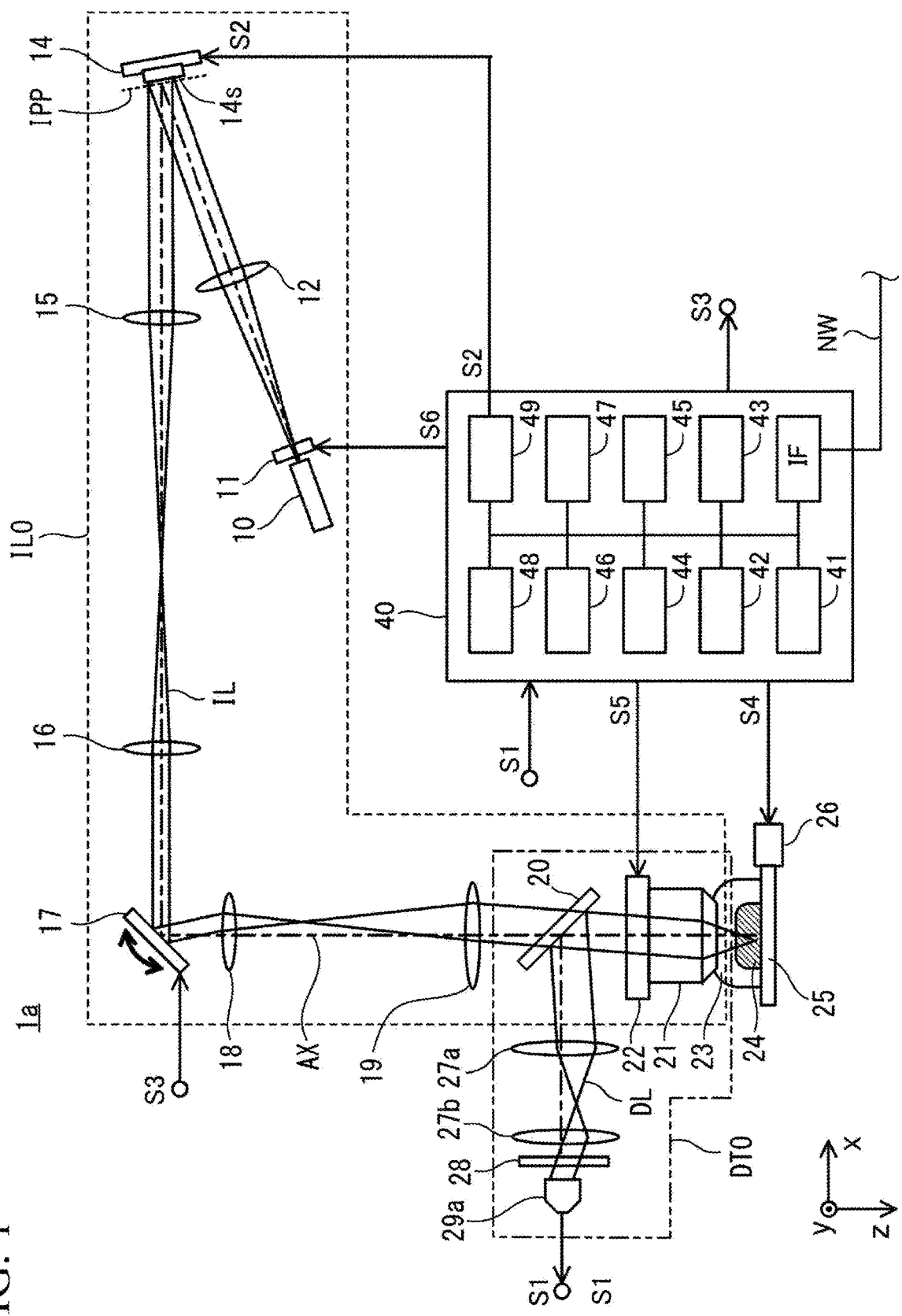
FIG. 1 is a view showing a configuration of a microscope of a first embodiment.

FIG. 1 is a view schematically showing a configuration of a microscope 1a of a first embodiment.

An X direction, a Y direction and a Z direction shown by arrows in FIG. 1 and each drawing referenced as below are directions perpendicular to each other, and the X direction, the Y direction and the Z direction indicate the same directions in each of the drawings. Hereinafter, the directions shown by the arrows are referred to as a +X direction, a +Y direction and a +Z direction, respectively. A +Z direction is a downward direction parallel to an optical axis AX of an objective lens 21. In addition, a position in the X direction is referred to as an X position, a position in the Y direction is referred to as a Y position, and a position in the Z direction is referred to as a Z position.

The microscope 1a includes a light transmitting optical system ILO (a region surrounded by a dotted line in FIG. 1), a light receiving optical system DTO (a region surrounded by a two-dot dashed line in FIG. 1), a controller 40, a stage 25 on which a specimen 24 is placed, and the like.

The light transmitting optical system ILO includes a collimator lens 12 disposed along an optical path of illumination light IL, a phase modulation element 14, relay lenses 15, 16 and 18, a dichroic mirror 20, a deflection mirror 17, a second objective lens 19, the objective lens 21, and the like.

The light receiving optical system DTO includes the objective lens 21, the dichroic mirror 20, relay lenses 27a and 27b, a detection filter 28, a detector 29a, and the like.

Among these, the objective lens 21 and the dichroic mirror 20 are included in both the light transmitting optical system ILO and the light receiving optical system DTO.

A light source 10 emits illumination light IL to illuminate the specimen 24. As the light source 10, for example, a laser light source or the like is used. In the light transmitting optical system ILO, a shutter 11 controls the illumination light IL radiated from the light source 10 to pass therethrough or be blocked, and the collimator lens 12 transforms the illumination light emitted from the light source 10 as substantially parallel light.

The light transmitting optical system ILO causes the specimen 24 to be irradiated with the illumination light IL from the light source 10.

The illumination light IL passing through the collimator lens 12 enters the phase modulation element 14. The phase modulation element 14 is a deformable mirror, a shape of which is changeable in a direction perpendicular to a reflecting surface 14s as an example, and modulates the phase distribution (advance or delay of the phase of the light) in a cross section of a light flux reflected by the phase modulation element 14.

The phase modulation element 14 may be a reflective liquid crystal spatial light modulator (SLM), and may be a so-called MEMS-SLM in which a plurality of micromirrors are disposed in the reflecting surface 14s and positions of the micromirror are changeable by a MEMS.

The reflecting surface 14s of the phase modulation element 14 is disposed to substantially coincide with a pupil surface IPP of the light transmitting optical system ILO.

Further, the phase modulation element 14 is not limited to the reflective element and, for example, may modulate a phase distribution in a cross section of the transmitted light flux like the transmissive liquid crystal SLM. In this case, a transmissive phase modulation member of the phase modulation element 14 may be disposed to substantially coincide with the pupil surface IPP of the light transmitting optical system ILO.

When the phase modulation element 14 has the reflecting surface 14s (or a transmitting region) divided into micro regions such as the micromirrors or the like, like the MEMS-SLM, the reflective liquid crystal SLM, or the transmissive liquid crystal SLM, which am above-mentioned, each of the micro regions is referred to as "a unit element" of the phase modulation element 14.

Hereinafter, a phase difference provided to the illumination light IL by each region (for example, the above-mentioned unit element) of the phase modulation element 14 is also referred to as "a phase value."

The illumination light IL reflected by the phase modulation element 14 passes through the two relay lenses 15 and 16 and is reflected by the deflection mirror 17. The deflection mirror 17 is a reflecting member held such that an azimuth angle of a reflecting surface of a galvanometer mirror or the like is changed, and a direction in which the illumination light IL reflected by the deflection mirror 17 advances is deflected by the change of the azimuth angle of the reflecting surface of the deflection mirror 17.

A resonant mirror may be used as the deflection mirror 17, and alternatively, instead of the deflection mirror 17, the illumination light IL may be deflected using a transmissive deflector such as an acoustic optical deflector (AOD) or the like.

The illumination light IL reflected by the deflection mirror 17 passes through the relay lens 18 and the second objective lens 19 and then passes through the dichroic mirror 20. The dichroic mirror 20 transmits the illumination light IL emitted from the light source 10, and reflects light with a predetermined wavelength region such as fluorescence or the like in signal light DL, generated in the specimen 24.

The objective lens 21 is disposed in the vicinity of the specimen 24 and faces the specimen 24. When the specimen 24 is observed, a space between the objective lens 21 and the specimen 24 may be filled with immersion liquid 23, and a space between the objective lens 21 and the specimen 24 may be filled with a gas such as air or the like. A cover glass (not shown) may be disposed between the specimen 24 and the immersion liquid 23. The illumination light IL emitted from the light source 10 is focused by the objective lens 21 and illuminates a specified position in the specimen 24.

The objective lens 21 is attached to a housing of the microscope 1a via an objective lens holding unit 22. The objective lens holding unit 22 includes a driving unit such as an electric motor or the like, and vertically moves the objective lens 21 in a z direction. When the objective lens 21 is moved in the z direction by the objective lens holding unit 22, a position of the objective lens 21 relative to the specimen 24 is changed, and a focal position of the objective lens 21 in the specimen 24 is changed in the z direction. By displacing the focal position of the objective lens 21 in the z direction using the objective lens holding unit 22, images of cross sections at different positions in the z direction in the specimen 24 can be acquired. Hereinafter, an image of the plurality of cross sections of the specimen 24 at different positions in the z direction is also referred to as "a z stack image" IZ.

Figure 4:
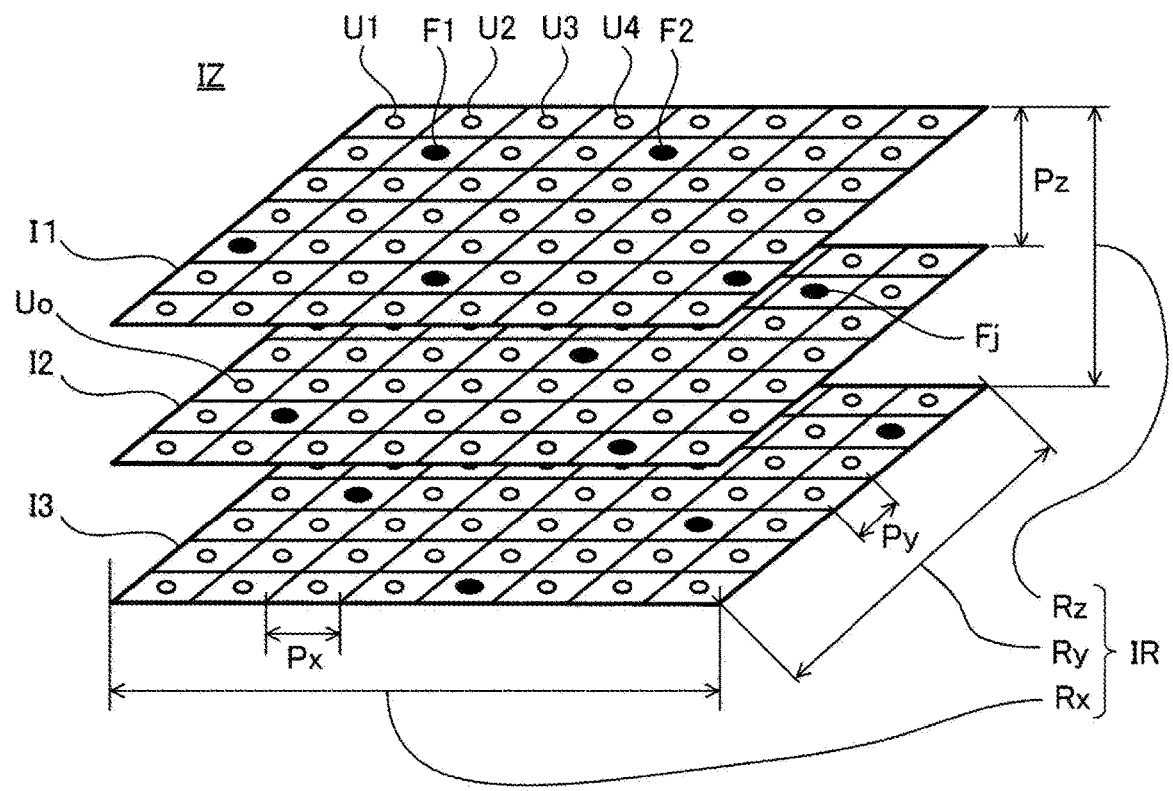
FIG. 4 is a view showing an example of a z stack image.

FIG. 4 is a view showing an example of the z stack image IZ of the specimen 24, 2-dimensional images I1, I2 and I3 are 2-dimensional images of an xy cross section at the different z positions of the specimen 24, respectively. The z stack image IZ includes the 2-dimensional images I1, I2 and I3 at the different z positions in the specimen 24. Further, the number of the 2-dimensional images I1 to I3 is not limited to three shown in FIG. 4 and may be an arbitrary number. Reference signs such as R1, F1, Px, Rx, and the like, shown in FIG. 4 will be described below.

The stage 25 supports the specimen 24 that is an observation target directly or via a specimen container (not shown) configured to accommodate and hold the specimen 24. A stage driving unit 26 is provided on the stage 25. The stage driving unit 26 includes an electric motor, a piezoelement, or the like, and moves the stage 25 in a surface perpendicular to a z axis (in an xy plane). By moving the stage 25 in the surface perpendicular to the z axis using the stage driving unit 26, an image of the specimen 24 in a wide range can be acquired. In addition, the stage driving unit 26 may also move the stage 25 in a z axis direction.

As an example of the specimen 24, for example, a biological specimen is provided. The biological specimen is a specimen with a thickness such as a cell, a biological tissue, or the like. Another example of the specimen 24, for example, is a bead that is a microsphere having a diameter of about 0.2 μm and formed of polystyrene. The specimen 24 may be stained with a fluorescence pigment. In addition, beads or metal particles that are stained with fluorescence may be introduced into the specimen 24.

The signal light DL is generated from a portion of the specimen 24 to which the illumination light IL is focused. The signal light DL is not limited to fluorescence and may be, for example, scattered light or reflected light. In addition, the signal light DL may be a signal showing a non-linear response to an intensity of the illumination light IL and may be, for example, fluorescence, a secondary higher harmonic wave, a tertiary higher harmonic wave, or the like, emitted as a result of multiphoton excitation of the specimen 24.

The signal light DL emitted from the specimen 24 enters the objective lens 21 and enters the dichroic mirror 20. Since the signal light DL has a wavelength different from the illumination light IL, the signal light DL is reflected by the dichroic mirror 20, passes through the two relay lenses 27a and 27b, and further passes through the detection filter 28. The detection filter 28 transmits light with a predetermined wavelength range (for example, fluorescence) among the light emitted from the specimen 24. The detection filter 28 blocks at least part of, for example, the illumination light IL, natural light, stray light, and the like, reflected by the specimen 24.

The signal light DL passed through the detection filter 28 is detected by the detector 29a, transformed into an electric signal, and sent to the controller 40 as a signal S1. The detector 29a includes for example, a photomultiplier tube, a photodiode, an avalanche photodiode, or the like.

Any one of the collimator lens 12, each of the relay lenses 15, 16, 18, 27a and 27b, and the second objective lens 19, and the objective lens 21 may be constituted by a plurality of lens, or may include a reflecting mirror.

The microscope 1a is not limited to an upright microscope shown in FIG. 1 and may be an inverted microscope. In the case of the inverted microscope, the specimen 24 may be supported by the stage 25 having an opening portion at a center thereof, and may face the objective lens 21 through the opening portion of the stage 25.

The controller 40 has a calculating device 41, a storage 42, an optical drive 43, an input unit 44, a display unit 45, a phase distribution measuring unit 46, a phase distribution calculation unit 47, an image generating unit 48, a phase distribution setting unit 49, and an interface part IF.

The calculating device 41 includes a CPU, and performs control of the microscope 1a including the controller 40 based on a program stored in the storage 42. The storage 42 includes a storage medium such as a memory element, a hard disk, or the like, and temporarily stores data such as a signal or the like detected by the detector 29a, in addition to the above-mentioned program. The interface part IF communicates data with a server or the like disposed outside the microscope 1a via a network line NW.

The controller 40 sends a signal S3 to the deflection mirror 17 to control an azimuth angle of a reflecting surface of the deflection mirror 17, sends a signal S5 to the stage driving unit 26 to control a position of the stage driving unit 26, and sends the signal S5 to the objective lens holding unit 22 to control a position of the objective lens 21. The controller 40 further sends a signal S6 to the shutter 11 to control opening and closing of the shutter 11.

The image generating unit 48 included in the controller 40 generates an image of the specimen 24 based on the signal S1 sent from the detector 29a. The phase distribution setting unit 49 sends a signal S2 to the phase modulation element 14, and controls modulation of the phase of the illumination light IL by the phase modulation element 14.

The input unit 44 is an input interface that can be operated by a user, and includes at least one of, for example, a mouse, a keyboard, a touch pad, a track ball, and the like. The input unit 44 detects an operation by a user, and outputs the detection result to the calculating device 41 as the data input by the user. The display unit 45 is, for example, a liquid crystal display or the like. The calculating device 41 displays an image of the specimen 24 generated by a graphical user interface (GUI) required for the operation of the microscope 1a and the image generating unit 48 on the display unit 45.

The phase distribution measuring unit 46 measures a phase distribution corresponding to the aberration induced by the specimen 24 based on the signal S1 sent from the detector 29a.

While being described below in detail, in the specification, the phase distribution corresponding to the aberration of the illumination light IL or the signal light DL induced by the specimen 24 is also referred to as a first phase distribution.

The phase distribution calculation unit 47 calculates the phase distribution that the phase modulation element 14 adds to the illumination light IL in order to detect from the specimen 24 in a state in which the aberration induced by the specimen 24 itself is reduced based on the first phase distribution measured by the phase distribution measuring unit 46.

In the specification, the phase distribution that the phase modulation element 14 adds to the illumination light IL in order to detect from the specimen 24 in a state in which the aberration induced by the specimen 24 itself is reduced is also referred to as "a second phase distribution."

Further, as shown in various forms described below, the phase distribution that the phase modulation element 14 adds to the signal light DL in order to detect in a state in which the aberration induced by the specimen 24 itself is reduced is also referred to as "a second phase distribution."

The phase distribution measuring unit 46 and the phase distribution calculation unit 47 will be described below in detail.

Figure 2A:
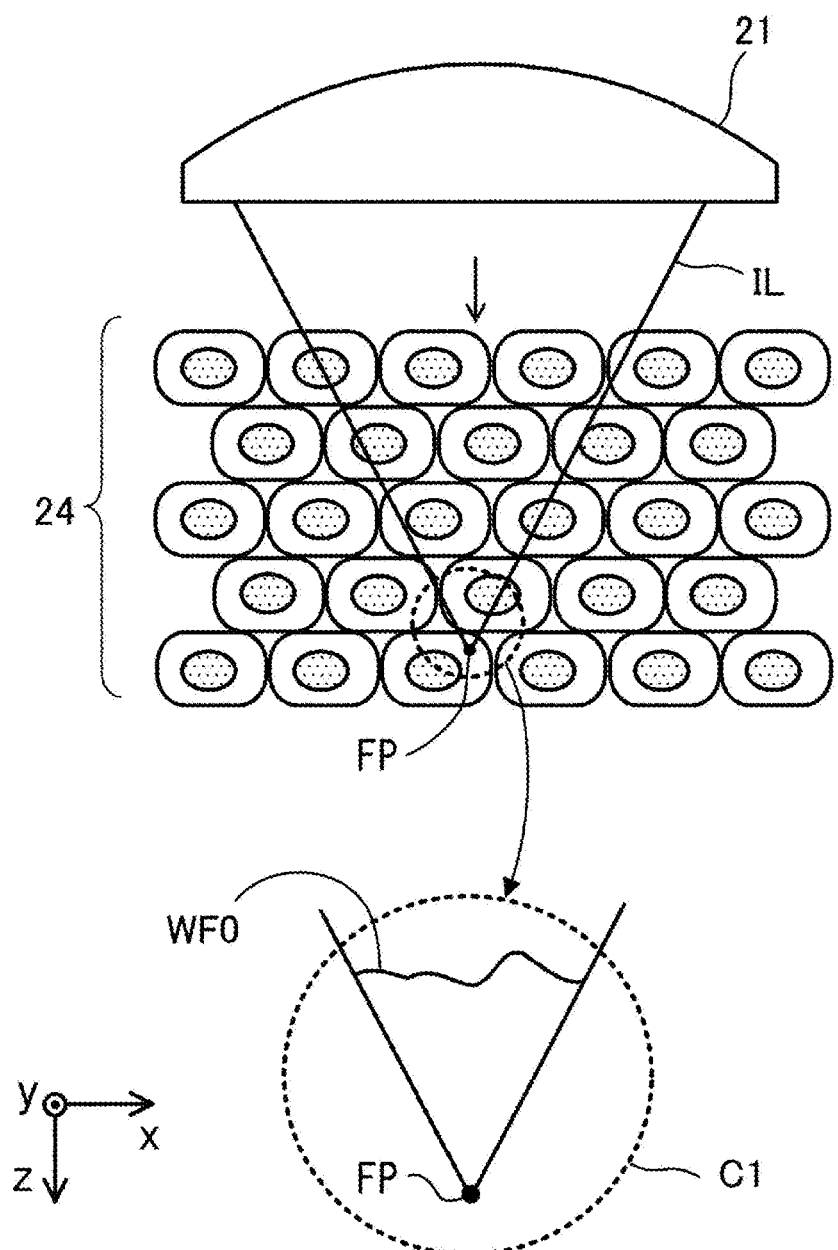
FIG. 2A is a view for describing specimen-induced aberration.
Figure 2B:
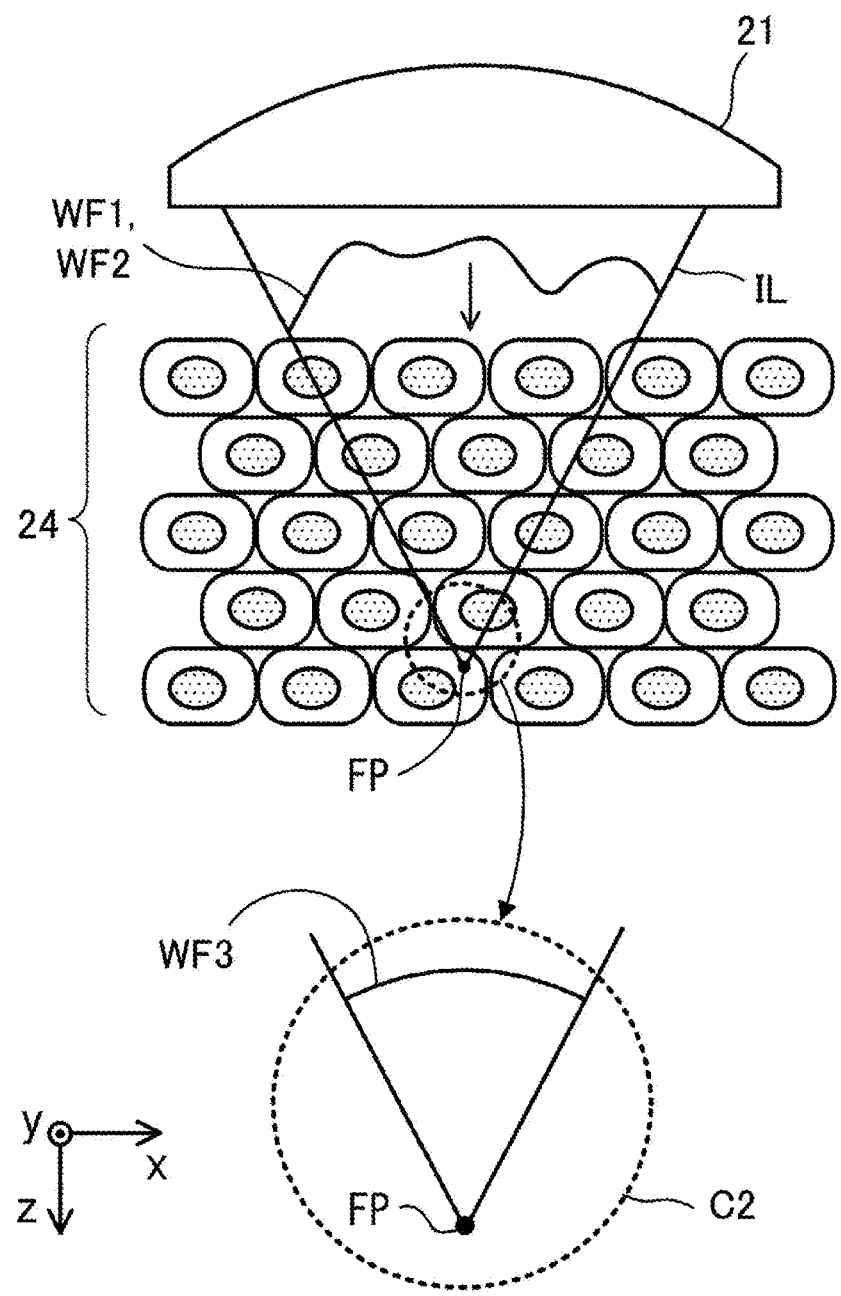
FIG. 2B is a view for describing specimen-induced aberration.

Here, the above-mentioned aberration induced by the specimen 24 will be described with reference to FIG. 2A and FIG. 2B. FIG. 2A and FIG. 2B are views for describing the aberration induced by the specimen 24, which are enlarged xz cross-sectional views showing the specimen 24 and the objective lens 21. The inside of a dotted circle C1 shown in FIG. 2A is an enlarged view showing the vicinity of a focusing point FP, and the inside of a dotted circle C2 shown in FIG. 2B is also the same as above.

When the specimen 24 is, for example, a biological specimen, refractive indices corresponding to areas in the specimen 24 may be different. Accordingly, as shown in FIG. 2A, a zeroth phase distribution WF0 that is an aberration caused by ununiformity of the refractive indices of the specimen 24 occurs in the illumination light IL that advances in the specimen 24 and arrives at the focusing point FP. Accordingly, it becomes difficult to focus the illumination light IL on the focusing point FP at the size of the theoretical resolution limit.

In the microscope 1a of the first embodiment, as shown in FIG. 2B, a first phase distribution WF1 that cancels the zeroth phase distribution WF0 due to the specimen 24 and reduces the aberration is measured. The first phase distribution WF1 is ideally a distribution with a sign (+−) inverted with respect to the zeroth phase distribution WF0. Since the first phase distribution WF1 is an aberration that cancels the zeroth phase distribution WF0 caused by the specimen 24, it can be said that it is equivalent to the aberration caused by the specimen 24.

Then, when observation of the specimen 24 is performed, the first phase distribution WF1 or a second phase distribution WF2 calculated based on the first phase distribution WF1 is added to the illumination light IL by the phase modulation element 14. Accordingly, the illumination light IL can be focused to the focusing point FP in a state in which the aberration induced by the specimen 24 is reduced (a phase distribution WF3), and resolution of the microscope 1a can be improved.

However, when measurement of the first phase distribution WF1 is performed at each of detection points U (U1, U2, U3, U4, ..., Uo, or the like, a subscript o is a sign showing the number of the detection points U) shown by a white circle in FIG. 4 of the specimen 24, it takes a long time to observe the specimen 24. In addition, the illumination light IL that irradiates the specimen 24 during the measurement of the first phase distribution WF1 may give the specimen 24 phototoxicity.

Accordingly, in the observation of the specimen 24 using the microscope 1a of the first embodiment, as shown in FIG. 4, for example, a predetermined number of sampling points F (F1, F2, ..., Fj, and the like) shown by black circles are selected from the inside of the specimen 24 based on the z stack image IZ of the specimen 24. Here, j is a subscript expressing the number of the sampling points F. Then, the first phase distributions WF1 corresponding to the aberration caused by the specimen 24 in the sampling points F are respectively measured.

Further, at least one of the plurality of sampling points F may be selected from the detection points U. That is, some of the individual of sampling points F may be the sampling points F or the detection points U.

Then, the second phase distribution WF2 to be added to the illumination light IL is calculated in order to detect the arbitrary detection point Uo in the specimen 24 in a state in which the aberration induced by the specimen 24 is reduced based on the first phase distribution WF1 in the sampling points F, which were measured. When the detection point Uo is detected, the second phase distribution WF2 appropriate for the calculated detection point Uo is added to the illumination light IL to illuminate the detection point Uo.

Accordingly, high resolution observation can be performed while reducing the observation time of the specimen 24 and decreasing phototoxicity to the specimen 24.

The measurement of the first phase distribution WF1 is performed by the phase distribution measuring unit 46 based on the signal S1 sent from the detector 29a. The calculation of the second phase distribution WF2 is performed by the phase distribution calculation unit 47 based on the first phase distribution WF1 that was measured. The phase distribution setting unit 49 sends the signal S2 to the phase modulation element 14, and the phase modulation element 14 is controlled to modulate the phase of the illumination light IL according to the second phase distribution WF2 that was calculated.

Further, FIG. 4 shows the z stack image IZ of the specimen 24 other than the specimen 24 itself. However, since the z stack image IZ corresponds one-to-one with the specimen 24 itself, in this specification, by specifying each point (F1, F2, ..., Fj, U1, U2, ..., Uo, or the like) shown in the z stack image IZ in FIG. 4, the corresponding points in the specimen 24 will be indicated respectively.

For example, while a cell or the like stained with fluorescence in advance is used as the specimen 24, it is not particularly limited to a material that emits fluorescence. In addition, when the material that emits fluorescence is used as the specimen 24, a wavelength that excites the fluorescent material included in the specimen 24 may be selected as a wavelength of the light source 10. A wavelength that multiphoton-excites the material contained in the specimen 24 may be selected as a wavelength of the light source 10.

Further, the light source 10 may be exchangeably (attachably or detachably) provided on the microscope 1a, or may be externally attached to the microscope 1a during observation or the like by the microscope 1a.

Further, the location of the focusing point FP is scanned relative to the specimen 24 by the deflection mirror 17 or moving of the stage 25 by the stage driving unit 26. Accordingly, at least one of the deflection mirror 17 and the stage 25 may be referred to as "a scanning unit."

Observation Method of First Embodiment

Hereinafter, a flow of an observation method using the microscope 1a of the above-mentioned first embodiment, a method of measuring the above-mentioned first phase distribution WF1, and a method of calculating the above-mentioned second phase distribution WF2 will be described.

Further, the following description is a description of the observation method as well as a description of the microscope 1a in the first embodiment.

Figure 3:
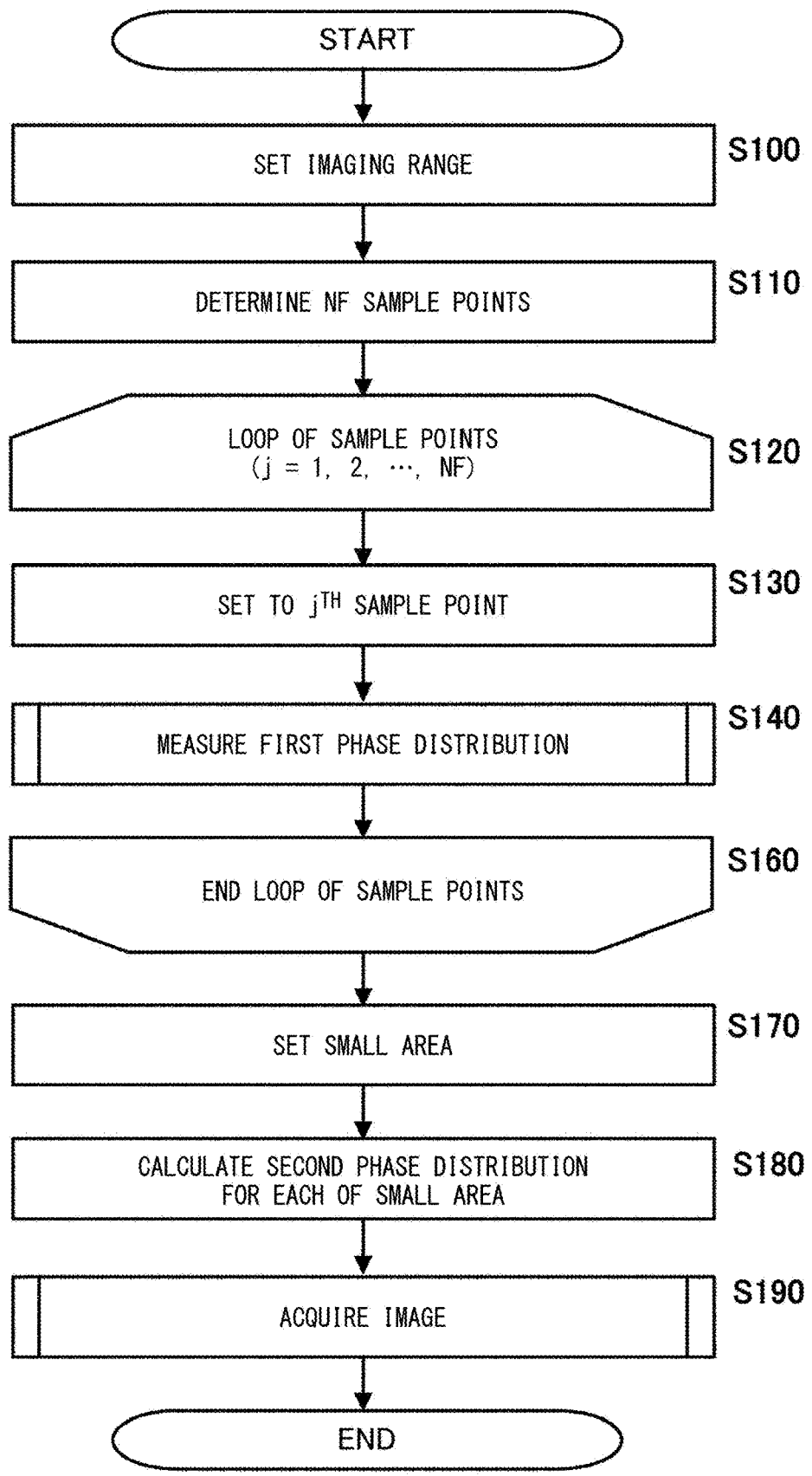
FIG. 3 is a view showing a flow in an observation method of the first embodiment.

FIG. 3 shows a flowchart when the controller 40 and the microscope 1a are controlled to execute the observation method of the first embodiment by executing a program stored in the storage 42 using the calculating device 41 of the controller 40.

However, in the description of the following steps, the description of a program and the calculating device 41, which is an execution body of the program, will be omitted as appropriate.

In step S100, the calculating device 41 of the controller 40 displays a screen of a GUI or the like that prompts to a user settings of a range Rx in the x direction, a range Ry in the y direction and a range Rz in the z direction (see FIG. 4 for all) of an imaging range IR, which are ranges of acquiring an image, on the display unit 45. When the user inputs a provisional imaging range to the input unit 44, the controller 40 sends the signal S6 to the shutter 11 to open the shutter 11, and sends a signal S4 to the stage driving unit 26 to move the stage 25 to a predetermined position according to the input provisional imaging range.

Then, the controller 40 causes the focusing point FP (see FIG. 6(b)) of the illumination light IL to be scanned in the x direction and the y direction in the specimen 24 by the deflection mirror 17, and holds the signal S1 detected by the detector 29a on the storage 42 according to the scanning. The calculating device 41 performs processing of aligning the detection signal held on the storage 42 in synchronization with 2-dimensional scanning by the deflection mirror, and generates, for example, the z stack image IZ shown in FIG. 4 as the image of the specimen 24 to display the image on the display unit 45.

The user inputs an instruction of moving the x position and the y position of the stage 25 and the position of the objective lens 21 or the stage 25 to the input unit 44 using the GUI while watching the image of the specimen 24 displayed on the display unit 45, and sets the desired imaging range IR.

For example, the range of the imaging range IR in the x direction and the y direction is set by a pixel number of the image, and the range Rx in the x direction and the range Ry in the y direction may be specified by specifying scan pitches (Px and Py in FIG. 4), which are pitches of the pixels of the image. In addition, regarding the z direction, for example, the range Rz in the z direction can be specified by inputting an acquisition number of images I1 to I3 of the plurality of xy cross sections at mutually different positions in the z direction and by inputting a distance Pz in the z direction mutually between the images I1 to I3 of the plurality of cross sections, which constitute the z stack image IZ to be acquired.

Further, the method of specifying the imaging range IR is not limited to the above, and for example, may be specified by the lengths in the x direction, the y direction, and the z direction of the rectangular area in which the image is acquired.

In step S110, NF sampling points F where the first phase distribution WF1 (see FIG. 2A) corresponding to the aberration induced by the specimen 24 is measured are determined from the specimen 24. For example, the calculating device 41 may display the entire image of the imaging range IR of the specimen 24 on the display unit 45, and the user may specify the sampling points F through the input unit 44.

Specifically, a command from the user to initiate determination of the sampling points F is input to the input unit 44, the controller 40 controls the deflection mirror 17 according to a numerical value input as the imaging range IR at a predetermined position of the stage 25 and a predetermined position of the objective lens 21. Then, the image of the specimen 24 in the imaging range IR is acquired and displayed on the display unit 45. The image displayed on the display unit 45 may be the z stack image IZ shown in FIG. 4 as an example.

The user specifies the sampling points F using the GUI while seeing the image displayed on the display unit 45. For example, a mouse cursor may be moved to places set as the sampling points F (F1, F2, Fj, and the like) shown by black circles on the image displayed on the display unit 45, and a mouse may be clicked (input) to specify the points.

The controller 40 stores coordinates of the sampling points F input to the input unit by the clicking, i.e., the x position, the y position, and the z position, in the storage 42.

By repeating the above-mentioned processes, the user specifies the plurality of sampling points F, and coordinates thereof, and the storage 42 stores the coordinates thereof. A total number of the sampling points F specified by the user is NF. The x position, the y position and the z position of the sampling point Fj held in the storage 42 with reference to an arbitrary reference point in the specimen 24, i.e., xyz coordinates, are expressed as (xFj, yFj, zFj).

The NF sampling points F may be determined automatically instead of being specified by the user.

For example, when the user performs a predetermined input, to the input unit 44, the controller 40 may acquire the z stack image IZ according to the imaging range IR input to the input unit 44 in step S100. Then, the calculating device 41 may select the NF points as the sampling points F, for example, from the top in the order of brightest luminance value in the acquired z stack image IZ and store the coordinates of the sampling point Fj to the storage 42.

Further, in order to shorten the operation time of the microscope 1a and reduce phototoxicity to the specimen 24, the range of the z direction of the z stack image to be acquired at this time may be made narrower than the range Rz of the z direction of the imaging range IR, and a scan pitch (Px, Py) may be made greater than the set value.

In step S120, a loop is started for each of the sampling points F where the first phase distribution WF1 is measured. Then, for processing up to step S160, which will be described later, a loop is repeated FN times from j=1 to j=NF for a subscript j of the sampling point Fj.

In step S130, the controller 40 operates the microscope 1a to focus the illumination light IL to the sampling point Fj. Specifically, the sampling point Fj may be moved to the focusing point FP (see FIG. 2A and FIG. 2B) of the illumination light IL by moving the stage 25 using the stage driving unit 26, or the illumination light IL may be focused to the sampling point Fj by changing an azimuth angle of a reflecting surface of the deflection mirror 17. In addition, the focusing point FP is moved to be located at z coordinates zFj of the sampling point Fj by moving the z position of the stage 25 or the objective lens 21.

In step S140, the phase distribution measuring unit 46 measures the first phase distribution WF1 (see FIG. 2A) equivalent to the aberration induced by the specimen 24 at the sampling point Fj based on the signal S1 sent from the detector 29a. Details of the measurement of the first phase distribution WF1 will be described below.

In step S160, the loop of each of the sampling points F is terminated.

Figure 8:
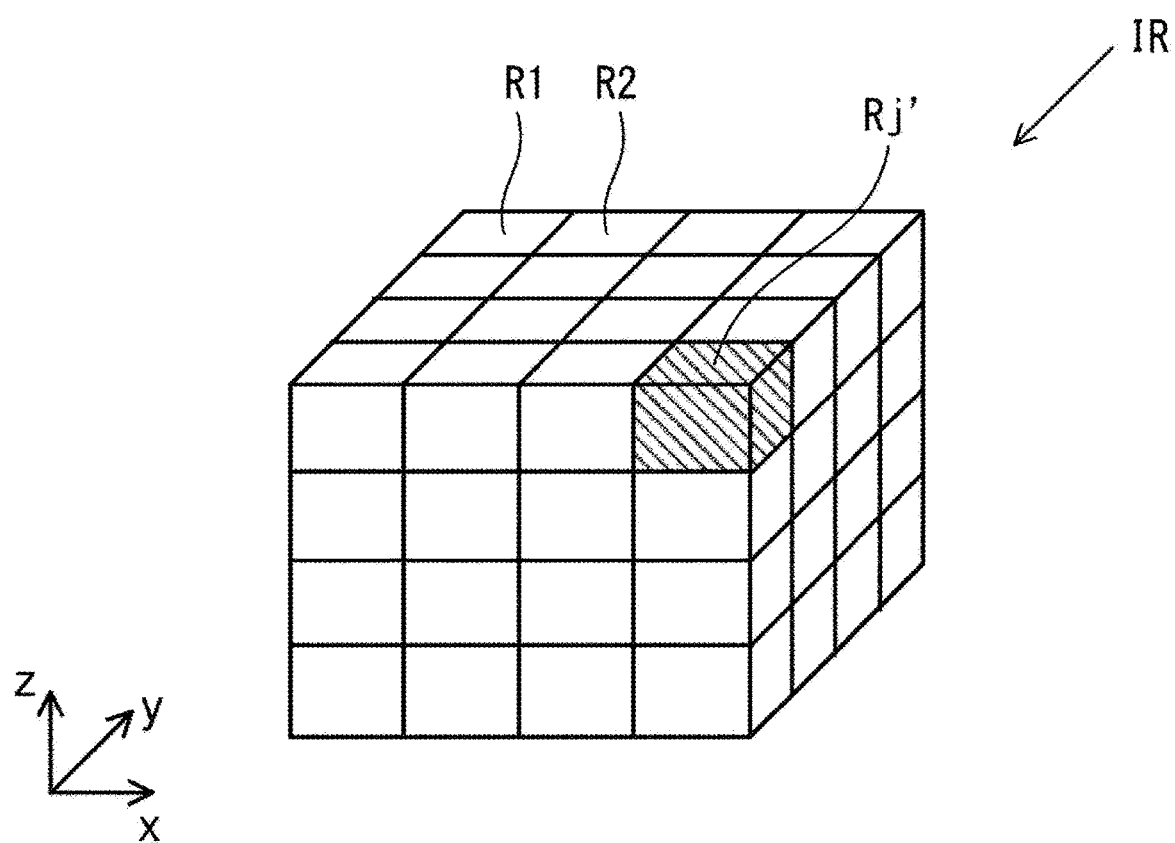
FIG. 8 is a view showing an example of an area in which an image is acquired.

In step S170, the imaging range IR that is a rectangular area set in step S100 is divided into a plurality of areas as shown in FIG. 8, and small areas R (R1, R2, ..., Rj', ..., RNR) are set. Here, j' is a subscript that expresses the number of the small areas R. In addition, a j' is a maximum value, i.e., a total number of the small areas R is NR.

In each of the small areas Rj', one or a plurality of detection points U are contained. Coordinates of a 3-dimensional center position of each of the small regions Rj' is (xRj', yRj', zRj').

A size of each of the small areas R may be set to become a area in which the aberration of the illumination light IL is kept sufficiently small by adding the second phase distribution WF2 calculated in the small areas R (for example, a center position of the small areas R). Since the size of the small areas R varies depending on the specimen 24, a value may be set for each specimen 24 in advance.

In step S180, the phase distribution calculation unit 47 performs calculation of the second phase distribution WF2 with respect to the NR small areas R based on each of the first phase distributions WF1 measured at NF sampling points. A specific calculation method of the second phase distribution WF2 will be described below.

In step S190, the phase distribution setting unit 49 sends the signal S2 to the phase modulation element 14, and acquires the image of the specimen 24 in the imaging range IR in a state in which the second phase distribution WF2 that was calculated is set to the illumination light IL. Details of the image acquisition will be described below.

Acquisition of the image of the specimen 24 is terminated by the above-mentioned steps.

(Measurement of First Phase Distribution)

Figure 7A:
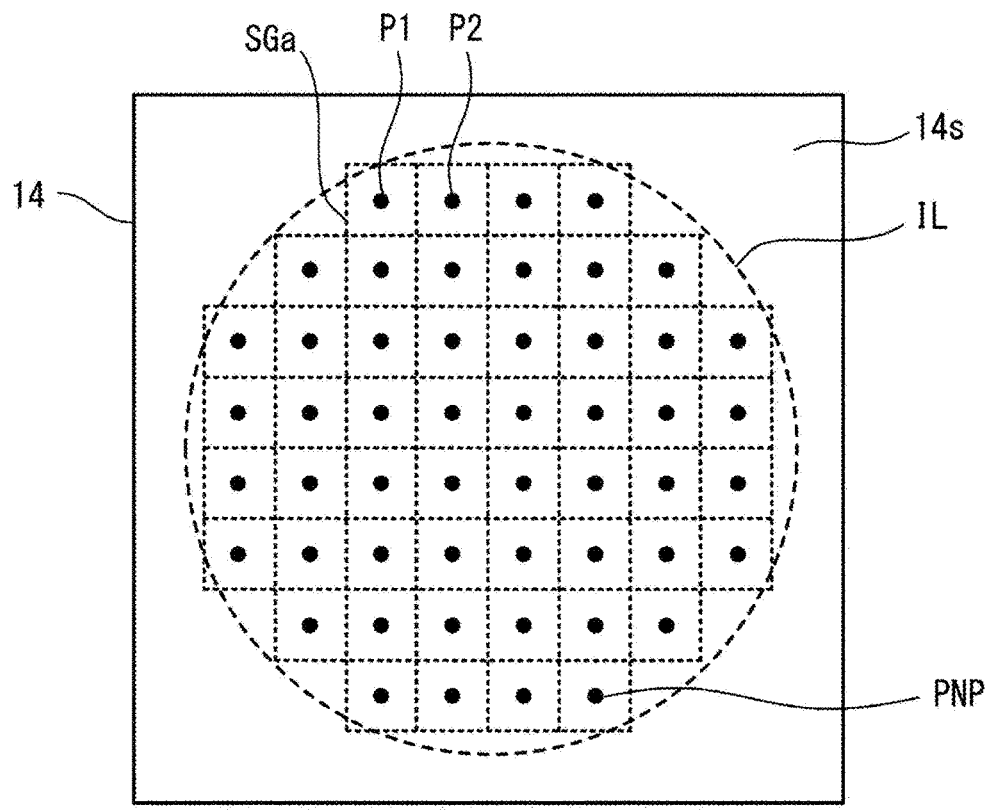
FIG. 7A is a view showing a reflecting surface of a phase modulation element.
Figure 7B:
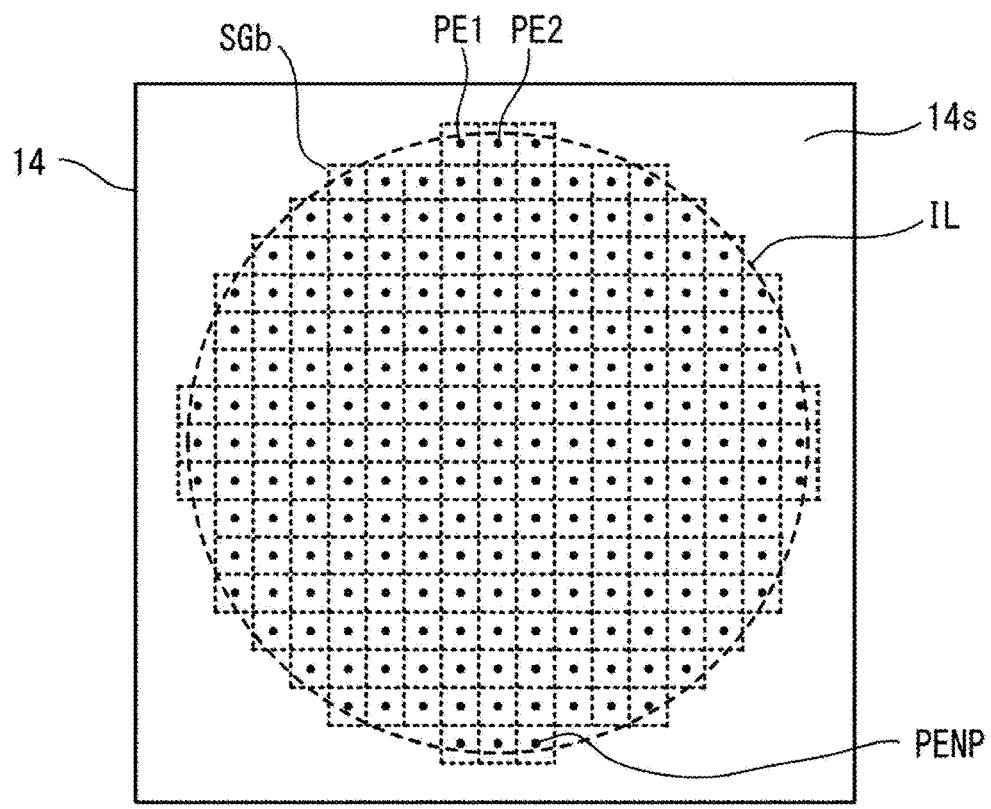
FIG. 7B is a view showing a reflecting surface of the phase modulation element.

Hereinafter, measurement of the first phase distribution WF1 in the above-mentioned step S140 will be described with reference to FIG. 5. FIG. 7A and FIG. 7B.

Figure 5:
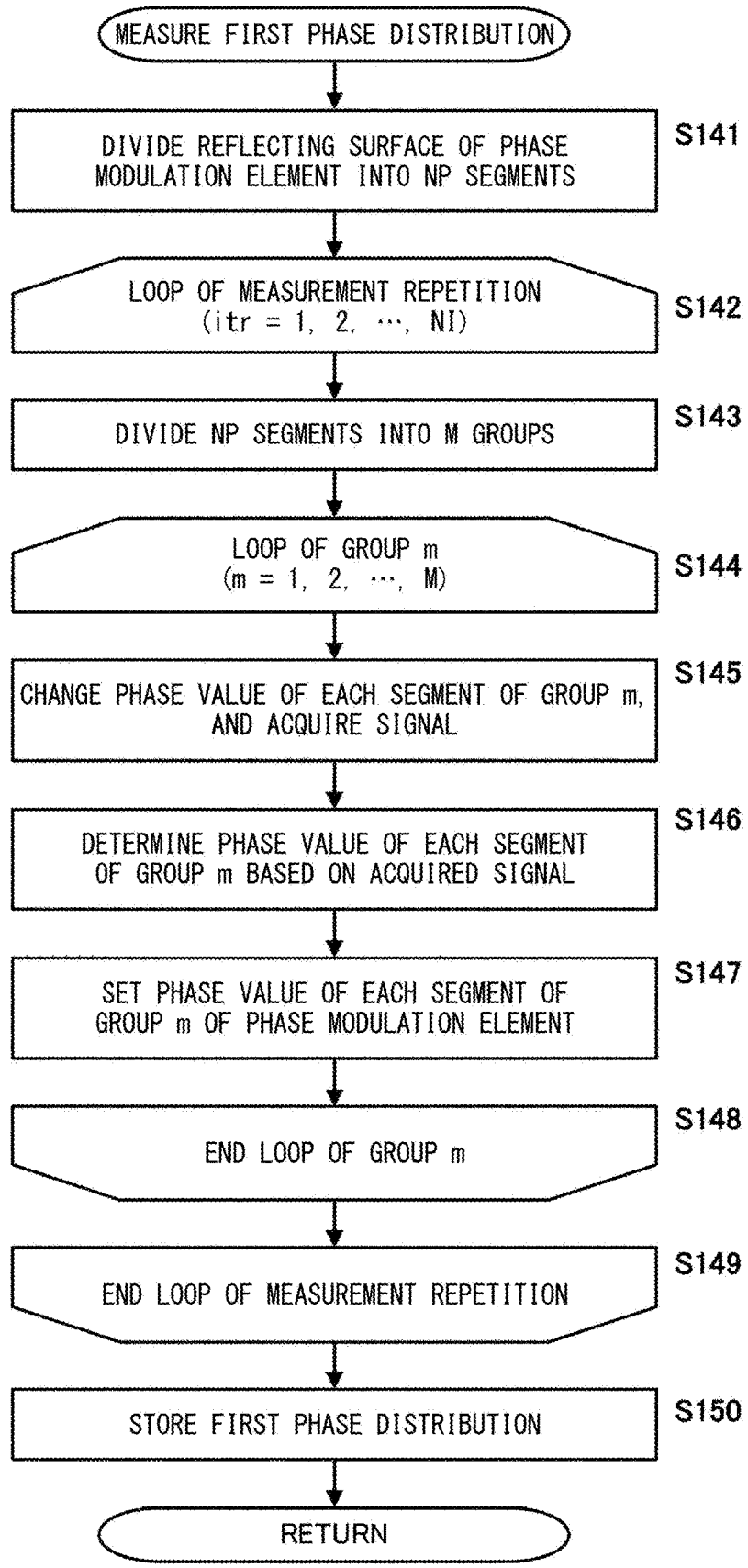
FIG. 5 is a view showing an example of a flow of measurement of a first phase distribution W.

FIG. 5 is a view showing a flow of measurement of the first phase distribution WF1 in step S140.

FIG. 7A is a view showing the reflecting surface 14s of the phase modulation element 14. FIG. 7A also shows the illumination light IL (inside the dotted circle) illuminated on the reflecting surface 14s.

In S141, as shown in FIG. 7A, the reflecting surface 14s of the phase modulation element 14 is virtually divided into a plurality of segments SGa. Further, even if the phase modulation element 14 has unit elements such as a plurality of micromirrors separated from each other, one segment SGa does not need to correspond to one unit element, and the one segment SGa may contain the plurality of unit elements.

Hereinafter, a center point of each of the segments SGa is referred to as a phase sampling point P (P1, P2, ..., Pi, ..., PNP). Here, i is a subscript that expresses the number of the phase sampling points P. In addition, a maximum value of i, i.e., a total number of the phase sampling points P is NP.

As described above, the reflecting surface 14s is disposed to substantially coincide with the pupil surface IPP of the light transmitting optical system ILO. Here, x and y coordinates of the phase sampling point Pi on the pupil surface IPP are (xPi, yPi).

Further, a shape of each of the segments SGa is not limited to a square shape and may be an arbitrary shape. In addition, the arrangement position of the phase sampling point Pi is not limited to the points arranged in a lattice within the xy plane, and may be an arbitrary arrangement position.

In step S142, a processing loop for measuring the first phase distribution WF1 is started. Then, regarding processing up to step S149, which will be described later, N1 loops from itr=1 to itr=NI is repeated for subscript itr of the number of repetitions.

In step S143, the NP segments SGa is randomly classified into M groups (M is a natural number of two or more).

In step S144, a loop is started for each classified group m (m=1, 2, 3, ..., M).

In step S145, the phase value added to the illumination light IL by each of the segments SGa belonging to the group in, which is the $m^{th}$ group, is changed multiple times to different predetermined values. Meanwhile, in the segments SGa belonging to the group other than the group m, the phase value added to the illumination light IL is not changed. The phase value added multiple times to the illumination light IL by each of the segments SGa belonging to the above-mentioned group m may be set so that, for example, the phase value of each of the segments SGa changes at different frequencies in time.

At each of these multiple set phase values, the controller 40 opens the shutter 11, irradiates the specimen 24 with illumination light and detects the signal emitted from the sampling point Fj. Here, the controller 40 may operate the deflection mirror 17 to scan and acquire an image of the vicinity area of the sampling point Fj based on the signal S1 from the detector 29a.

When the number of the segments SGa belonging to the group m is Ns, the phase modulation pattern is changed by 2×Ns or more, the signal from the sampling point Fj may be acquired over 2×Ns times or more, and the image of the vicinity area of the sampling point Fj may be acquired.

In step S146, the phase distribution measuring unit 46 determines the phase value to be set in order to reduce the aberration induced by the specimen 24 in each of the segments SGa of the group m based on, for example, the 2×Ns phase modulation patterns set to the phase modulation element 14 in step S145 and the intensity of the signal light DL from the sampling point Fj or the estimated value calculated from the vicinity image of the sampling point Fj among the above-mentioned 2×Ns patterns. As the estimated value calculated from the image, for example, at least one of the contrast of the image, the maximum luminance value, standard deviation of the luminance value, and an integrated value of a power spectrum in a predetermined frequency range when the image is Fourier-transformed may be used. In addition, a correlating value between the plurality of acquired images, which are obtained by multiple times scanning the vicinity of the sampling point Fj, may be used.

In the following step S147, the phase distribution setting unit 49 sends the signal S2 to the phase modulation element 14, and the part corresponding to each of the segments SGa of the group in among the reflecting surface 14s of the phase modulation element 14 sets the phase value for the illumination light IL to the phase value determined as mentioned above.

In step S148, the loop of the group m is terminated.

The above-mentioned steps complete the first determination and setting of the phase values of the segments SGa belonging to each group (m=1 to M).

However, the phase value of each of the segments SGa is not necessarily determined and set to the optimum value by performing the so-called optimization described as above only once.

Here, when necessary, the processing from step S142 to step S149 is repeated the required number of times (N1 times), and the phase value of each of the segments SGa is brought closer to the optimum value.

When the measurement processing loop terminates in step S149, the process proceeds to step S150. In step S150, the controller 40 correlates the phase value to be set for each of the segments SGa measured by the phase distribution measuring unit 46, that is, the first phase distribution WF1, with the coordinates of the sampling point Fj in the specimen 24, and stores the correlation in the storage.

Hereinafter, the first phase distribution WF measured (determined) for each of the segments SGa at the sampling point Fj is written as Φ (xFj, yFj, zFj; xPi, yPi) using coordinates of the sampling point Fj and coordinates of a center point Pi of the segments SGa.

The above-mentioned steps complete the measurement of the first phase distribution WF1 for one sampling point Fj.

Further, the first phase distribution WF1 does not necessarily have to be measured continuously over the entire surface of the pupil surface IPP. For example, the first phase distribution WF1 may be measured only for some discrete points or regions within the pupil surface IPP, as described later in the observation method of the second embodiment. That is, the first phase distribution WF1 may be a distribution of phase values at discrete points or regions within the pupil surface IPP.

(Calculation of Second Phase Distribution)

Next, the calculation method of the second phase distribution WF2 performed in the above-mentioned step S180 will be described. As described above, the phase distribution calculation unit 47 calculates the second phase distribution WF2 in each of the small areas Rj' of the specimen 24, i.e., the phase value to be added to the illumination light IL to reduce the aberration induced by the specimen 24 based on the first phase distribution WF1 measured at each of the sampling points F of the specimen 24.

FIG. 7B is a view showing the reflecting surface 14s of the phase modulation element 14 like FIG. 7A.

As shown in FIG. 7B, the phase distribution calculation unit 47 virtually divides the reflecting surface 14s of the phase modulation element 14 into a plurality of segments SGb. Then, the phase distribution calculation unit 47 calculates the second phase distribution WF2 by calculating an appropriate phase value to beset to the illumination light IL for each of the plurality of segments SGb.

Further, even if the phase modulation element 14 has unit elements such as a plurality of micromirrors mutually separated from each other, one segment SGb does not necessarily correspond to one unit element, and a plurality of unit elements may be included in the one segment SGb.

Alternatively, the one segment SGb may correspond to one unit element.

The center point of each of the segments SGb is referred to as a phase sampling point PE (PE1, PE2, . . . , PEi', . . . , PENPE) in the same way as the example shown in FIG. 7A described above, i' is a subscript that expresses the number of the phase sampling point PE. In addition, a maximum value of i', i.e., a total number of the phase sampling point PH is NPE.

As described above, the reflecting surface 14s is disposed to substantially coincide with the pupil surface IPP of the light transmitting optical system ILO. Here, x and y coordinates of the phase sampling point PEi' in the pupil surface IPP is (xPEi', yPEi').

Further, a shape of each of the segments SGb is not limited to the square shape and may be an arbitrary shape. In addition, the arrangement position of the phase sampling point PEi' is also not limited to the points arranged in a lattice within the xy plane, and may be an arbitrary arrangement position.

In addition, the division number and size of the segments SGb in step S180 may be the same as or different from the division number and size of the segments SGa in step S141 described above.

In the embodiment, the second phase distribution WF2 at an arbitrary detection point U is calculated using a representation model of observation position dependent aberration as an example of the phase data model. In this method, first, model parameters of the representation model of observation position dependent aberration is determined by solving an inverse problem based on the first phase distribution WF1 mentioned above. After that, the second phase distribution WF2 at the arbitrary detection point U is calculated by solving a forward problem using the determined model parameters.

Further, a specific example of the representation model of observation position dependent aberration will be described below.

A model parameter vector α is introduced, and a relation between the model parameter vector α and a function Φ (xFj, yFj, zFj; xPi, yPi) expressing the first phase distribution WF1 measured at a $j^{th}$ sampling point Fj is expressed by Equation (1) using a model G.

[Math. 1]

$$\Phi(x_{Fj}, y_{Fj}, z_{Fj}; x_{Pi}, y_{Pi}) = G(x_{Fj}, y_{Fj}, z_{Fj}; x_{Pi}, y_{Pi}|\alpha) \qquad (1)$$

The model parameter vector α can be determined by solving an inverse problem expressed by the following Equation (2) based on the first phase distribution WF1 that was measured.

[Math. 2]

$$\alpha = \arg\min_{\alpha} \left( \sum_{j=1}^{N_F} \sum_{i=1}^{N_P} \left\| G(x_{Fj}, y_{Fj}, z_{Fj}; x_{Pi}, y_{Pi}|\alpha) - \Phi(x_{Fj}, y_{Fj}, z_{Fj}; x_{Pi}, y_{Pi}) \right\|_2^2 + \lambda R(\alpha) \right) \qquad (2)$$

Here, λ is a regularization parameter. R(α) is a regularization term, and they are introduced for the purpose of preventing over fitting to the first phase distribution WF1 or solving the inverse problem even in a defect problem in which an information number included in the first phase distribution WF1 is smaller than the model parameter number.

The regularization term can be set like the following Equation (3) using, for example, an L1 norm.

[Math. 3]

$$R(\alpha) = \|T\alpha\|_1 \qquad (3)$$

Here, T represents an operator that transforms model parameters into another basis, and for example, a unit matrix, a gradient operator, or the like, can be used.

The above-mentioned inverse problem can be solved using algorithms such as, for example, a proximity gradient method, an expansion Lagrange method, or the like.

When the model parameter vector α is obtained, the second phase distribution WF2 to be set to the illumination light IL when the arbitrary small area R (xR, yR, zR) is detected can be obtained by Equation (4) as the forward problem. Here, a value ΦE expressed in Equation (4) represents a value at the phase sampling point PEi' on the pupil surface IPP, i.e., on the reflecting surface 14s of the phase modulation element 14.

[Math. 4]

$$\Phi_E(x_R, y_R, z_R; x_{PEi'}, y_{PEi'}) = G(x_R, y_R, z_R; x_{PEi'}, y_{PEi'} | \alpha) \quad (4)$$

As an example, when a linear model is used, a phase value φ that is a value of the first phase distribution WF1 can be expressed as Equation (5) using a row vector GL (xFj, yPj, zFj; xPi, yPi). In addition, a phase value φE that is a value of the second phase distribution WF2 can be expressed as Equation (6).

[Math. 5]

$$\Phi(x_{Fj}, y_{Fj}, z_{Fj}; x_{Pi}, y_{Pi}) = G(x_{Fj}, y_{Fj}, z_{Fj}; x_{Pi}, y_{Pi} | \alpha) = G_L(x_{Fj}, y_{Fj}, z_{Fj}; x_{Pi}, y_{Pi})\alpha \quad (5)$$

[Math. 6]

$$\Phi_E(x_R, y_R, z_R; x_{PEi'}, y_{PEi'}) = G(x_R, y_R, z_R; x_{PEi'}, y_{PEi'} | \alpha) = G_L(x_R, y_R, z_R; x_{PEi'}, y_{PEi'})\alpha \quad (6)$$

Argument of the row vector GL indicates that each component depends on the coordinates of the sampling points F or the detection points U in the specimen 24 and the coordinates of the phase sampling point P on the pupil surface. It is possible to create a matrix in which the row vector GL of Equation (5) is arranged vertically with respect to the coordinates of the entire sampling point Fj, and it may be also possible to create a pseudo-inverse matrix using singular value decomposition of the matrix and determine the model parameters.

Figure 9A:
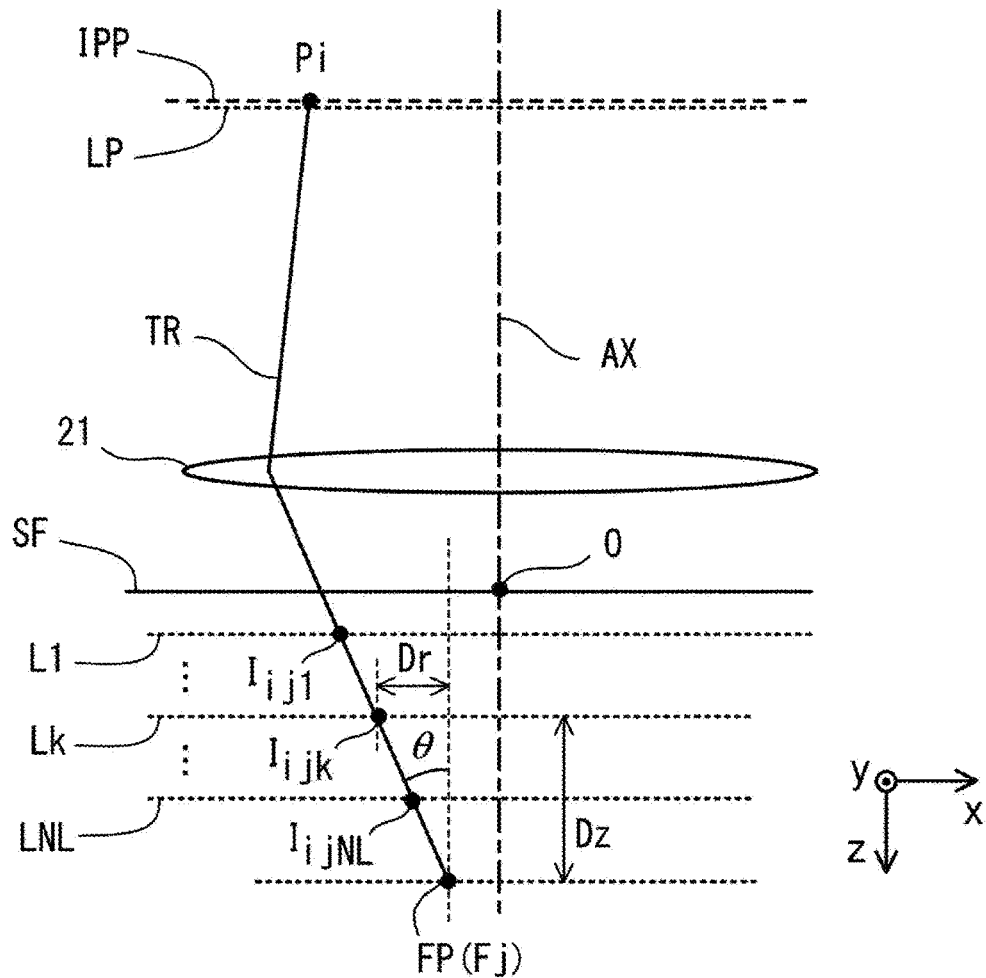
FIG. 9A is a view for describing a phase layer model.

Next, a phase layer model will be described as an example of the representation model of observation position dependent aberration. As shown in FIG. 9A, the phase layer model is a model using a plurality of phase layers L (L1, ..., Lk, ..., LNL) virtually disposed between a boundary surface SF of the specimen 24 and the focusing point FP. k is a subscript indicating the order of the phase layers L. Further, the focusing point FP coincides with the sampling point Fj, which is one of the plurality of sampling points F mentioned above.

The phase layer model represents the phase value that each of the phase layers L gives to the illumination light IL at each position in each xy plane as a model. In the phase layer model, the phase value generated in the beam connecting the point P on the pupil surface IPP and the focusing point FP in the specimen 24 is expressed as a sum of phase values when passing through the plurality of phase layers L. In addition, the phase layers LP may also be placed on the pupil surface IPP to represent observation position independent aberration component commonly occurring within the imaging range IR.

Further, the phase change of the beam passing through each xy position of each of the phase layers L corresponds uniquely to the value of the refractive index of the phase layers L at the xy position. Accordingly, a model representing the distribution of the refractive index of the specimen 24 at each position in the xy plane of each of the phase layers L may be used as the phase layer model.

The phase layer model may be a linear model represented by Equation (5) and Equation (6) described above. Based on Equation (5) and Equation (6), the setting of the model parameter vector α in the phase layer model and the specific label of a matrix GL (xFj, yFj, zFj; xPi, yPi) is derived. Further, in the following derivation, while coordinates (xPi, yPi) of a phase sampling point Pi of a pupil surface TPP are expressed as the coordinates (not shown) in the pupil of the objective lens 21, if appropriate, the pupil of the objective lens 21 and the pupil magnification (imaging magnification) of the phase modulation element 14 may be multiplied to perform scale transformation.

Figure 9B:
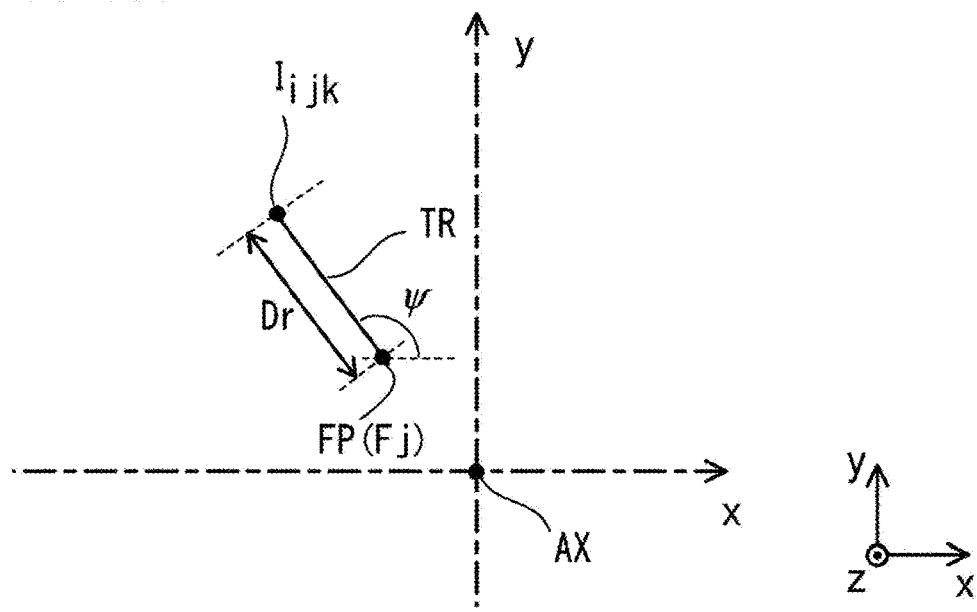
FIG. 9B is a view for describing a phase layer model.

Definition of signs will be described with reference to FIG. 9A and FIG. 9B. FIG. 9A is a x-z cross-sectional view of the specimen 24, the objective lens 21 and the pupil surface IPP, and FIG. 9B is a x-z cross-sectional view of the specimen 24, the objective lens 21 and the pupil surface IPP, and a xy cross-sectional view of the specimen 24.

A coordinates origin O is a position of a boundary surface of the specimen 24 on the optical axis AX. FIG. 9A shows an example in which the NL phase layers L are disposed at a positive position of the z. The z coordinates of a $k^{th}$ phase layer is zLk. Intersection points between the NL phase layers L through which a beam TR contained in the illumination light IL emitted from the point (phase sampling point) Pi on the pupil surface IPP passes until it focuses at the focusing point FP (the sampling point Fj) are expressed as Iij1, ..., Iijk, ..., IijNL, respectively. Coordinates of an intersection point Iijk are expressed as (xLijk, yLijk, zLk).

Further, the sheet number NL of the phase layers L to be placed may be set according to the observation conditions so that the improvement effect is maximized when corrected by the second phase distribution WF2. In addition, the z position of each of the phase layers L may be set, for example, to dispose them at equal intervals between the sampling point Fj and the boundary surface SF of the specimen 24, and alternatively, if the z-position where the specimen 24 has a structure with a large unevenness in the refractive index distribution, such as a bone, is known in advance, it may be set to the z-position.

The coordinates of the intersection point Iijk of the phase layers L and the beam TR are uniquely determined geometrically when the coordinates (xFj, yFj, zFj) of the sampling point Fj and the coordinates (xPi, yPi) of the phase sampling point Pi are determined on the pupil surface IPP. An angle formed between the beam TR focused on the sampling point Fj and the optical axis is θ, and an angle formed between the projection of the beam onto the x-y plane and the x axis is Ψ.

Since z coordinates of the phase layer Lk is zLk, a distance between the sampling point Fj and the phase layer Lk is zFj-zLk. The distance dijk when the sampling point Fj and the point ILijk are projected to the xy plane is expressed as Equation (7).

[Math. 7]

$$d_{i,j,k} = (z_{Fj} - z_{Lk}) \tan \theta \quad (7)$$

As described above, the x and y coordinates of the point ILijk where the beam TR focused on the sampling point Fj intersects the phase layer Lk can be described as Equation (8) and Equation (9).

[Math. 8]

$$x_{Li,j,k} = d_{i,j,k} \cos \psi + x_{Fj} = (z_{Fj} - z_{Lk}) \tan \theta \cos \psi + x_{Fj} \quad (8)$$

[Math. 9]

$$y_{Li,j,k} = d_{i,j,k} \sin \psi + y_{Fj} = (z_{Fj} - z_{Lk}) \tan \theta \sin \psi + y_{Fj} \quad (9)$$

Meanwhile, when the coordinates of the point Pi where the beam TR intersects the pupil surface IPP are determined by an azimuth angle (θ, Ψ) of the beam TR and the sine condition with respect to the objective lens 21 is established, the relation between the angle of the beam TR and the coordinates of the point Pi can be expressed as Equation (10) to Equation (12) using a focal distance f of the objective lens 21.

[Math. 10]
$$f \sin \theta = \sqrt{x_{Pi}^2 + y_{Pi}^2} \quad (10)$$

[Math. 11]
$$\cos \psi = \frac{x_{Pi}}{\sqrt{x_{Pi}^2 + y_{Pi}^2}} \quad (11)$$

[Math. 12]
$$\sin \psi = \frac{y_{Pi}}{\sqrt{x_{Pi}^2 + y_{Pi}^2}} \quad (12)$$

The following Equation (13) and Equation (14) are obtained by eliminating θ and Ψ of Equation (8) and Equation (9) using Equation (10) to Equation (12).

[Math. 13]
$$x_{Li,j,k} = \frac{(z_{Fj} - z_{Lk}) \cdot x_{Pi}}{\sqrt{f^2 - x_{Pi}^2 - y_{Pi}^2}} + x_{Fj} \quad (13)$$

[Math. 14]
$$y_{Li,j,k} = \frac{(z_{Fj} - z_{Lk}) \cdot y_{Pi}}{\sqrt{f^2 - x_{Pi}^2 - y_{Pi}^2}} + y_{Fj} \quad (14)$$

Coordinates ILijk of an intersection point between the beam TR and the phase layer Lk can be expressed using the coordinates of the sampling point Fj in the specimen 24 and the coordinates of the phase sampling point Pi on the pupil surface IPP, both of which are known, by Equation (13) and Equation (14).

The phase distribution of the phase layers LP on the pupil surface IPP is expressed as φP (xPi, yPi), and the phase distribution of each of the NL phase layers L set in the specimen 24 is expressed as φKL (xLijk, yLijk). Here, the phase value Φ (xFj, yFj, zFj; xPi, yPi) generated in the beam TR emitted from point Pi on the pupil and focused at the sampling point Fj is shown as Equation (15) and expressed as a sum of the phase values generated in the plurality of phase layers L.

[Math. 15]
$$\Phi(x_{Fj}, y_{Fj}, z_{Fj}; x_{Pi}, y_{Pi}) = \varphi_P(x_{Pi}, y_{Pi}) + \sum_{k=1}^{N_L} \varphi_{Lk}(x_{Li,j,k}, x_{Li,j,k}) =$$
$$\varphi_P(x_{Pi}, y_{Pi}) + \sum_{k=1}^{N_L} \varphi_{Lk}\left(\frac{(z_{Fj} - z_{Lk}) \cdot x_{Pi}}{\sqrt{f^2 - x_{Pi}^2 - y_{Pi}^2}} + x_{Fj}, \frac{(z_{Fj} - z_{Lk}) \cdot y_{Pi}}{\sqrt{f^2 - x_{Pi}^2 - y_{Pi}^2}} + y_{Fj}\right) \quad (15)$$

Here, the phase distribution of each of the phase layers L can be expressed by a linear combination of basis functions as shown in Equation (16) and Equation (17).

[Math. 16]
$$\varphi_P(x_P, y_P) + \sum_{n=1}^{M_P} \alpha_{Pn} f_{Pn}(x_P, y_P) \quad (16)$$

[Math. 17]
$$\varphi_{Lk}(x_L, y_L) + \sum_{n=1}^{M_{Lk}} \alpha_{Lk,n} f_{Ln}(x_L, y_L) \quad (17)$$

In Equation (16) and Equation (17), fPn (xP, yP) and fLn (xL, yL) are an $n^{th}$ term of a basis function, and αpn is a coefficient of the $n^{th}$ term of the basis function that expresses the phase layers LP disposed on the pupil surface IPP. In addition, αLk and n are coefficients of the $n^{th}$ term of the basis function that expresses the $k^{th}$ phase layer Lk, and MP and MLk are term numbers of the basis function used.

As the basis functions fPn (xP, yP) and fLn (xL, yL), for example, a trigonometric function, a wavelet function, a Zernike polynomial expression, a Legendre polynomial expression, or the like, can be used. Alternatively, as the basis function, for example, the phase layers L are segmented in a lattice point shape, and a function that takes a value of 1 inside the segment and 0 outside the segment may be used. In addition, a different basis function or term numbers MP and MLk may be used for each of the phase layers L, and the basis function may be used according to the specimen 24 of the observation target. The coefficient αPn of the basis function and the coefficients αLk and n are model parameters in the phase layer model.

The relationship between the model parameters and the first phase distribution WF1 in Equation (15) to Equation (17) can be expressed using a matrix as shown below.

The coefficient of the basis function of each of the phase layers L on the pupil surface IPP and in the specimen 24 is arranged vertically for each of the phase layers L and expressed as Equation (18) as a vector.

[Math. 18]
$$\alpha_P = \begin{pmatrix} \alpha_{P1} \\ \alpha_{P2} \\ \vdots \\ \alpha_{PM_P} \end{pmatrix}, \quad \alpha_{Lk} = \begin{pmatrix} \alpha_{Lk,1} \\ \alpha_{Lk,2} \\ \vdots \\ \alpha_{Lk,M_{Lk}} \end{pmatrix} \quad (18)$$

Further, the value φFj of the first phase distribution WF1 measured at the sampling point Fj is arranged vertically according to the number of subscript j of the phase sampling point Pi on the pupil surface IPP, and expressed as Equation (19) as a vector.

[Math. 19]
$$\Phi_{Fj} = \begin{pmatrix} \Phi(x_{Fj}, y_{Fj}, z_{Fj}; x_{P1}, y_{P1}) \\ \Phi(x_{Fj}, y_{Fj}, z_{Fj}; x_{P2}, y_{P2}) \\ \vdots \\ \Phi(x_{Fj}, y_{Fj}, z_{Fj}; x_{PN_P}, y_{PN_P}) \end{pmatrix} \quad (19)$$

Based on Equation (15) to Equation (19), the relation between αP and αk and φFj can be expressed as Equation (20) using a matrix.

[Math. 20]

$$\Phi_{Fj} = A_P \alpha_P + \sum_{k=1}^{N_L} A_{j,k} \alpha_{Lk} \quad (20)$$

Here, Ap is a matrix of NP rows×MP columns (NP is the total number of the sampling points F, MP is the term number of the basis function representing the phase layers LP and its (i, m) component is Equation (21)).

[Math. 21]

$$A_P(i,m) = f_{Pin}(x_{Pi}, y_{Pi}) \quad (21)$$

In addition, the matrices Aj and k in Equation (20) are NP rows×MLk columns matrix, and its (i, m) component is Equation (22).

[Math. 22]

$$A_{j,k}(i, m) = f_{Lm}\left(\frac{(z_{Fj} - z_{Lk}) \cdot x_{Pi}}{\sqrt{f^2 - x_{Pi}^2 - y_{Pi}^2}} + x_{Fj}, \frac{(z_{Fj} - z_{Lk}) \cdot y_{Pi}}{\sqrt{f^2 - x_{Pi}^2 - y_{Pi}^2}} + y_{Fj}\right) \quad (22)$$

Further, Equation (23) can also be expressed using a vector in which vectors αP and αk are arranged vertically and a matrix in which a matrix Ap and a matrix Aj and k are arranged horizontally.

[Math. 23]

$$\Phi_{Fj} = (A_P \quad A_{j,1} \quad \cdots \quad A_{j,N_L}) \begin{pmatrix} \alpha_P \\ \alpha_{L1} \\ \vdots \\ \alpha_{L_{N_L}} \end{pmatrix} \quad (23)$$

Further, when using a vector in which the values φFj (φF1, φF2, ..., φFNF) of the first phase distribution WF1 at NF focusing points Fj are arranged vertically, it can be expressed as Equation (24).

[Math. 24]

$$\begin{pmatrix} \Phi_{F1} \\ \Phi_{F2} \\ \vdots \\ \Phi_{FN_F} \end{pmatrix} = \begin{pmatrix} A_P & A_{1,1} & \cdots & A_{j,N_L} \\ A_P & A_{2,1} & \cdots & A_{2,N_L} \\ \vdots & \vdots & \ddots & \vdots \\ A_P & A_{N_F,1} & \cdots & A_{N_F,N_L} \end{pmatrix} \begin{pmatrix} \alpha_P \\ \alpha_{L1} \\ \vdots \\ \alpha_{L_{N_L}} \end{pmatrix} \quad (24)$$

Since the coordinates (xFj, yFj, zFj) of the sampling point Fj, the coordinates (xPi, yPi) of the phase sampling point Pi of each pupil, and the z position zLk of each of the phase layers Lk set in advance are already known, each component of a matrix A of Equation (24) can be determined. Further, the components of the matrix Ap and the matrices Aj and k are not limited to the above-mentioned, and for example, each component of the matrix may be multiplied by a correction coefficient corresponding to the azimuth angle (θ, Ψ) of the beam TR corresponding to each component.

By the method described above, a linear relation between the model parameters and the first phase distribution WF1 can be derived. The phase distribution calculation part 47 creates the above-mentioned model (phase data model), and determines the model parameter vector αP, αL1, ..., αLNL from the first phase distribution WF1 by solving the inverse problem based on the above-mentioned Equation (2). Then, the phase distribution calculation unit 47 calculates the second phase distribution WF2 suitable for detection of each of the small areas R based on Equation (6) described above. Here, by deriving the above-mentioned Equation (23) after replacing the sampling point Fj and the small areas Rj' with a sampling point Pi and a sampling point PEi', the row vector GL (xR, yD, zR; xPEi', yPEi') of Equation (6) can be derived. The calculating device 41 stores the second phase distribution WF2 calculated by the phase distribution calculation unit 47 in the storage 42 in correspondence with the number j' of each of the small areas R.

Further, as shown in FIG. 7A and FIG. 7B, a total number NPE of the phase sampling point PEi' when the second phase distribution WF2 is calculated may be set to be greater than a total number NP of the phase sampling point Pi when the first phase distribution WF1 is measured. That is, as the total number of the phase sampling point Pi, a larger number than the degree of freedom of expression of the first phase distribution WF1 may be set. In this case, when the row vector GL (xR, yD, zR; xPEi', yPEi') in Equation (6) is derived based on Equation (23), the total number of the phase sampling points may be replaced from NP to NPE.

Further, as described above, the second phase distribution WF2 with respect to one detection point U is determined based on the first phase distribution WF1 with respect to the two or more sampling points F. Accordingly, in other words, the amount of information characterizing the second phase distribution WF2 with respect to one of the detection points U may be set to be greater than the amount of information characterizing the first phase distribution WF1 with respect to one of the sampling points F.

In this way, during calculation of the second phase distribution WF2, by calculating the phase at the phase sampling point R which has a larger number than when measuring the first phase distribution WF1, the value of the second phase distribution WF2 with respect to the segments SGb that are divided more finely in the phase modulation element 14 can be calculated.

In addition, a higher improvement effect can be obtained than a case when the first phase distribution WF1 is used as the second phase distribution WF2 as it is for aberration correction.

(Method of Image Acquisition)

Figure 6:
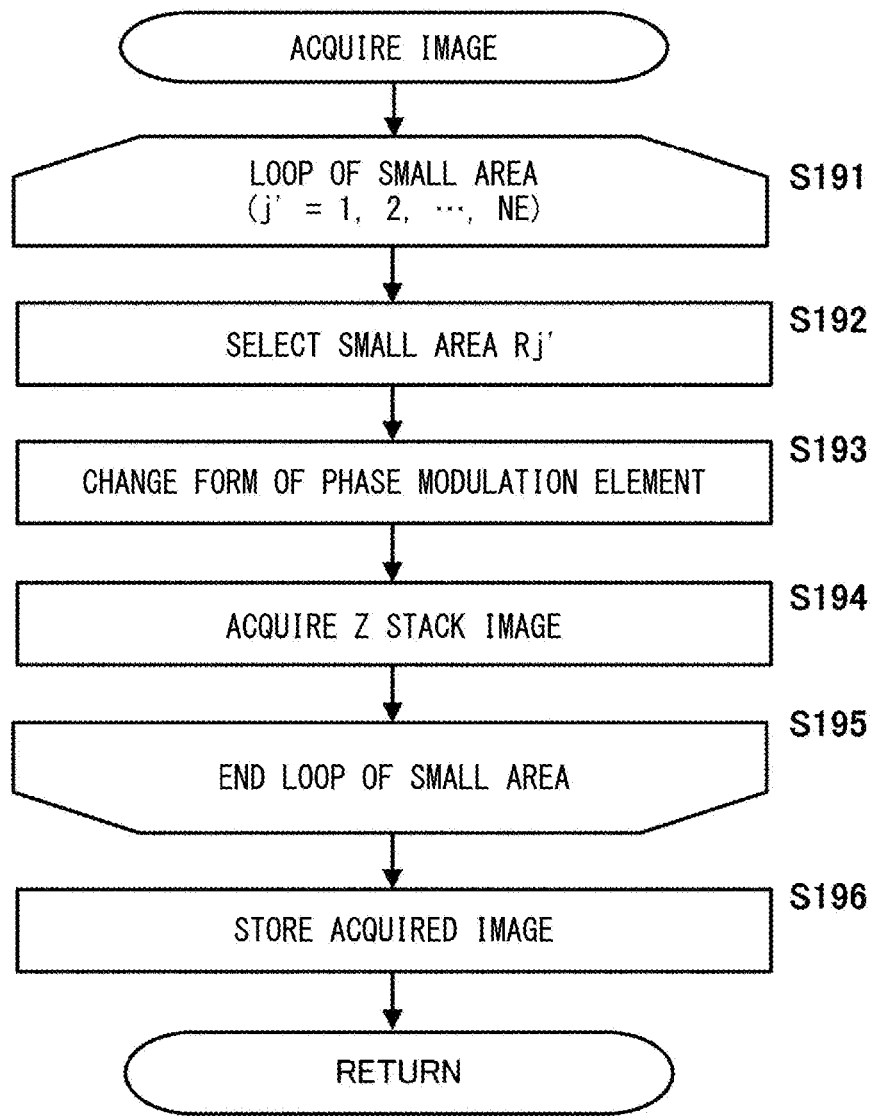
FIG. 6 is a view showing a flow of image acquisition.

Hereinafter, a method of image acquisition in the above-mentioned step S190 will be described with reference to FIG. 6.

In step S191, a loop is started for the plurality of small areas R (see FIG. 8) within the imaging range IR for image acquisition. Then, regarding the processing up to step S195, which will be described later, for the subscript j' of the small areas R, the loop from j'=1 to j'=NE is repeated NE times.

A $j'^{th}$ small area Rj' is selected in step S192. Then, in step S193, the phase distribution setting unit 49 sends the signal S2 to the phase modulation element 14, and the second phase distribution WF2 appropriate for detection of the small area Rj' by the phase modulation element 14 may be set to be added to the illumination light IL.

That is, in step S193, the phase distribution setting unit 49 sets the second phase distribution WF2 to the phase modulation element 14 in synchronization with scanning of the focusing point FP and the specimen 24 by the scanning unit (the deflection mirror 17 or the stage 25).

In step S194, the z stack image in the small area Rj' is acquired. Upon acquisition of the image, the controller 40 sends the signal S3 and swings the deflection mirror 17 within the small area Rj'. In addition, the signal S3 is sent to the stage driving unit 26 or the signal S5 is sent to the objective lens holding unit 22 to relatively move the focusing point FP within the small area Rj' in the z direction. Then, the image generating unit 48 generates the z stack image based on the signal S1 acquired by the detector 29a when the focusing point FP coincides with each of the detection points Uo.

A pitch (Px, Py, Pz) of the detection points U in the x direction, the y direction and the z direction upon acquisition of the z stack image flows the value input in step S100.

Further, the acquired z stack image may contain images of the plurality of xy cross sections with different positions in the small area Rj' in the z direction, or may contain only one xy cross section image.

In the image acquired in step S194, the second phase distribution WF2 is added to the illumination light IL, the aberration caused by the specimen 24 is corrected, and thus, the image quality such as resolution or the like is improved. The controller 40 stores the acquired z stack image in the storage 42 in correspondence with the number j' of the small area Rj'.

In step S195, the loop for the plurality of small areas R is terminated. Then, in step S196, the plurality of z stack images acquired in step S194, which is repeatedly executed, are connected to create one z stack image and stored in the storage 42. The created z stack image may be displayed on the display unit 45.

Further, the method of image acquisition for the specimen 24 is not limited to the above-mentioned, for example, after acquiring the entire imaging range IR with the average phase distribution of the second phase distribution WF2 for all the small areas R set to the phase modulation element 14, only a few of the small areas R set by the user may be acquired separately after setting the second phase distribution WF2 calculated for such small areas R to the phase modulation element 14.

Further, the signal light DL emitted from the specimen 24 during acquisition of the z stack image in step S194 may be of a different type from the signal light detected during measurement of the first phase distribution WF1 in step S145. For example, the first phase distribution WF1 may be measured using a signal other than fluorescence, such as scattered light emitted from the specimen 24, and the fluorescence emitted from the specimen 24 may be used when the z stack image is acquired in step S194.

When the signal other than the fluorescence is detected to measure the first phase distribution WF1, illuminance of the illumination light IL irradiated to the fluorescence pigment in the specimen 24 during measurement of the first phase distribution WF1 can be kept relatively row, and discoloration of the fluorescence pigment of the specimen 24 can be reduced during acquisition of the first phase distribution WF1.

In addition, even if there is no target that emits sufficient signals to measure the first phase distribution WF1 at the position where the signal light DL is to be measured by fluorescence in the specimen 24, aberration can be corrected by calculating the second phase distribution WF2 at that position by using this embodiment.

Microscope of Variant 1 of First Embodiment

Figure 10:
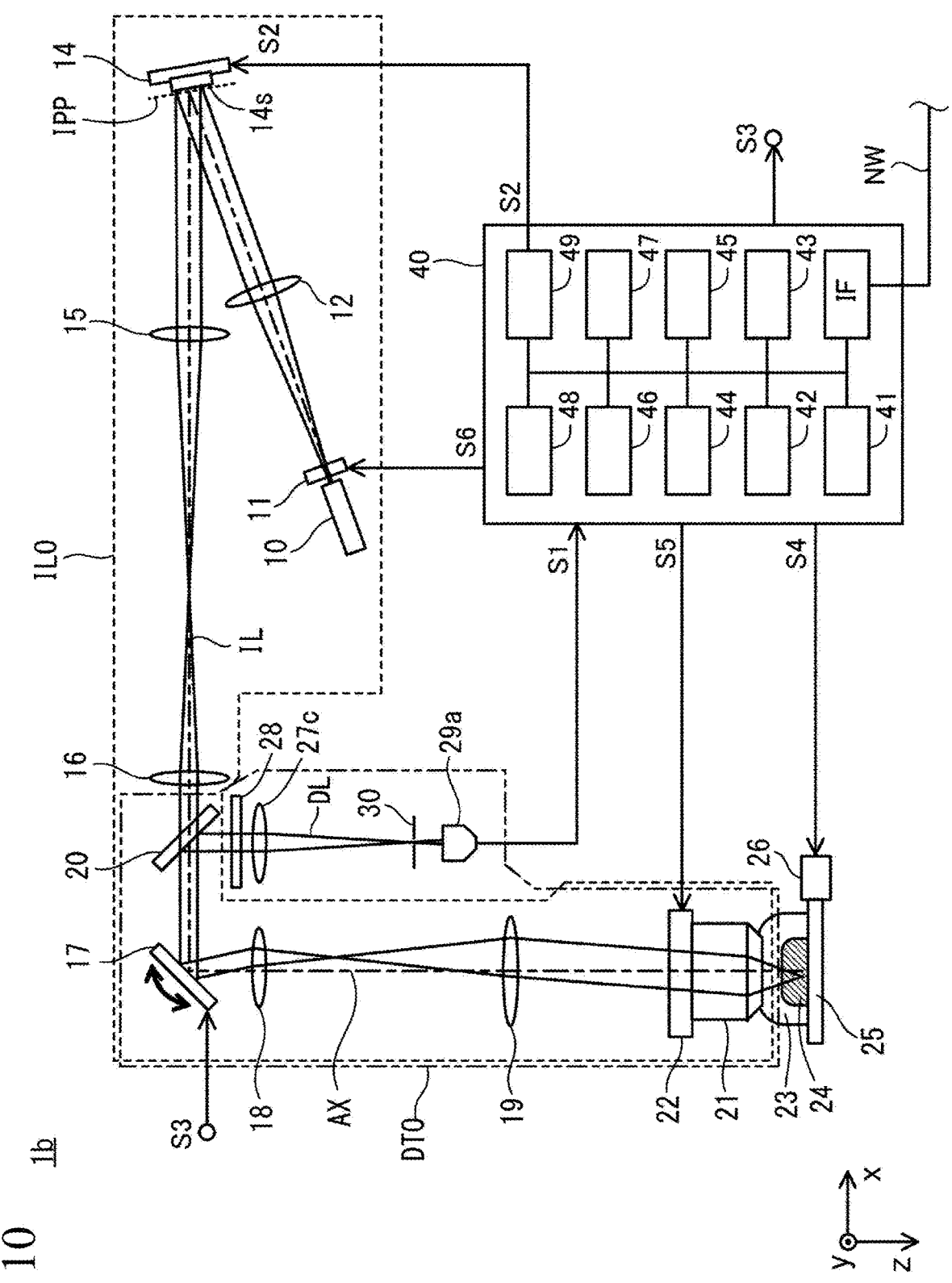
FIG. 10 is a view showing a configuration of a microscope of Variant 1.

FIG. 10 is a view showing a microscope 1b of Variant 1 of the first embodiment. Since the microscope 1b of Variant 1 has many configurations in common with the microscope 1a of the first embodiment, the same reference numerals designate the common configurations, and descriptions thereof are omitted as appropriate.

The microscope 1b of Variant 1 is distinguished from the microscope 1a of the first embodiment in that the signal light DL generated in the specimen 24 is received by the detector 29a via the relay lenses 19 and 18, and the deflection mirror 17. The signal light DL reflected by the deflection mirror 17 is reflected by the dichroic mirror 20 disposed between the deflection mirror 17 and the relay lens 16.

After that, the signal light DL passes through the detection filter 28, is focused by a relay lens 27 and is focused to a pinhole of a pinhole plate 30 disposed in front of the detector 29a. Then, the signal light DL passes through the pinhole to be detected by the detector 29a, is transformed into electric signal, and is sent to the controller 40 as the signal S1.

The light receiving optical system DTO of the microscope 1b of Variant 1 is indicated by a two-dot chain line frame, and includes the objective lens 21, the relay lenses 19 and 18, the deflection mirror 17, the dichroic mirror 20, the detection filter 28, the relay lens 27c, the pinhole plate 30, the detector 29a, and the like.

Among these, the configuration from the objective lens 21 to the deflection mirror 17 along the optical path of the signal light DL is included in both the light transmitting optical system ILO and the light receiving optical system DTO.

In the microscope 1b of Variant 1, since the signal light DL generated in the specimen 24 is de-scanned by the deflection mirror 17, regardless of the azimuth angle of the reflecting surface of the deflection mirror 17, the light is focused on the pinhole of the pinhole plate 30 placed in front of the detector 29a. Accordingly, the microscope 1b of Variant 1 functions as a so-called confocal microscope, and thus, the resolution is further improved.

Further, in the microscope 1b of Variant 1, most of the signal light DL from a portion of the specimen 24 shifted in a +z direction or a −z direction from the focusing point FP (see FIG. 2A and FIG. 2B) of the illumination light IL is blocked by the pinhole plate 30 and not received by the detector 29a. Accordingly, in the microscope 1b of Variant 1, even when detecting the signal light DL that responds linearly to the intensity of the illumination light IL, such as reflected light and scattered light, the signal light DL that arises from outside the focusing point FP, which is the so-called background light, can be removed.

Microscope of Variant 2 of First Embodiment

Figure 11:
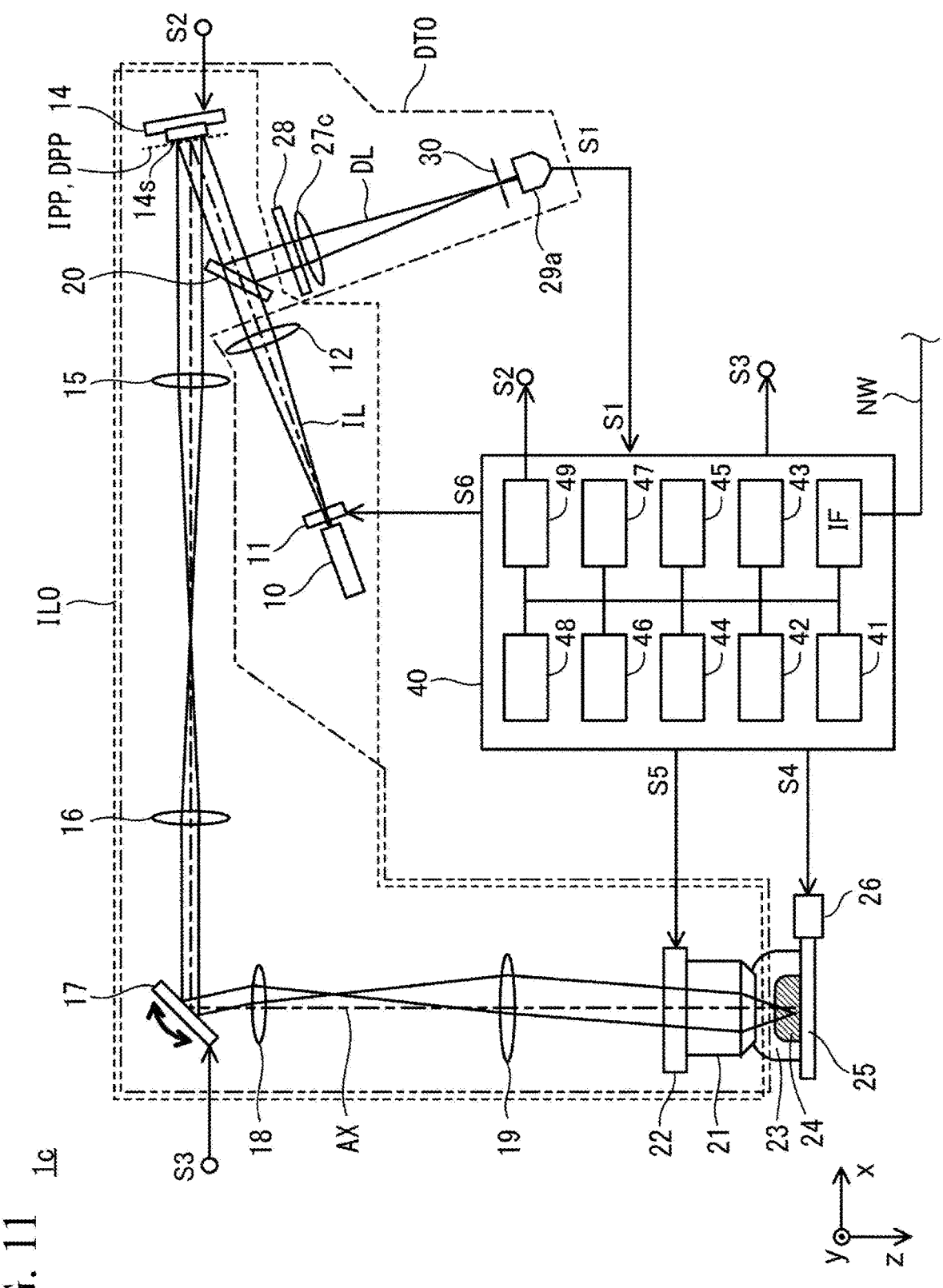
FIG. 11 is a view showing a configuration of a microscope of Variant 2.

FIG. 11 is a view showing a microscope 1c of Variant 2 of the first embodiment. Since the microscope 1c of Variant 2 has many configurations in common with the microscope 1a of the first embodiment and the microscope 1b of Variant 1, the common configurations are designated by the same reference numerals and their descriptions will be omitted as appropriate.

The microscope 1c of Variant 2 is distinguished front the microscope 1a of the first embodiment and the microscope 1b of Variant 1 in that the signal light DL generated in the specimen 24 is received by the detector 29a via the relay lenses 19 and 18, the deflection mirror 17, the relay lenses 16 and 15, and the phase modulation element 14. The signal light DL reflected by the phase modulation element 14 is reflected by the dichroic mirror 20 disposed between the phase modulation element 14 and the collimator lens 12.

After that, the signal light DL passes through the detection filter 28, is focused by the relay lens 27, and is focused to the pinhole of the pinhole plate 30 disposed in front of the detector 29*a*. Then, the signal light DL passes through the pinhole to be detected by the detector 29*a*, is transformed into an electric signal, and is sent to the controller 40 as the signal S1.

The light receiving optical system DTO of the microscope 1*c* of Variant 2 is indicated by a two-dot chain line frame, and includes the objective lens 21, the relay lenses 19 and 18, the deflection mirror 17, the relay lenses 16 and 15, the phase modulation element 14, the dichroic mirror 20, the detection filter 28, the relay lens 27*c*, the pinhole plate 30, the detector 29*a*, and the like.

Among these, the configuration from the objective lens 21 to the dichroic mirror 20 along the optical path of the signal light DL is included in both the light transmitting optical system ILO and the light receiving optical system DTO. The reflecting surface 14*s* of the phase modulation element 14 is the pupil surface IPP of the light transmitting optical system ILO, and is disposed to substantially coincide with a surface that is a pupil surface DPP of the light receiving optical system DTO.

In the microscope 1*c* of Variant 2, like the microscope 1*b* of Variant 1, since the signal light DL generated in the specimen 24 is de-scanned by the deflection mirror 17, regardless of the azimuth angle of the reflecting surface of the deflection mirror 17, the light is focused to the pinhole of the pinhole plate 30 disposed in front of the detector 29*a*. Accordingly, since the microscope 1*c* of Variant 2 also functions as a so-called confocal microscope, the resolution is further improved.

In addition, like the microscope 1*b* of Variant 1, even in the case of detecting the signal light DL that responds linearly to the intensity of the illumination light IL, the above-mentioned background light can be removed.

In the microscope 1*c* of Variant 2, the phase modulation element 14 can correct not only the aberration caused in the illumination light IL by the specimen 24 but also the aberration occurred in the signal light DL by the specimen 24. Accordingly, in the microscope 1*c* of Variant 2, resolution is further improved.

Further, instead of the pinhole plate 30 and the detector 29*a*, an imaging element that acquires a 2-dimensional image may be disposed as a detector at the position where the pinhole plate 30 is disposed.

Observation Method of Second Embodiment

Hereinafter, an observation method of a second embodiment will be described. The observation method of the second embodiment is a method of observing the specimen 24 using the microscopes 1*a* to 1*c* of the above-mentioned first embodiment and variants. The observation method of the second embodiment is most in common with the observation method of the first embodiment described above. Accordingly, hereinafter, differences from the observation method of the first embodiment will be described, and descriptions of common parts will be omitted as appropriate.

In the observation method of the second embodiment, in measurement of the first phase distribution WF1 in step S140 in a flowchart when the observation method of the first embodiment shown in FIG. 3 is executed, compared to the observation method of the first embodiment described above, the total number NP of the phase sampling point Pi to be measured is reduced. Accordingly, for the purpose of calculation of the first phase distribution WF1, i.e., calculation of the phase value of each of the phase sampling points Pi to cancel the aberration induced by the specimen 24, it is possible to reduce the number of signal acquisitions emitted front each sampling point Fj or the number of acquisitions of the image in the vicinity of each sampling point Fj. Accordingly, a measurement time of the first phase distribution WF1 can be reduced, and discoloration and phototoxicity of the specimen 24 can be decreased.

Figure 12:
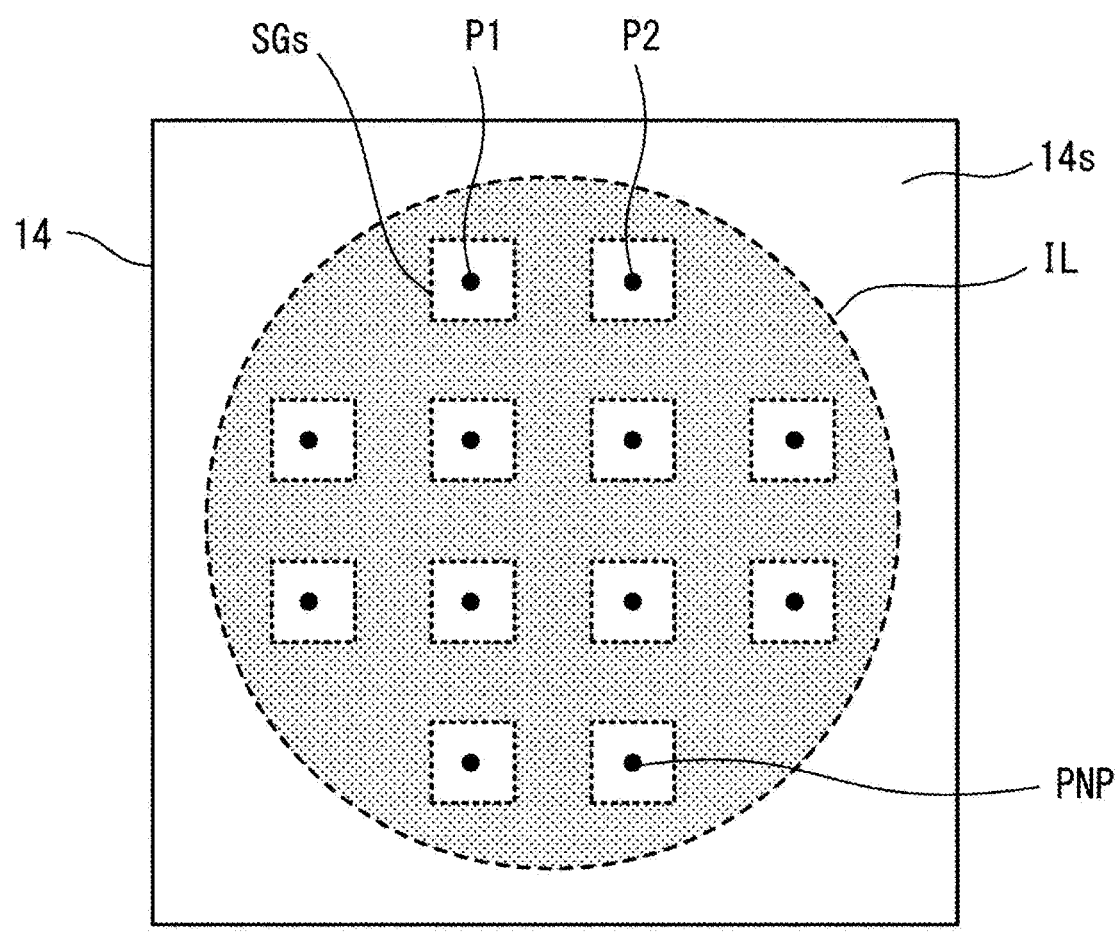
FIG. 12 is a view showing an example of segment division of a phase modulation element in an observation method of a second embodiment.

FIG. 12 is a view showing an example of division of the segments SGa of the phase modulation element 14 in the observation method of the second embodiment, and like FIG. 7A, a view showing the reflecting surface 14*s* of the phase modulation element 14. In the observation method of the second embodiment, the first phase distribution WF1 is measured by changing the phase value of only the segment SGa indicated by the white quadrangle in FIG. 7A. In a dotted area of the reflecting surface 14*s* other than the segments SGa, the first phase distribution WF1 is not measured.

In the observation method of the second embodiment, the total number NP of the phase sampling point Pi used for measurement of the first phase distribution WF1 is reduced compared to the total number in the observation method of the first embodiment shown in FIG. 7A. Then, the segments SGa, each containing the phase sampling point Pi, are discretely disposed on the reflecting surface 14*s*, i.e., the pupil surface IPP.

Hereinafter, referring to FIG. 13, the flow of the measurement of the first phase distribution WF1 (step S140 in the flowchart shown in FIG. 3) in the observation method of the second embodiment will be described.

First, in step S241, the NP segments SGa to perform phase modulation like the segments SGa shown in FIG. 7A are determined. Then, in the loop of the subsequent Nt phase modulation patterns, the Nt phase modulation patterns set in the phase modulation element 14 are set. For example, the relative phase difference between the segments SGa and the areas other than the segments SGa in the reflecting surface 14*s* may set a pattern that changes with different frequencies in time for each segment, or may set different random phase modulation patterns.

In step S241, Nt loops are started to perform the phase modulation a plurality of times for each of the NP segments SGa. This loop may be referred to as a loop of a phase modulation pattern because it performs phase modulation according to different phase modulation patterns on each of the NP segments SGa each time. A loop counter is t.

In step S242, the phase distribution setting unit 49 sends the signal S2 to the phase modulation element 14, and phase value according to the $t^{th}$ phase modulation pattern is set to the NP segments SGa of the phase modulation element 14. After that, the controller 40 opens the shutter 11, irradiates a document 24 with illumination light, and detects a signal emitted front the sampling point Fj. Here, the controller 40 may scan the deflection mirror 17 and acquire the image of the sampling point Fj and the vicinity region thereof based on a signal 1 from the detector 29*a*.

In step S244, the loop of the phase modulation pattern is terminated.

In step S245, the phase distribution measuring unit 46 calculates (measures) the phase values of each of the segments SGa and the phase sampling point Pi corresponding to the aberration induced by the specimen 24, i.e., the first phase distribution WF1, based on the Nt phase modulation patterns set to the phase modulation element 14 in step S243 and Nt signals emitted from the sampling point Fj or Nt images of the vicinity region of the sampling point Fj. Since the method of calculating the phase value of each of the segments SGa in step S245 is the same as the method in the above-mentioned step S146, description thereof will be omitted.

Even in the observation method of the second embodiment, processes other than step S140 in the flow shown in FIG. 3, that is, step S241 to step S245 described above, are the same as the observation method of the first embodiment described above, so description thereof will be omitted.

Observation Method of Third Embodiment

Hereinafter, an observation method of a third embodiment will be described. The observation method of the third embodiment is a method of observing the specimen 24 using the microscopes 1a to 1c of the above-mentioned first embodiment and variants. The observation method of the second embodiment is mostly common to the observation method of the second embodiment described above. Accordingly, hereinafter, differences from the observation method of the first embodiment will be described, and descriptions of common parts will be omitted as appropriate.

In the above-mentioned observation method of the second embodiment, at the one sampling point F in the specimen 24, acquisition of the plurality of signals (images) is performed while changing the phase modulation pattern of the phase modulation element 14. After that, acquisition of the plurality of signals (images) is performed while moving to the next sampling point F and changing the phase modulation pattern of the phase modulation element 14.

On the other hand, in the third embodiment, after setting one predetermined phase modulation pattern in the phase modulation element 14, signal acquisition of a predetermined area in the field of view in the specimen 24 is sequentially performed. After that, the difference is that the phase modulation pattern set in the phase modulation element 14 is changed, and the signal acquisition of the predetermined area in the field of view in the specimen 24 is sequentially performed again.

Figure 14:
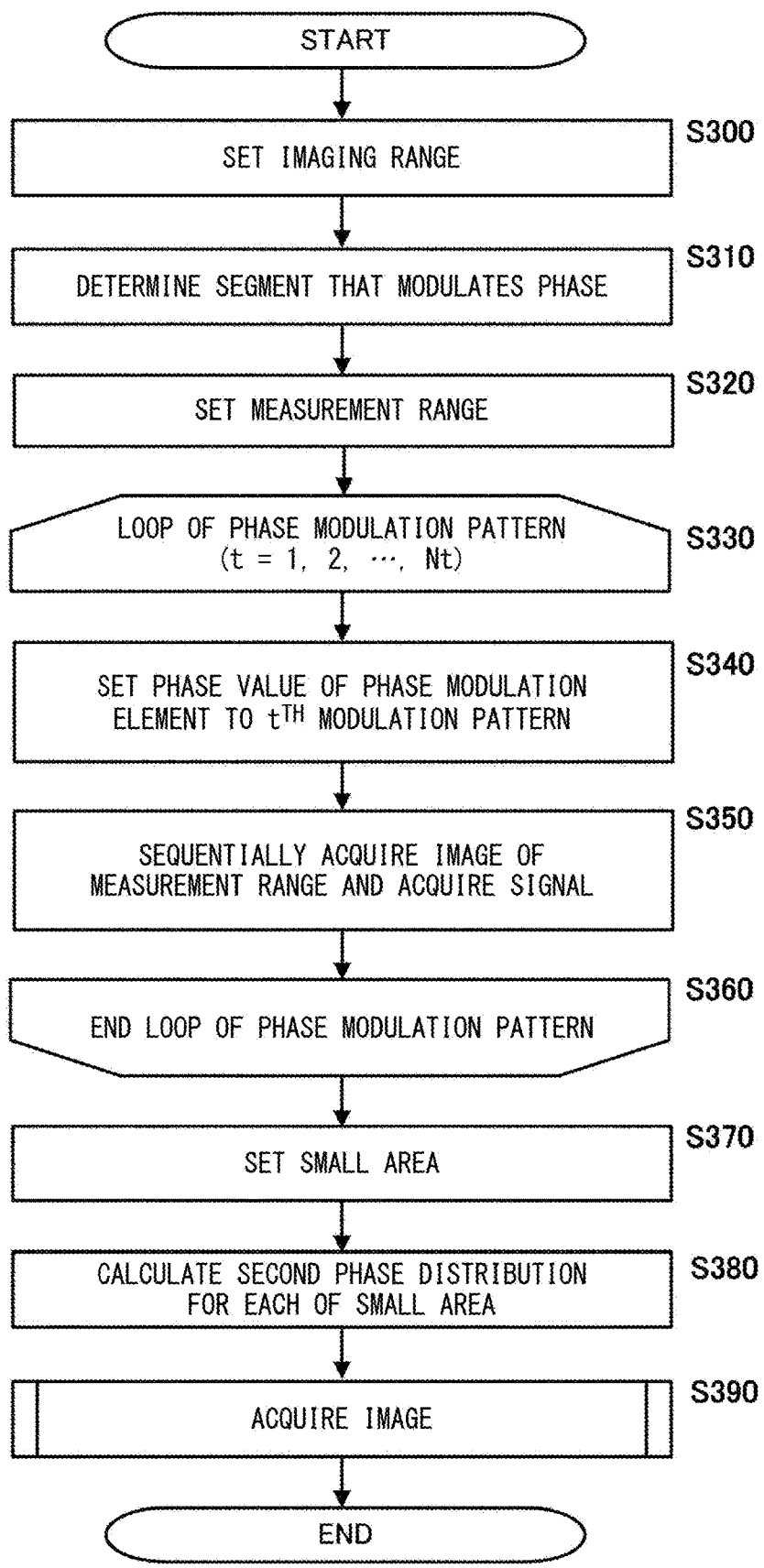
FIG. 14 is a view showing a flow of an observation method of a third embodiment.

FIG. 14 is a view showing a flow of the observation method of the third embodiment. First, the imaging range IR is set in step S300. The contents executed in step S300 are the same as step S100 in the flow of the observation method of the first embodiment and the second embodiment shown in FIG. 3.

Figure 13:
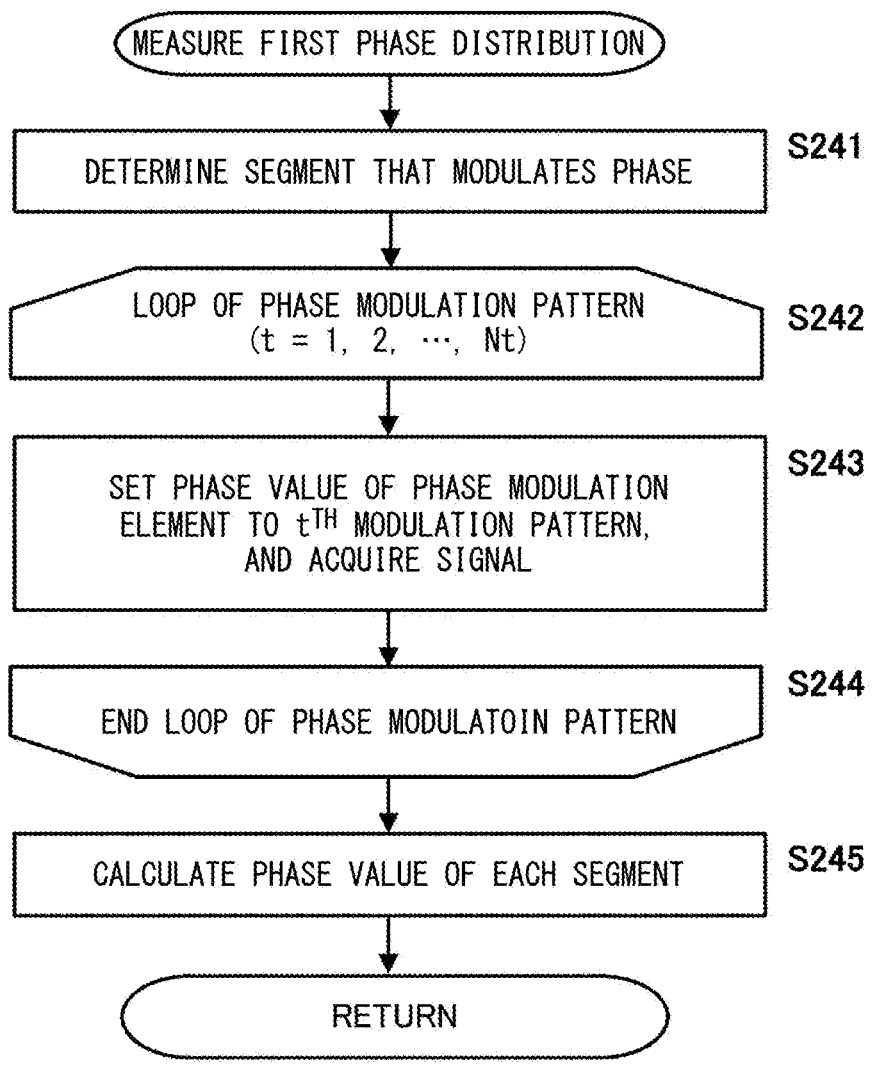
FIG. 13 is a view showing a flow of measurement of a first phase distribution in the observation method of the second embodiment.

In the subsequent step S310, similar to step S241 in the flow of the observation method of the second embodiment shown in FIG. 13, the segments SGa that perform phase modulation on the phase modulation element 14 and the plurality of phase modulation patterns to be used in the subsequent loop are determined.

In step S320, measurement ranges in the x direction, the y direction and the z direction of the first phase distribution WF1 (see FIG. 2A) are set. For example, the imaging range IR set by the user in step S300 may be set partially or entirely as the measurement range of the first phase distribution WF1.

In step S330, a loop of Nt times for performing phase modulation a plurality of times for each of the NP segments SGa, that is, a loop of the phase modulation pattern is started. The loop counter is t.

In step S340, the phase distribution setting unit 49 sends the signal S2 to the phase modulation element 14, and the phase value is set to the NP segments SGa of the phase modulation element 14 according to the $t^{th}$ phase modulation pattern.

Then, in step S350, the controller 40 performs scanning of the deflection mirror 17 and driving of the objective lens 21 or the stage 25 in the z direction, and acquires a signal emitted from the sample 24 in the measurement range determined in step S320.

In step S360, the loop of the phase modulation pattern is terminated.

In step S370, similar to step S170 in the flow of the observation method of the first embodiment and the second embodiment, the imaging range IR is divided and the plurality of small areas R are set.

In step S380, based on the signal in the acquired measurement range in step S350 in the loop of the phase modulation pattern, the second phase distribution WF2 for each of the small areas R is calculated. In doing so, the plurality of sampling points F for which the calculation of the first phase distribution WF1 is performed are determined within the measurement range in which the signal was acquired in step S350.

For example, within the measurement range in which the signal is acquired in step S350 using a predetermined $t^{th}$ phase modulation pattern, a plurality of NF positions (coordinates (x, y, z)) may be selected as the sampling points F in descending order of signal intensity. As the sampling points F, the phase data error due to noise can be reduced by selecting points with high signal intensity.

The phase distribution measuring unit 46 performs the same processing as the processing in step S245 in the observation method of the second embodiment based on the Nt phase modulation patterns set in the phase modulation element 14, and the Nt detection signals of each of the sampling points F. Accordingly, the phase distribution measuring unit 46 calculates (measures) the phase value at a center position Pi of each of the segments SGa on the phase modulation element 14, i.e., the first phase distribution WF1.

In step S380, further, similar to step S180 of the observation method of the first embodiment and the second embodiment, the phase distribution calculation unit 47 performs calculation of the second phase distribution WF2 with respect to the NR small areas R based on the first phase distribution WF1 measured at each of the plurality of sampling points.

In the subsequent step S390, similar to step S190 of the observation method of the first embodiment and the second embodiment, the phase distribution setting unit 49 sends the signal S2 to the phase modulation element 14, the image of the specimen 24 in the imaging range IR is acquired in a state in which the calculated second phase distribution WF2 is set to the illumination light IL.

When the phase modulation element 14 that requires a relatively long time to change the phase modulation pattern, the measurement time of the first phase distribution WF1 becomes longer as the number of phase modulation pattern change of the phase modulation element 14 is increased during measurement of the first phase distribution WF1. For example, when the liquid crystal SLM is used as the phase modulation element 14, liquid crystal response time becomes rate-limiting and measurement time becomes longer.

In the observation method of the third embodiment, detection of the signal from the predetermined area within a field of view in a state in which the predetermined phase modulation pattern is set to the phase modulation element 14 is performed, and then, a process of changing the phase modulation pattern of the phase modulation element 14 is repeated. Accordingly, the number of changing the phase modulation pattern of the phase modulation element 14 can be reduced, and time required for measurement of the first phase distribution WF1 can be reduced.

Observation Method of Fourth Embodiment

Hereinafter, an observation method of a fourth embodiment will be described. The observation method of the fourth embodiment is a method of observing the specimen 24 using the microscopes 1a to 1c of the above-mentioned first embodiment and variants.

In the observation method of the fourth embodiment, a method measuring the first phase distribution WF1 in step S140 and a method of calculating the second phase distribution WF2 in step S180, which are above-mentioned, are different from the observation method of the first embodiment and the second embodiment. However, other steps are the same as the observation method of the first embodiment and the second embodiment shown in FIG. 3.

In the observation method of the fourth embodiment, during measurement of the first phase distribution WF1 in step S140, the phase value set to the phase modulation element 14 is expressed, each of the sampling points F is detected (imaged) while changing an coefficient value of each mode of the basis function described below, and a coefficient value of each mode of the basis function where the estimated value calculated based on the detected signal is maximized is obtained.

A term number of the basis function is set to NB, an $m^{th}$ (m=1, 2, ..., NB) term of the basis function is hm (x, y), and a coefficient value of an $m^{th}$ term in the sampling point Fj is set to bj and m. Here, a phase value $\Phi$ (xFj, yFj, zFj; xP, yP) of a point (xP, yP) on the pupil surface IPP of the first phase distribution WF1 measured at a point Fj is expressed as Equation (25).

[Math. 25]

$$\Phi(x_{Fj}, y_{Fj}, z_{Fj}; x_P, y_P) = \sum_{m=1}^{N_H} b_{j,m} h_m(x_P, y_P) \quad (25)$$

Hereinafter, an $m^{th}$ component hm (xP, yP) of the basis function is also referred to as "a mode m" of the basis function.

For example, a Zernike polynomial expression, a Legendre polynomial expression, a trigonometric function, a wavelet function, or the like, may be used as the basis function. When the following step S441 to step S452 are executed, NB coefficient values bj, 1, bj, 2, ..., bj, and NB are stored in the storage.

Figure 15:
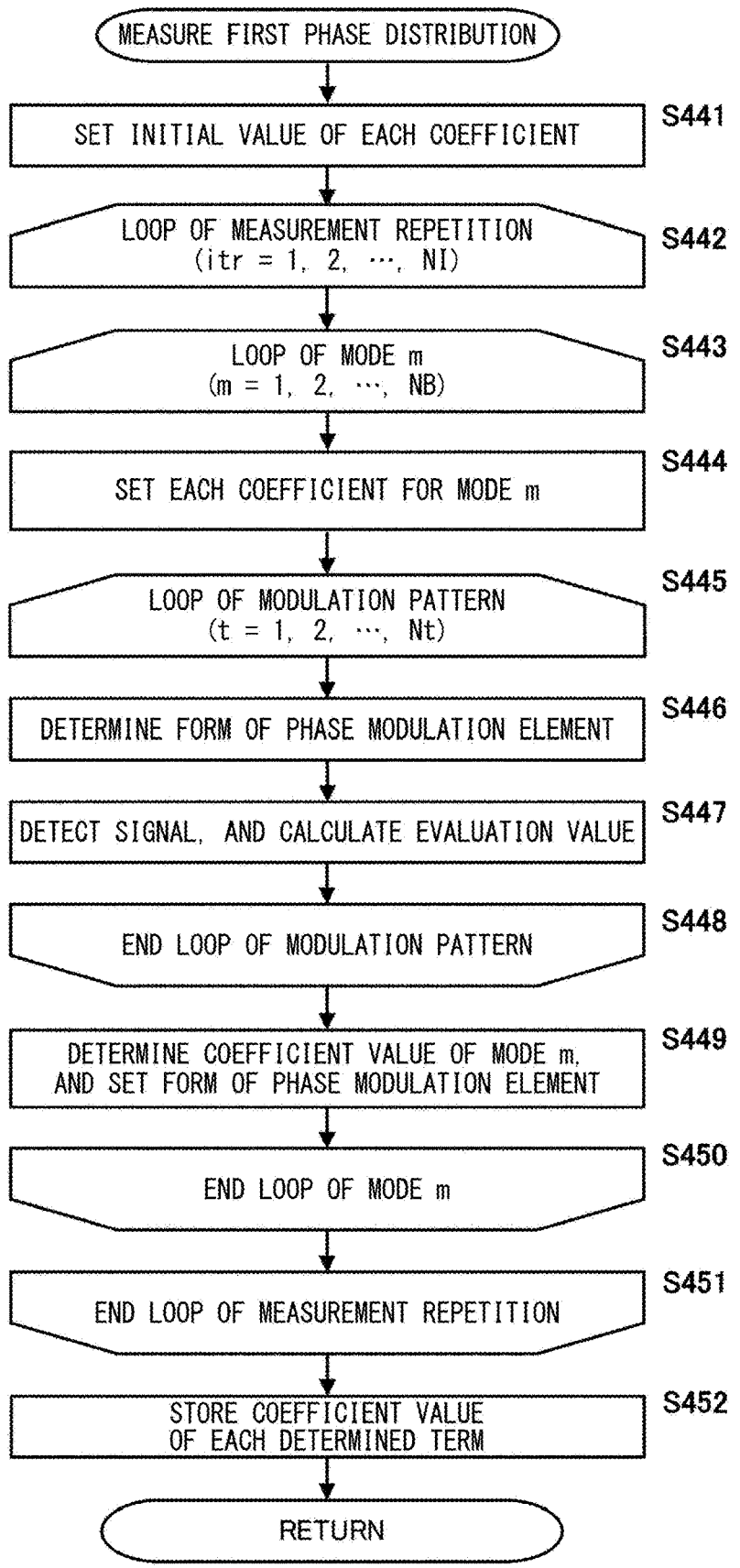
FIG. 15 is a view showing a flow of measurement of a first phase distribution in an observation method of a fourth embodiment.

FIG. 15 is a view showing a flow of measurement of the first phase distribution WF in the observation method of the fourth embodiment.

First, in step S441, the coefficient value of each mode of the basis function is set to the initial value and stored in the storage 42. Specifically, as an example, it is set to b m'=0 (m'=1, 2, ..., NB). Here, m', like m, represents $m^{th}$ in the basis function. Since m is used as a loop counter in step S443, which will be described later, m' is used instead of m to avoid confusion.

In step S442, a loop of processing of measuring the first phase distribution WF1 is started. Then, regarding processing up to step S451, which will be described later, a loop from itr=1 to itr=NI is repeated NI times for subscript itr of the number of repetitions.

In step S443, a loop for the mode m is started. Then, regarding processing up to step S450, which will be described later, a loop from m=1 to m=NB is repeated NB times for subscript m of the mode m.

In step S444, Nt coefficient values b m(t) (t=1, 2, ..., Nt) for the mode m are set in preparation for Nt loops for a loop counter t starting from step S445. As the coefficient values b m(t), for example, a predetermined numerical value range may be divided and set at equal intervals. In addition, a numerical value range may be changed according to a loop counter itr. For example, by narrowing the numerical value range as itr increases, it is possible to accurately determine the coefficient values b m(t) for each basis function mode. The current coefficient value of the mode m is stored in the storage 42 as b old.

In step S445, a loop is started that changes the shape of the phase modulation element Nt times for the basis function of the mode m. As described above, this loop may be referred to as the loop of the phase modulation pattern. The loop counter is set as t, the loop up to step S448 is repeated Nt times from t=1 to t=Nt.

In step S446, a coefficient value b m of the mode m of the basis function is changed to b m=b old+b m(t), and for the phase value of the phase modulation element 14, the phase modulation pattern represented by the linear sum of the basis function whose coefficient value of each mode is b m' (m'=1, 2, ..., NB) is set. Then, the specimen 24 is irradiated with the illumination light IL, and the signal light DL emitted from the specimen 24 is detected by the detector 29a. The detection may be performed by scanning the predetermined range of the specimen 24 centering on the focusing point FP with the illumination light IL.

The phase distribution measuring unit 46 calculates an estimated value V(t) based on the detected signal S1. As the estimated value V(t), for example, an integrated value of the signal S1 emitted from the specimen 24 may be used. For example, the estimated value V(t) may be calculated based on the image created by scanning the specimen 24. As the estimated value based on the image, for example, at least one of the contrast of the image, the maximum luminance value, the standard deviation of the luminance value, and an integrated value of the power spectrum of the predetermined frequency range when the image is Fourier-transformed, may be used. In addition, a correlating value between the plurality of images acquired by scanning the specimen 24 a plurality of times may also be used.

In addition, a cutoff frequency of an image calculated based on Fourier ring correlation simplifies image restoration in fluorescence microscopy, nature communications 10, Article number: 3103 (2019), which is a known document, may also be used.

Further, the plurality of estimated values may be combined and used.

In step S448, the loop of the phase modulation pattern is terminated.

In step S449, an appropriate coefficient value h m* of the mode m is determined based on the estimated value acquired while changing b m Nm times. As b m*, for example, b m(t) set in step S444 may be selected for t where V(t) takes the maximum value. As b m*, for example, V(t) is expressed as a function with b m(t) as an argument, and the data points of function V(t) may be interpolated to calculate the coefficient value b m with an estimated value V as the maximum. As a method of performing interpolation of data points, for example, Lagrange interpolation, Newton interpolation, Hermite interpolation, spline interpolation, or the like, can be used. As b m*, for example, based on the function approximation of the function V(t), the coefficient value b m with the estimated value V as the maximum may be calculated. It is possible to use, for example, a secondary function, a Gaussian function, or the like, as an approximation function.

After that, it is set as b=b m*, and the phase modulation pattern represented by the linear sum of the basis function whose coefficient value of each mode is b m' (m'=1, 2, . . . , NB) is set to the phase modulation element 14.

In step S450, the loop for the mode m is terminated.

The loop of the measurement repetition is terminated in step S451.

By the above-mentioned steps, the first calculation and determination of the coefficient value b m of each mode of the basis function are terminated.

However, the coefficient value b m of each mode is not always determined and set to the optimum value by performing the above-mentioned so-called optimization only once.

Here, if necessary, the processing from step S442 to step S451 is repeated the required number of times (NI times), and the coefficient value b m of each mode becomes closer to the optimum value.

In step S452, the coefficient value b m' (m'=1, 2, . . . , NB) of each mode of the basis function determined by the above-mentioned high and low is stored in the storage 42 as the first phase distribution WF1 at the current sampling point Fj.

As described above, the measurement is terminated at the first phase distribution WF1 in the observation method of the fourth embodiment.

Next, regarding the calculation of the second phase distribution WF2 for each of the small areas R in step S180 of the flow shown in FIG. 3, the calculation method in the observation method of the fourth embodiment will be described.

By executing the loop of step S120 to step S160 of the flow shown in FIG. 3, NF×NB coefficient values $b_{1,1}$, $b_{1,2}$, . . . , $b_{NE, NB}$ are obtained and stored in the storage 42. Here, after solving the inverse problem from the calculated coefficient value and determining the model parameters, the coefficient value of the basis function expressing the second phase distribution WF2 in the small areas Rj' is calculated by solving the forward problem. As a specific example, a method using the above-mentioned phase layer model will be described.

In the above-mentioned observation method of the first embodiment and the second embodiment, when the phase values at the plurality of phase sampling points Pi on the pupil surface IPP are obtained as the first phase distribution WF1, the model parameters was obtained using the model expressed by Equation (24).

Like the fourth embodiment, when the first phase distribution WF1 is expressed as a sum of the basis functions, by multiplying each partial matrix of Equation (24) by the transformation matrix to the coefficient values b j and m of the basis function, it is possible to express the relation between the model parameters and the coefficient values b j and m of the basis function.

The coefficients b j and m of the basis function measured at the sampling point Fj are arranged vertically from m=1 to m=NB, and the vector is expressed as b Fj like Equation (26).

[Math. 26]

$$b_{Fj} = \begin{pmatrix} b_{j,1} \\ \vdots \\ b_{j,N_B} \end{pmatrix} \quad (26)$$

Equation (25) can be expressed as Equation (27) using a matrix H.

[Math. 27]

$$\Phi_{Fj} = \begin{pmatrix} \Phi(x_{Fj}, y_{Fj}, z_{Fj}; x_{P1}, y_{P1}) \\ \vdots \\ \Phi(x_{Fj}, y_{Fj}, z_{Fj}; x_{PN_P}, y_{PN_P}) \end{pmatrix} = \quad (27)$$

$$\begin{pmatrix} h_i(x_{P1}, y_{P1}) & \cdots & h_{N_B}(x_{P1}, y_{P1}) \\ \vdots & \ddots & \vdots \\ h_i(x_{PN_P}, y_{PN_P}) & \cdots & h_{N_B}(x_{PN_P}, y_{PN_P}) \end{pmatrix} \begin{pmatrix} b_{j,1} \\ \vdots \\ b_{j,N_B} \end{pmatrix} = H b_{Fj}$$

Here, $(xP_1, yP_1)$, $(xP_2, yP_2)$, . . . , $(xP_{NP}, yP_{NP})$ are coordinates of the NP phase sampling point Pi on the pupil surface IPP. In this embodiment, the phase value on the phase sampling point Pi is not directly measured, but only used during the calculation of the model creation process. The phase sampling point Pi is set in advance so that Np≥NB. It is desirable to set a sufficiently large Np in order to improve calculation accuracy.

Assuming that the phase value $\Phi_{Fj}$ on the pupil surface IPP of the first phase distribution WF1 is known, the coefficient value of the basis function can be obtained by a least square method, and the least square solution of bFj is expressed as Equation (28).

[Math. 28]

$$b_{Fj} = (H^T H)^{-1} H^T \Phi_{Fj} \quad (28)$$

From Equation (28), $(H^T H)^{-1} H^T$ is obtained as a transformation matrix that transforms the phase value on the pupil surface IPP into the measured coefficient value vector bFj of the basis function.

A relation between the measured coefficient value vector b Fj and the model parameter vector $\alpha_P, \alpha_{L1}, \ldots, \alpha_{LNL}$ can be expressed as Equation (29) by performing basis transformation using a matrix $(H^T H)^{-1} H^T$ with respect to Equation (24).

[Math. 29]

$$\begin{pmatrix} b_{F1} \\ b_{F2} \\ \vdots \\ b_{FN_P} \end{pmatrix} = \begin{pmatrix} (H^T H)^{-1} H^T A_P & (H^T H)^{-1} H^T A_{1,1} & \cdots & (H^T H)^{-1} H^T A_{j,N_L} \\ (H^T H)^{-1} H^T A_P & (H^T H)^{-1} H^T A_{2,1} & \cdots & (H^T H)^{-1} H^T A_{2,N_L} \\ \vdots & \vdots & \ddots & \vdots \\ (H^T H)^{-1} H^T A_P & (H^T H)^{-1} H^T A_{N_F,1} & \cdots & (H^T H)^{-1} H^T A_{N_F,N_L} \end{pmatrix} \begin{pmatrix} \alpha_P \\ \alpha_{L1} \\ \vdots \\ \alpha_{L N_L} \end{pmatrix} \quad (29)$$

The model parameter vectors $\alpha_P, \alpha_{L1}, \ldots, \alpha_{LNL}$ can be determined from measured coefficient value vectors bF1, bF2, ..., bFNF by solving the inverse problem based on Equation (2) using a linear model expressed as Equation (29).

Next, a method of calculating the second phase distribution WF2 of the $j^{th}$ small areas Rj' based on the determined model parameter vectors $\alpha_P, \alpha_{L1}, \ldots, \alpha_{LNL}$ will be described. The second phase distribution WF2 in the small areas Rj' is expressed as a linear sum of an orthonormal function like Equation (30).

[Math. 31]

$$\Phi_{Rj'} = \begin{pmatrix} \Phi(x_{Rj'}, y_{Rj'}, z_{Rj'}; x_{P1}, y_{P1}) \\ \vdots \\ \Phi(x_{Rj'}, y_{Rj'}, z_{Rj'}; x_{PN_P}, y_{PN_P}) \end{pmatrix} = \tag{31}$$

$$\begin{pmatrix} h'_1(x_{P1}, y_{P1}) & \cdots & h'_{NB'}(x_{P1}, y_{P1}) \\ \vdots & \ddots & \vdots \\ h'_1(x_{PN_P}, y_{PN_P}) & \cdots & h'_{N_{B'}}(x_{PN_P}, y_{PN_P}) \end{pmatrix} \begin{pmatrix} b'_{j',1} \\ \vdots \\ b'_{j',N_{B'}} \end{pmatrix} = H'b'_j$$

Equation (32) is obtained by applying a basis transformation based on the least square method to Equation (31) in the same way as Equation (29).

[Math. 32]

$$\begin{pmatrix} b_{j',1} \\ \vdots \\ b_{j',N_{PE}} \end{pmatrix} = \left( (H'^T H')^{-1} H' A_P \quad (H'^T H')^{-1} H' A_{j',1} \quad \cdots \quad (H'^T H')^{-1} H' A_{j',N_L} \right) \begin{pmatrix} \alpha_P \\ \alpha_{L1} \\ \vdots \\ \alpha_{LN_L} \end{pmatrix} \tag{32}$$

[Math. 30]

$$\Phi(x_{Rj'}, y_{Rj'}, z_{Rj'}; x_P, y_P) = \sum_{m=1}^{N'_B} b'_{j',m} h'_m(x_P, y_P) \tag{30}$$

Here, in the (xP, yP), the coordinates, $\Phi$ (xRj', yRj', zRj'; xP, yP) of the pupil surface IPP is the phase value at the coordinates (xP, yP) on the pupil surface IPP, i.e., a value of the second phase distribution WF2. In addition, the term number of the basis function used in the aberration correction is expressed as NB', the $m^{th}$ (m=1, 2, ..., NB) term of the basis function used in the aberration correction is expressed as h'$_m$ (x, y) and the coefficient value of the $m^{th}$ term is expressed as b'j' and m.

Further, for the basis function h'm (xP, yP) used for aberration correction, a basis function different from the basis function hm (xP, yP) used in measurement of the first phase distribution WF1 may be selected. In addition, the term number NB' used in aberration estimation may be set as the term number NB used in measurement of the first phase distribution WF1. In particular, when it is set to NB'>NB, aberration with a higher degree of freedom than in measurement of the first phase distribution WF1 can be estimated, and an image quality improvement effect can be improved using this for aberration correction. From this, it can be said that the amount of information that characterizes the second phase distribution WF2 may be set to be larger than the amount of information that characterizes the first phase distribution WF1.

Equation (30) can be written as Equation (31) using a matrix like Equation (27).

The second phase distribution WF2 in a $j^{th}$ small area Rj' is calculated using coefficient values h'j' and m of the basis function of Equation (32).

Even in the observation method of the fourth embodiment, the phase distribution calculation unit 47 performs a series of processing related to the calculation of the second phase distribution WF2 described above.

The observation method of the fourth embodiment is suitable for use in the microscope 1a using an element that can continuously change the phase value of the phase modulation element 14, such as a deformable mirror, an adaptive lens, or a liquid lens, as the phase modulation element 14. These elements can usually set the phase value to the desired distribution by spatially continuously changing the shape of the reflecting surface 14s or the spatial distribution of the thickness of the element according to the voltage applied to the plurality of actuators.

In general, the phase value (wave surface shape) modulated by these elements is often expressed in the form of a linear sum of the basis function such as a Zernike polynomial expression or the like. By calibrating the relation between the application voltage to the actuator and the coefficient value of the basis function that expresses the wave surface shape in advance, it is possible to control the modulation wave surface shape as a linear sum of the basis function using arbitrary coefficients.

Further, since the phase value added by the phase modulation element 14 changes continuously in the pupil surface IPP, these elements also have the effect of reducing a decrease in light use efficiency due to diffraction.

Meanwhile, in the observation method from the first embodiment to the third embodiment, as the phase modulation element 14, it is suitable for use in the microscope 1a using elements having unit elements such as a liquid crystal SLM, a MEMS-SLM, or the like, each of which can independently control the phase value.

Further, in the observation method from the first embodiment to the third embodiment, it is also possible to use the phase modulation element 14, an added phase value of which changes continuously within the pupil surface IPP. In addition, in the observation method of the fourth embodiment, the phase modulation element 14 which has a unit element that can control a phase value independently may be used.

Microscope of Second Embodiment

Figure 16:
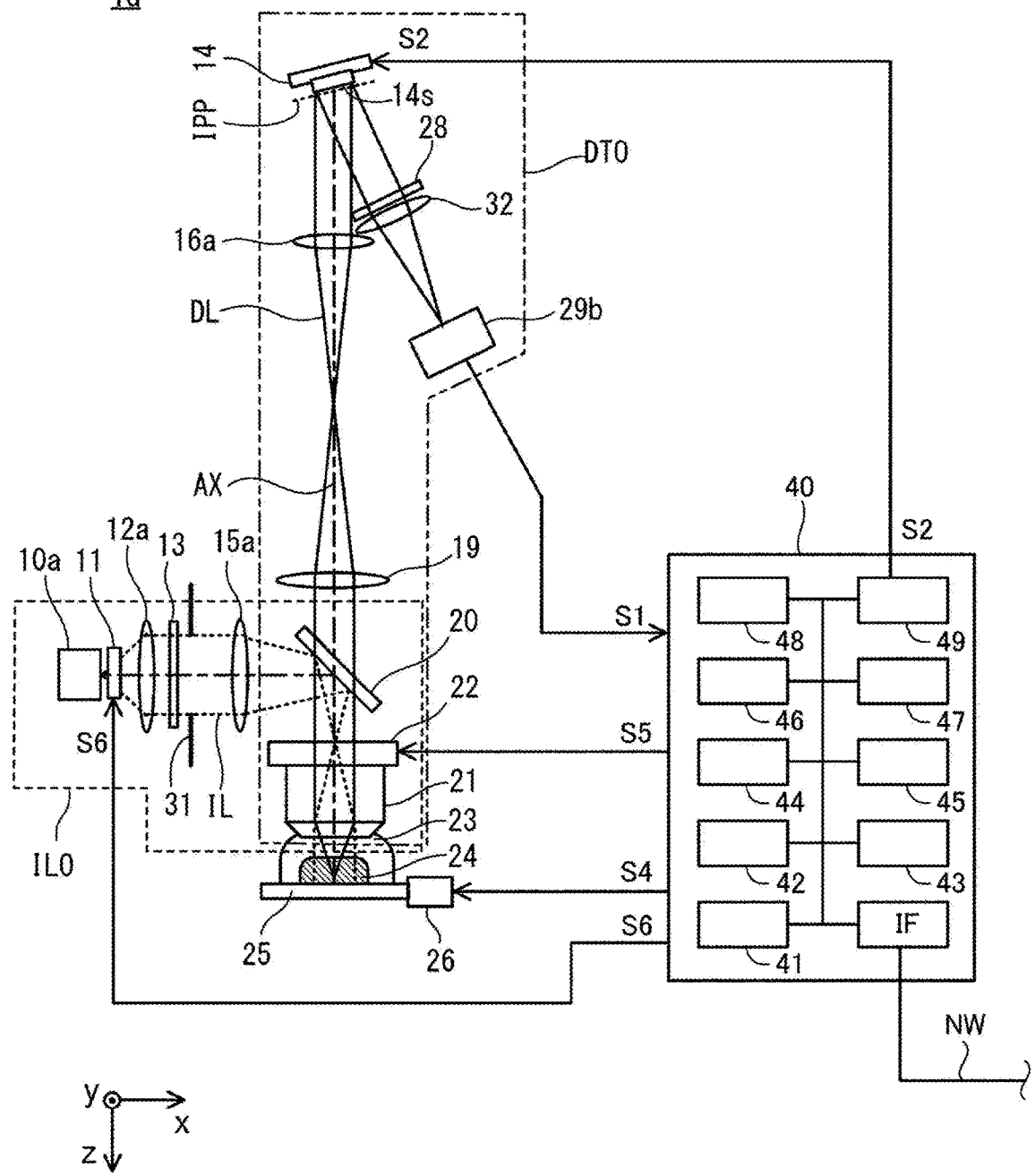
FIG. 16 is a view showing a configuration of a microscope of the second embodiment.

Hereinafter, a microscope 1d according to the second embodiment will be described with reference to FIG. 16. Since the configuration of the microscope 1d of the second embodiment has many configurations in common with the microscope 1a of the first embodiment described above, hereinafter, the same reference numerals designate the common configurations, and description thereof will be omitted as appropriate.

The microscope 1d of the second embodiment is distinguished from the microscope 1a of the first embodiment in that it is a vertical illumination fluorescence microscope with a wide field of view. The light source 10a emits the illumination light IL to illuminate the specimen 24. As the light source 10a, for example, a mercury lamp, an LED, or the like, is used.

The collimator lens 12a makes the illumination light IL emitted from the light source 10a substantially parallel light. An illumination filter 13 transmits at least part of the illumination light IL emitted from the light source 10 and blocks other light. A field diaphragm 31 is provided at a position conjugate with the focal position of the objective lens 21 to limit the area where the specimen 24 is illuminated. The relay lens 15a guides the illumination light IL which is substantially parallel light, to the dichroic mirror 20 while converging it. The dichroic mirror 20 has the characteristic of reflecting the illumination light IL from the light source 10a and transmitting light (for example, fluorescence) of the signal light DL generated in the specimen 24 in a predetermined wavelength range.

The signal light DL emitted from the specimen 24 passes through the dichroic mirror 20, the second objective lens 19, and the relay lens 16a, and enters the phase modulation element 14. The signal light DL reflected by the phase modulation element 14 is imaged on a 2-dimensional detector 29b. The 2-dimensional detector 29b has a function of detecting the signal light DL generated in the specimen 24, and for example, a CCD camera, a CMOS camera, or the like, is used.

Further, the 2-dimensional detector 29b is also a detector that detects the signal light DL.

The 2-dimensional detector 29b performs photoelectric conversion of the entered signal light DL, and generates data (the signal S1) corresponding to intensity of light (brightness) thereof as a detection signal. The controller 40 generates a piece of image data based on a plurality of pixels (the signal S1) input from the 2-dimensional detector 29b, and stores the data in the storage 42.

The microscope 1d of the second embodiment is different from the microscopes 1a to 1c of the above-mentioned first embodiment and variants thereof, and the phase modulation element 14 is placed in the light receiving optical system DTO instead of the light transmitting optical system ILO. Specifically, the phase modulation element 14 is disposed to substantially coincide with the pupil surface DPP with respect to the specimen 24 in the light receiving optical system DTO. Accordingly, the phase modulation element 14 provides a predetermined phase value to the signal light DL, not to the illumination light IL.

Accordingly, in the microscope 1d of the second embodiment, the first phase distribution WF1 and the second phase distribution WF2 are not the phase distribution added to the illumination light IL to cancel the aberration induced by the specimen 24, and are phase distributions added to the signal light DL to cancel the aberration induced by the specimen 24.

However, even in this case, the measurement of the first phase distribution WF1 and the calculation of the second phase distribution WF2 can be performed by the same method as the method described in the observation method of the fourth embodiment described above.

The microscope 1d of the second embodiment is suitable for use with the observation method of the fourth embodiment mentioned above. However, acquisition of the pixel near the sampling points F of the specimen 24 and acquisition of the pixel near the detection points U of the specimen 24 are performed by acquiring the image using the 2-dimensional detector 29b, instead of scanning and acquiring the focusing point FP of the illumination light IL with respect to the specimen 24.

Since the microscope 1d of the second embodiment uses the 2-dimensional detector 29b to image a wide-range area of the specimen 24 at once, the image acquisition of the specimen 24 can be performed at high speed, that is, in a short time.

Microscope of Third Embodiment

Hereinafter, a microscope 1e of a third embodiment will be described with reference to FIG. 17. The configuration of the microscope 1e of the third embodiment shares many configurations with the microscope 1c of Variant 2 of the first embodiment described above. Hereinafter, the same reference numerals designate the common configurations, and the description thereof will be omitted as appropriate.

The microscope 1e of the third embodiment is distinguished from the microscope 1c of Variant 2 of the above-mentioned first embodiment in that it has a wave surface sensor 33 configured to measure the first phase distribution WF1. Then, the configuration other than the wave surface sensor 33 is the same as the microscope 1c of Variant 2 of the first embodiment shown in FIG. 11. Since the microscope 1e of the third embodiment, measures the first phase distribution WF1 using the wave surface sensor 33, the first phase distribution WF1 can be measured in a short time.

In the light receiving optical system DTO of the microscope 1e of the third embodiment, a detachable mirror 32 detachably attached to the optical path of the signal light DL is provided in front of the detection filter 28 and the relay lens 27c after they branch from the light transmitting optical system ILO by the dichroic mirror 20. When the signal light DL is reflected by the detachable mirror 32, the signal light DL arrives at the pinhole plate 30 and is detected by the detector 29a. Then, the signal light DL is photo-electrically converted by the detector 29a and sent to the controller 40 as a signal S1a.

Meanwhile, when the detachable mirror 32 has been removed from the optical path of the signal light DL, the signal light DL passes through a pinhole of a second pinhole plate 30a, is converted into substantially parallel light by the relay lens 27d, and reaches the wave surface sensor 33. The wave surface sensor 33 measures wave surface information (phase distribution) of the signal light DL. Then, the wave surface information of the signal light DL is sent to the controller 40 as a signal S1b.

Further, the wave surface sensor 33 is still a detector configured to detect DL. A beam splitter may be used instead of the detachable mirror 32 so that part of the signal light DL reaches the detector 29a and the rest reaches the wave surface sensor 33.

The phase distribution measuring unit 46 of the controller 40 measures the first phase distribution WF1 based on the signal S1b sent from the wave surface sensor 33. However, the phase distribution measuring unit 46 may measure the first phase distribution WF1 based on the signal S1a sent from the detector 29a.

The image generating unit 48 of the controller 40 forms an image of the specimen 24 based on the signal S1a sent from the detector 29a.

The second pinhole plate 30a reduces background light incident on the wave surface sensor 33 and also functions as a low-pass filter, and improves measurement accuracy of the wave surface sensor 33 by blocking high-order aberration components of the wave surface. As an example of the wave surface sensor 33, a Shack Hartman wave surface sensor or the like is used.

Observation Method of Fifth Embodiment

Figure 17:
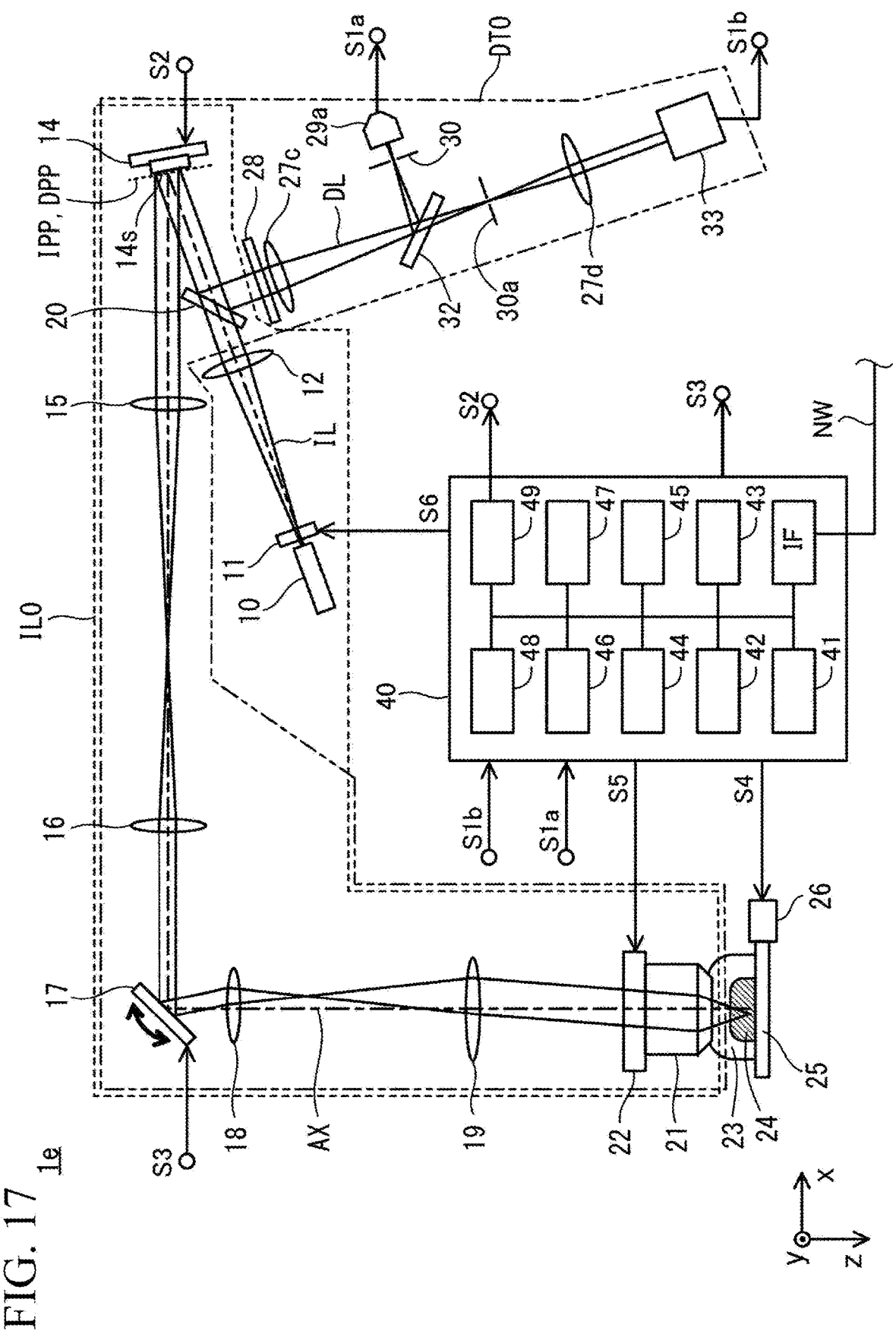
FIG. 17 is a view showing a configuration of a microscope of the third embodiment.

An observation method of a fifth embodiment is a method of observing the specimen 24 using the microscope 1e of the above-mentioned third embodiment shown in FIG. 17. Since most of the observation method of the fifth embodiment is the same as the observation method of the first embodiment shown in the flow of FIG. 3, hereinafter description thereof will be omitted as appropriate.

Figure 18:
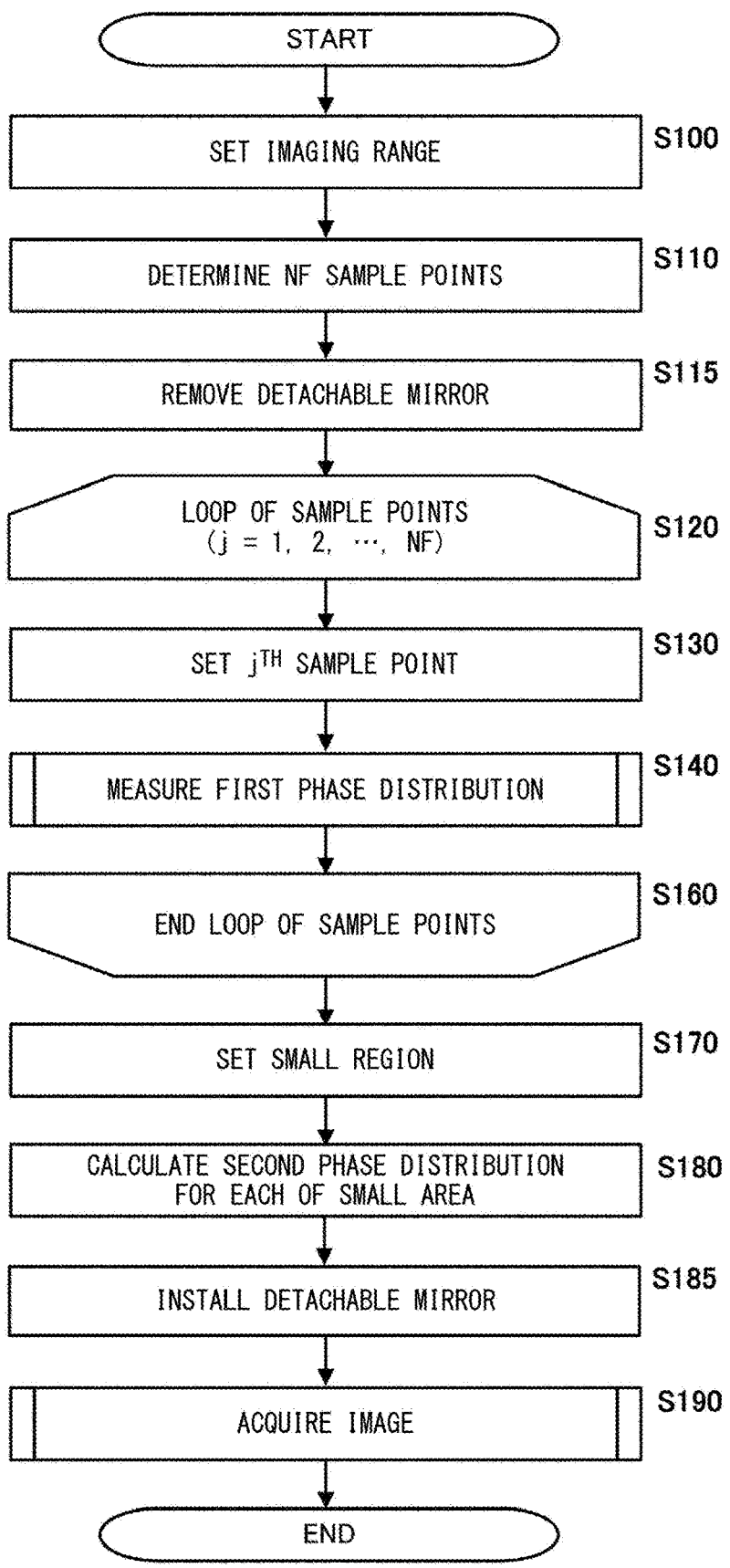
FIG. 18 is a view showing a flow of an observation method of a fifth embodiment.

FIG. 18 is a view showing a flow of the observation method of the fifth embodiment. However, the flow is the same as that of the observation method of the first embodiment shown in FIG. 3 except that step S115 is inserted between step S110 and step S120 and step S185 is inserted between step S180 and step S190.

That is, in the flow of the observation method of the fifth embodiment, in step S115 after execution of step S110, the detachable mirror 32 is removed from the optical path of the signal light DL. Then, in step S120 to step S160, the signal light DL is received by the wave surface sensor 33, and the first phase distribution WF1 as wave surface data is measured.

After execution of step S180, the detachable mirror 32 is installed into the optical path of the signal light DL. Then, in step S190, the signal light DL is received by the detector 29a, and the image of the specimen 24 is acquired.

Further, in calculation of the second phase distribution WF2 for each of the small areas R in step S180, the same calculation as in the observation method of the first embodiment may be performed using the phase value of the portion of the first phase distribution WF1 measured by the wave surface sensor 33 corresponding to the phase sampling point P shown in FIG. 2A. Alternatively, the same calculation as in the observation method of the fourth embodiment may be performed based on the obtained coefficient value of the basis function by fitting the distribution of the inclination of the wave surface in the x direction and the y direction measured by the wave surface sensor 33 with the function obtained by differentiating the basis function in the x direction and the y direction.

Microscope of Variant 1 of Third Embodiment

Hereinafter, a microscope 1f of Variant 1 of a third embodiment will be described with reference to FIG. 19. The configuration of the microscope 1f of Variant 1 of the third embodiment shares many configurations with the microscope 1e of the third embodiment described above or the microscope 1b of Variant 1 of the first embodiment. Hereinafter, the same reference numerals designate the common configurations, and description thereof will be omitted as appropriate.

In the microscope 1f of Variant 1 of the third embodiment, the configuration (the detection filter 28, the relay lens 27, the detachable mirror 32, the detector 29a, the wave surface sensor 33, and the like) of the portion of the light receiving optical system DTO which is branched off from the light transmitting optical system ILO by the dichroic mirror 20 is the same as the configuration in the microscope 1e of the above-mentioned third embodiment. However, the arrangement position of the dichroic mirror 20 is different from the microscope 1e of the above-mentioned third embodiment. The dichroic mirror 20 of the microscope 1f of Variant 1 of the third embodiment is disposed between the deflection mirror 17 and the relay lens 16, similar to the arrangement position of the dichroic mirror 20 in the microscope 1b of Variant 1 of the first embodiment.

Accordingly, in the microscope 1f of Variant 1 of the third embodiment, the phase modulation element 14 corrects the aberration caused in the illumination light IL by the specimen 24, but does not correct the aberration caused in the signal light DL by the specimen 24. However, in the microscope 1f, since the signal light DL enters the detector 29a or the wave surface sensor 33 without passing through the phase modulation element 14, the loss of the signal light DL due to the diffusion or reflectance characteristics of the phase modulation element 14 is small.

Microscope of Variant 2 of Third Embodiment

Hereinafter, a microscope 1g of Variant 2 of a third embodiment will be described with reference to FIG. 20. The configuration of the microscope 1g of Variant 2 of the third embodiment shares many configurations with the microscope 1f of Variant 1 of the third embodiment or the microscope 1a of the first embodiment. Hereinafter, the common configurations are designated by the same reference numerals, and description thereof will be omitted as appropriate.

The microscope 1g of Variant 1 of the third embodiment is distinguished from the microscope 1f of Variant 1 of the third embodiment in that the configuration of the light receiving optical system DTO of the microscope 1a of the above-mentioned first embodiment is also provided as the light receiving optical system DTO, in addition to the configuration of the light receiving optical system DTO of the microscope 1f of the Variant 1 of the above-mentioned third embodiment.

In the light receiving optical system DTO of the microscope 1g, the configuration of the light receiving optical system DTO of the microscope 1f of Variant 1 of the third embodiment is the detector 29a or the like that receives the signal light DL reflected by the dichroic mirror 20 disposed between the deflection mirror 17 and the relay lens 16. Another configuration of the light receiving optical system DTO of the microscope 1a of the first embodiment is a detector 29c or the like that receives the signal light DL reflected by the detachable dichroic mirror 20a disposed between the objective lens 21 and the second objective lens 19. Here, while the detector 29c is the same detector as the detector 29a in the microscope 1a of the first embodiment shown in FIG. 3, it is referred to as the detector 29c in order to avoid confusion with the other detector 29a in FIG. 20.

When the detachable dichroic mirror 20a is inserted between the objective lens 21 and the second objective lens 19, the signal light DL emitted front the specimen 24 is reflected by the detachable dichroic mirror 20a and is detected by the detector 29c. Then, the signal light DL is photo-electrically converted by the detector 29c, and sent to the controller 40 as a signal S1a2.

When the detachable dichroic mirror 20a is removed front the optical path of the signal light DL, the signal light DL emitted from the specimen 24 is reflected by the deflection mirror 17 and reflected by the dichroic mirror 20, and reaches the wave surface sensor 33 or the detector 29a. When the signal light DL is detected by the wave surface sensor 33, the wave surface sensor 33 sends the wave surface information (phase distribution) of the signal light DL to the controller 40 as the signal S1b. When the signal light DL is detected by the detector 29a, the detector 29a photo-electrically converts the signal light DL and transmits it to the controller 40 as the signal S1a1.

The phase distribution measuring unit 46 of the controller 40 measures the first phase distribution WF1 based on the signal S1b sent from the wave surface sensor 33. However, the phase distribution measuring unit 46 may measure the first phase distribution WF1 based on the signal S1a sent from the detector 29a or the signal S1a2 sent front the detector 29c.

The image generating unit 48 of the controller 40 forms an image of the specimen 24 based on the signal S1a sent from the detector 29a or the signal S1a2 sent from the detector 29c.

Observation Method of Sixth Embodiment

In the observation method of the sixth embodiment, when the above-mentioned observation position dependent aberration is expressed using the phase layer model, the phase distribution of the phase layers L is determined sequentially from the shallow position of the z position (position close to the objective lens 21) to the deep position.

The observation method of the sixth embodiment can be implemented using any of the microscopes 1a to 1g of each embodiment and each variant described above. The following steps of the observation method of the sixth embodiment may be the same as any of the steps described above in any of the observation methods of the embodiments described above. In addition, some of the flow may vary slightly depending on the device configuration of the microscopes 1a to 1g used.

Figure 21:
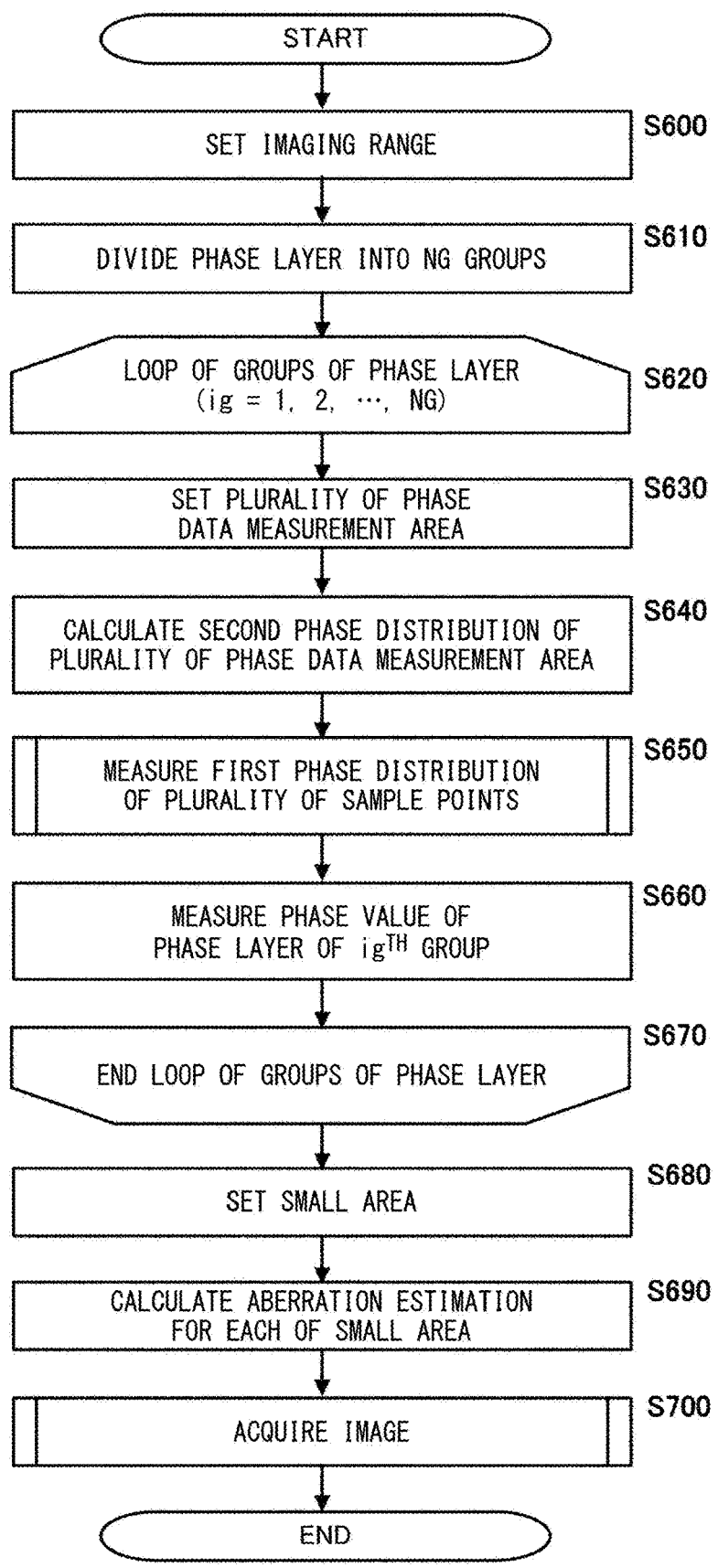
FIG. 21 is a view showing a flow of an observation method of a sixth embodiment.

FIG. 21 is a view showing a flow of the observation method of the sixth embodiment. The processing in step S600 is the same as in step S100 in the observation method of the first embodiment shown in FIG. 3. In the following step S610, the plurality of phase layers L are set. The number NL of the disposed phase layers L may be set according to the observation conditions so that the improvement effect is maximized when corrected by the second phase distribution WF2. The z position of each of the phase layers L is between the deepest z (z coordinates taking a negative maximum value) among the imaging range IR set in step S160 and z=0, for example, z positions may be placed at equal intervals, and alternatively, if the z-position where the specimen 24 has a structure with a large unevenness in the refractive index distribution, such as a bone or the like, is known in advance, it may be set to such z-position. For example, the set phase layers L are divided into NG (multiple) groups according to their z positions.

Figure 22:
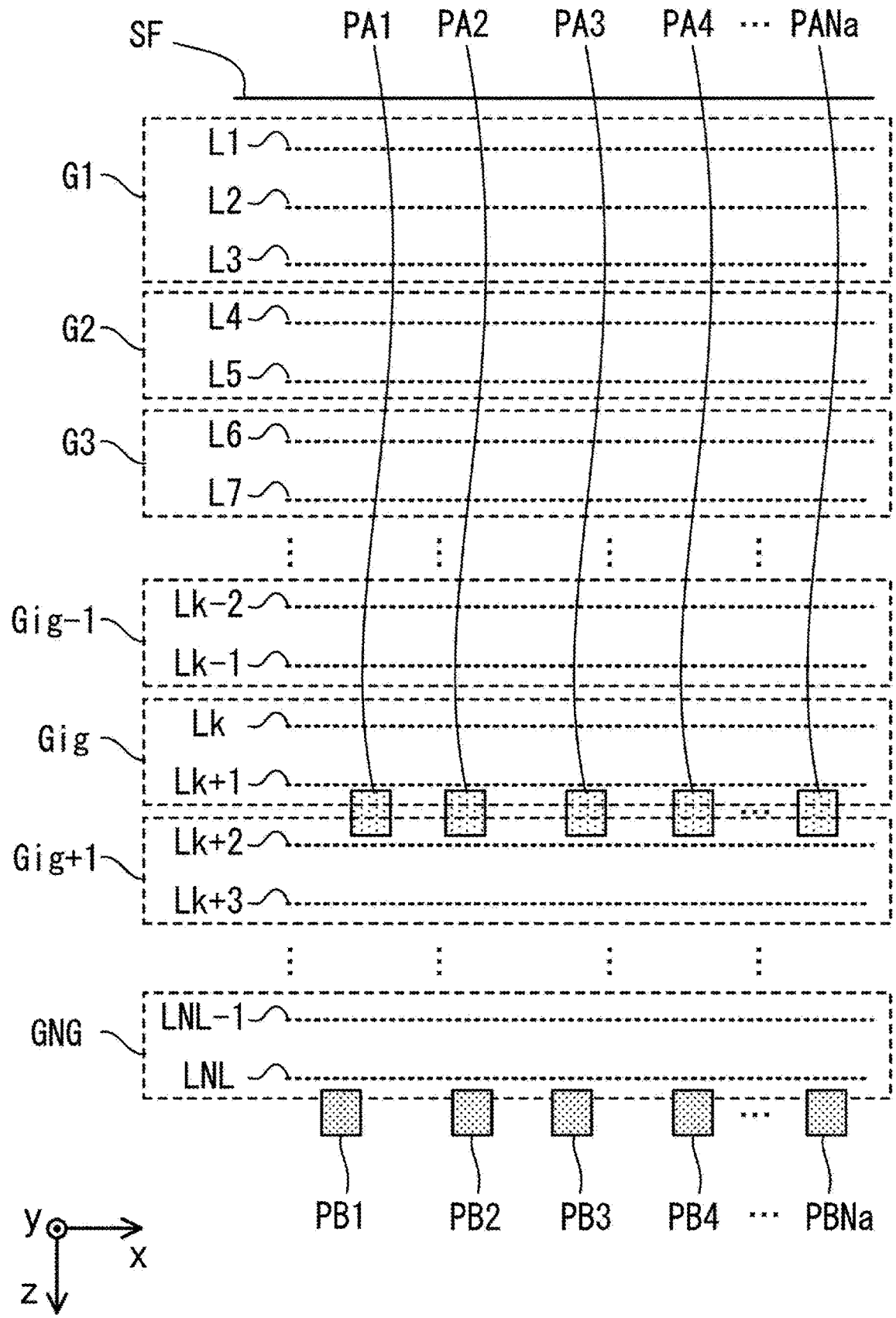
FIG. 22 is a view showing an example in which a plurality of phase layers are divided into a plurality of groups.

FIG. 22 is a view showing an example in a state in which the LNL phase layers L (L1 to LLN) shown in FIG. 9A is divided into NG groups G (G1 to GNG). In FIG. 22, while one of the groups G enclosed by a two-dot chain line is supposed to include two or three phase layers L, the number of the phase layers L included in each of the groups G may be an arbitrary number. In addition, each of the groups G may contain a different number of phase layers L.

Hereinafter, the number of the groups G is designated by a sign ig, and the $ig^{th}$ group G is designated by Gig with a subscript ig. Further, the plurality of phase layers L may be set at the same z position, and may belong to the different group Gig, respectively.

A loop for the group Gig of the phase layers L is started in step S620. The loop counter is ig, and the loop up to step S670 is repeated NG times from ig=1 to ig=NG.

In step S630, the position and the size of the Na phase data measurement areas PA (PA1 to PANa) shown in FIG. 12 are set. The size of one phase data measurement area may be set in advance, for example, or may be changed according to the current ig. The number Na of the measurement areas may be set, for example, according to the size of the imaging range IR set in step S100. It is desirable to set the center z coordinates of the plurality of phase data measurement areas PA to a position deeper than the z position of the phase layer Lk+1, which is the deepest position belonging to the group Gig. For example, it may be set between the z position of Lk+1 and the z position of the phase layers Lk+2 that is the shallowest position belonging to a $(ig+1)^{th}$ group Gig+1.

Alternatively, the center z coordinates of the plurality of phase data measurement areas PA may always be set to the same position during the loop for the group Gig. For example, in FIG. 22, it may be set to the z position deeper than the z position of the phase layer LNL that is the deepest position belonging to an $NG^{th}$ group GNG shown as phase data measurement areas PB (PB1 to PBNa).

In step S640, the second phase distribution WF2 at the center coordinates of the plurality of phase data measurement areas PA and PB set in step S630 is calculated. The phase distribution of the phase layers L, the phase value of which has already determined, belonging to the group G1 to the group Gig-1 can be calculated as the model parameters by performing the same processing as in step S180 or step S380 according to the device configuration of the microscopes 1a to 1g of the embodiments and variants.

Figure 23:
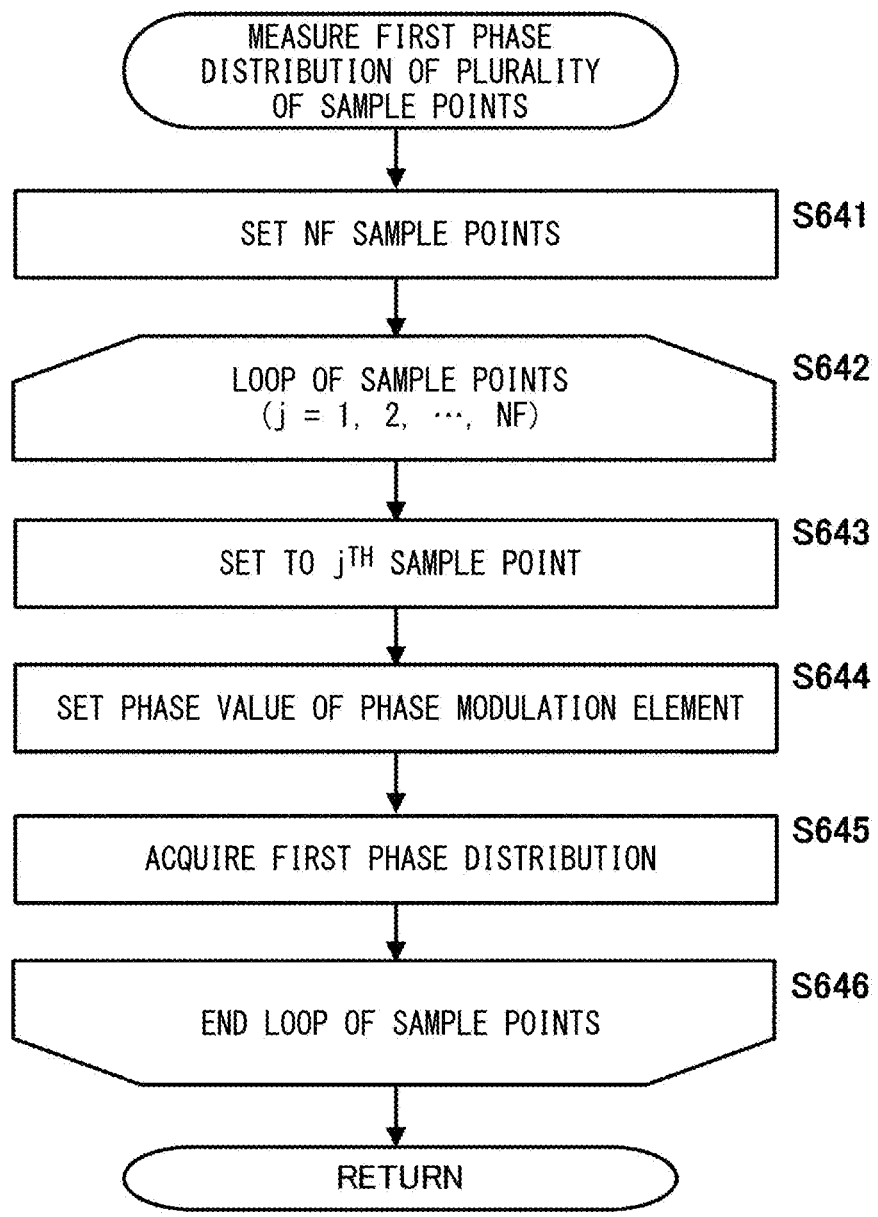
FIG. 23 is a view showing an example of a flow of measurement of a first phase distribution in an observation method of a sixth embodiment.

In step S650, the first phase distribution WF1 is measured at the plurality of (NF) sampling points F. In step S650, when the same observation as the observation method of the first embodiment, the second embodiment, the fourth embodiment, or the fifth embodiment is performed, a sub-flow shown in FIG. 23 is performed.

Figure 24:
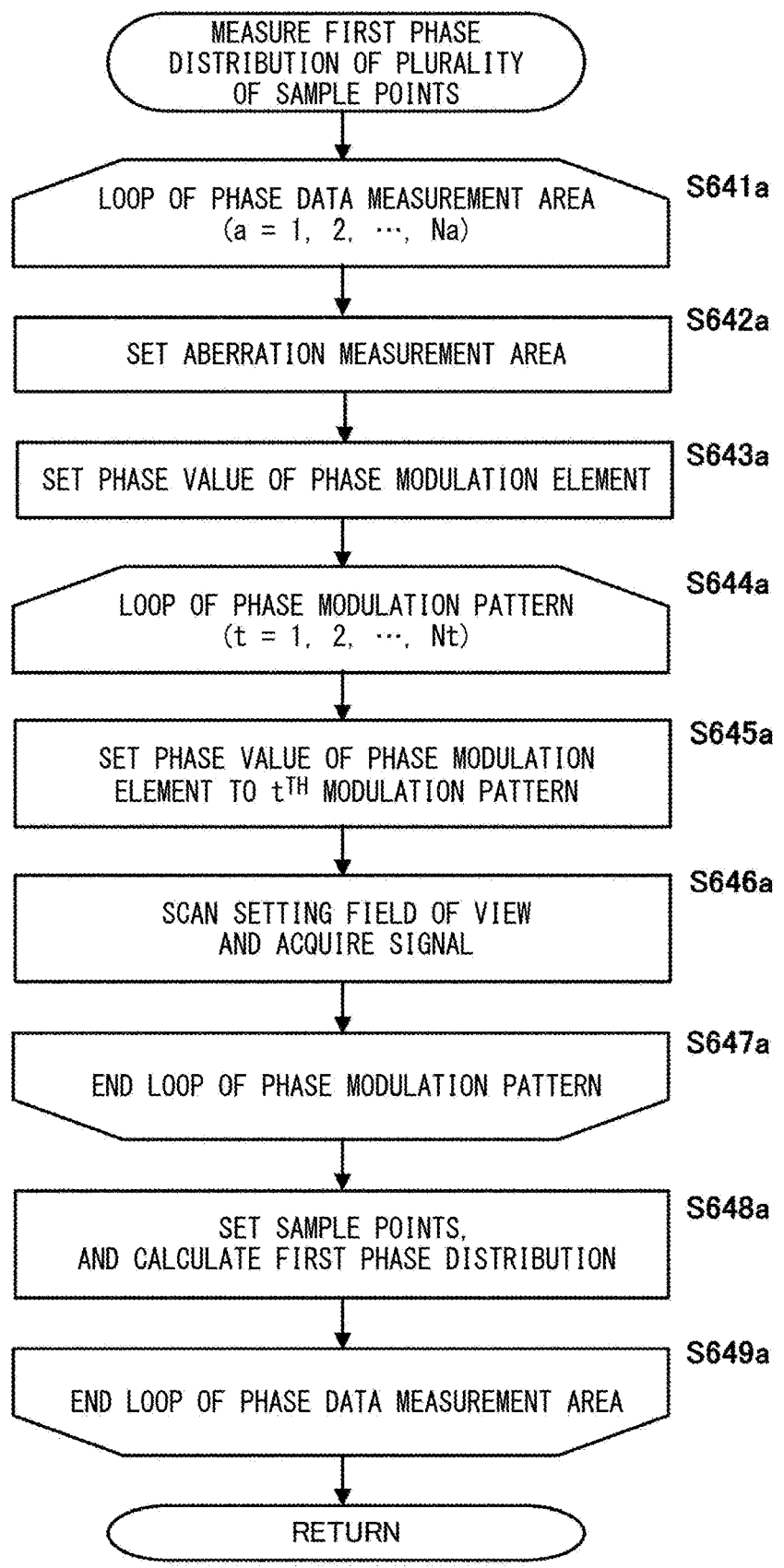
FIG. 24 is a view showing another example of a flow of measurement of a first phase distribution in the observation method of the sixth embodiment.

Meanwhile, when the same observation as the observation method of the third embodiment is performed, a sub-flow shown in FIG. 24 is performed.

In step 660, model parameters that expresses the phase distribution of the phase layers L is determined based on the first phase distribution WF1 measured in step S650. Then, the phase value of the phase layers L belonging to the $ig^{th}$ group Gig is calculated.

Figure 19:
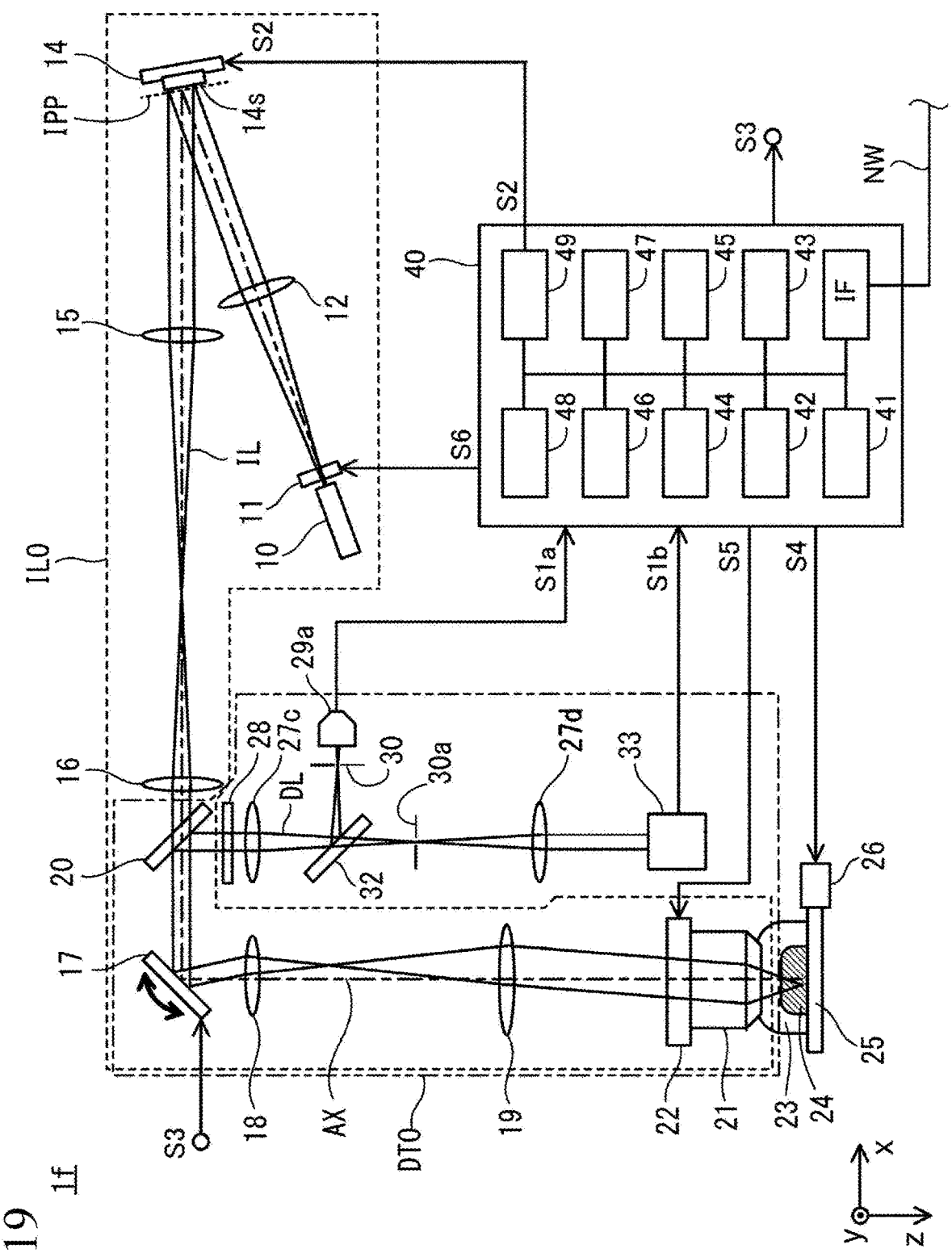
FIG. 19 is a view showing a configuration of a microscope of Variant 1 of the third embodiment.
Figure 20:
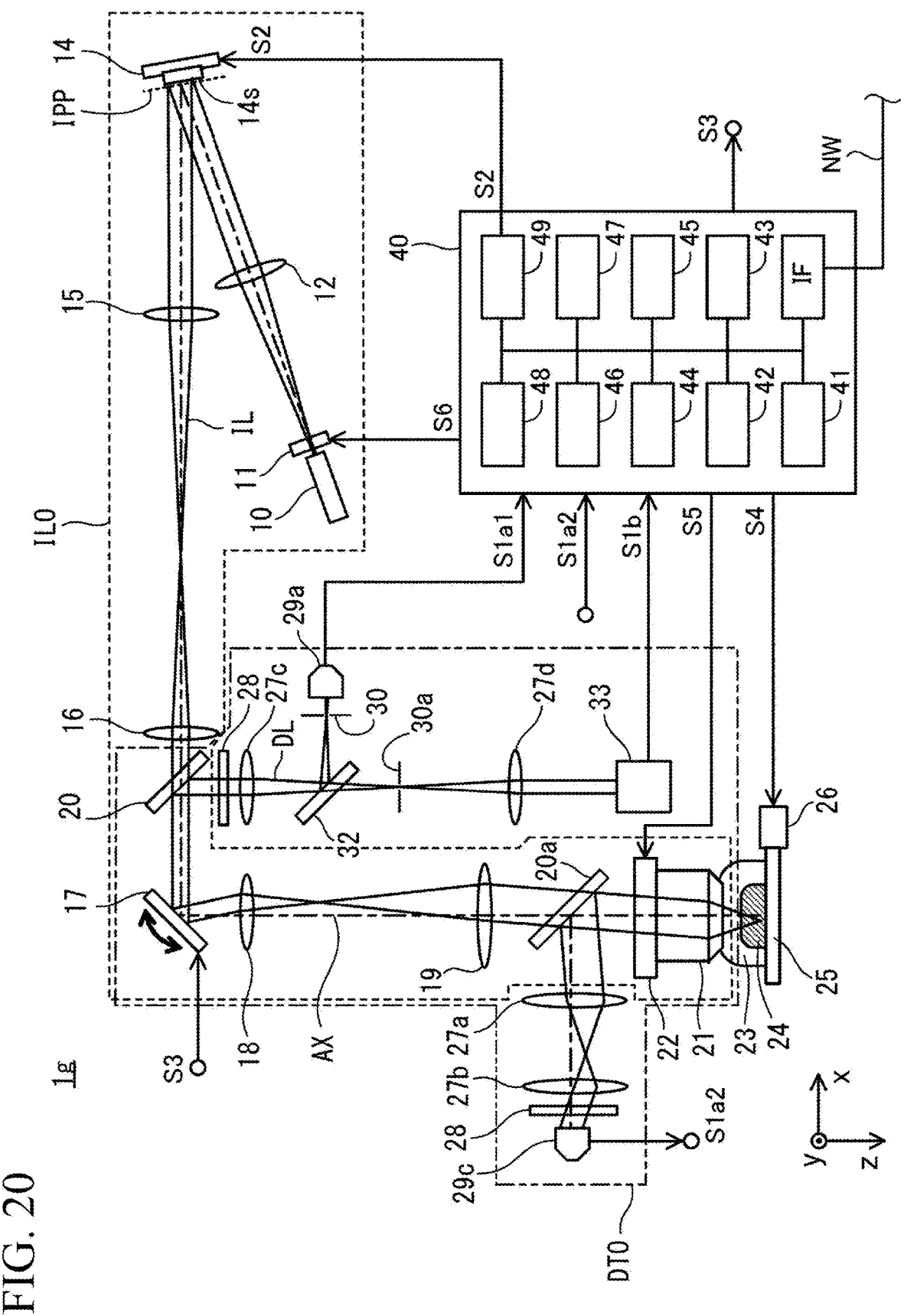
FIG. 20 is a view showing a configuration of a microscope of Variant 2 of the third embodiment.

In the case of the configuration of the microscopes 1a to 1e other than the microscope 1f of Variant 1 and the microscope 1g of Variant 2 of the above-mentioned third embodiment shown in FIG. 19 and FIG. 20, since the phase data was acquired after correcting the aberration calculated from the phase layers L belonging to the group G1 to the group Gig−1, the model parameters related to the phase layers L belonging to the group Gig are determined. Specifically, according to the configuration of the microscopes 1a to 1e, the same processing as the processing related to determination of the model parameters performed in step S180 or S380 in the observation method of the above-mentioned first embodiment to fifth embodiment may be performed.

Meanwhile, in the case of the configuration of the microscope 1f of Variant 1 and the microscope 1g of Variant 2 of the third embodiment shown in FIG. 19 and FIG. 20, the signal light DL detected by the wave surface sensor 33 is not corrected (addition of the phase) by the phase modulation element 14 of the aberration occurred in the signal light DL by the specimen 24. Here, when the microscopes 1f and 1g are used, the model parameters according to the phase layers L belonging to the group Gig from the group G1 is determined by performing the same calculation as the determination of the model parameters in step S180 in the observation method of the above-mentioned fifth embodiment.

Here, the model parameters of the phase layers L belonging to the group Gig−1 from the group G1 may be fixed at an already determined value, and only the phase distribution of the phase layers L belonging to the group Gig may be obtained.

In step S670, the loop (the ig loop) related to the groups G(of the phase layers L is terminated.

In step S6680, like step S170 of the observation method of the above-mentioned first embodiment, the small areas Rj' in the imaging range IR are set.

Then, in step S690, the second phase distribution WF2 at coordinates (xRj', yRj', zRj') of a 3-dimensional center position of each of the small areas Rj' is calculated using the determined phase distribution of the phase layers L belonging to the groups GNG from the groups G1. The calculation of the second phase distribution WF2 may be performed by the same method as either step S180 or step S380, which are described above, according to the configuration of the used microscopes 1a to 1g.

Next, in step S700, like step S190 in the observation method of the above-mentioned first embodiment or step S390 in the observation method of the third embodiment, the image of the specimen 24 in the imaging range IR is acquired.

Example of Measurement of First Phase Distribution in Step S650 of Observation Method of Sixth Embodiment Hereinafter, an example of a flow of measurement of the first phase distribution WF1 of the plurality of sampling points F in step S650 of the observation method of the sixth embodiment will be described with reference to FIG. 23.

First, in step S641, the sampling points F are set inside each of the plurality of phase data measurement areas PA set in step S630. The plurality of sampling points F may be set in one phase data measurement area PA, one sampling point F may be set, or no sampling point F may be set.

In the sampling points F, for example, the inside of the imaging range IR of the specimen 24 may be scanned to acquire the signal light DL emitted from the specimen 24, and a plurality of points with high intensity of the signal light DL may be set.

In step S642, a loop related to the sampling points F is started. Then, for processing up to step S646, which will be described later, a loop is repeated FN times from j=1 to j=NF for subscript j of the sampling point Fj.

In step S643, the controller 40 operates the microscope 1a such that the illumination light IL is focused to the sampling point Fj. The specific operation method is the same as the operation in step S130 in the first observation method described above.

In step S644, the second phase distribution WF2 calculated in step S640 for the phase data measurement area PA to which the sampling point Fj belongs is set to the phase modulation element 14.

In step S645, according to the device configuration of the used microscopes 1a to 1g, the first phase distribution WF1 is measured by performing the above-mentioned processing in step S140. The measured first phase distribution WF1 is associated with the coordinates of the sampling points F and stored in the storage 42.

In step S646, the loop related to the sampling points F is terminated.

Another Example of Measurement of First Phase Distribution in Step S650 of Observation Method of Sixth Embodiment Hereinabove, another example of a flow of measurement of the first phase distribution WF1 of the plurality of sampling points F in step S650 of the observation method of the sixth embodiment will be described with reference to FIG. 24.

First, in step S641a, a loop is started for the plurality of the phase data measurement areas PAa set in step S630. Then, regarding processing up to step S648a, which will be described later, a loop from a=1 to a=Na is repeated Na times for subscript a of the phase data measurement areas PAa.

In step S642a, it is set to the $a^{th}$ phase data measurement area PAa. That is, a position of the focusing point FP is set to a position of the $a^{th}$ phase data measurement area PAa in the specimen 24.

In the subsequent step S643a, the second phase distribution WF2 calculated in step S640 for the $a^{th}$ phase data measurement area PAa is set to the phase modulation element 14.

In the subsequent step S644a, a loop is started for the phase modulation pattern added by the phase modulation element 14 to the illumination light IL or the signal light DL. The loop counter is set as t, and the loop up to step S646a is repeated Nt times from t=1 to t=Nt.

In step S645a, the phase modulation pattern that becomes a sum of the same $t^{th}$ phase modulation pattern as in step S340 in the observation method of the third embodiment and the phase modulation pattern of the second phase distribution WF2 set in step S643a is set to the phase value of the phase modulation element 14.

Then, in step S646a, the $a^{th}$ phase data measurement area PAa is scanned to acquire a signal. That is, the controller 40 relatively moves the focusing point FP in the $a^{th}$ phase data measurement area PAa of the specimen 24 to acquire the signal S1 obtained by photo-electrically converting the signal light DL, and stores the signal in the storage 42. Further, the phase modulation pattern of the phase modulation element 14 may be changed to the phase modulation pattern that is the sum of the plurality of second phase distributions and the $t^{th}$ phase modulation pattern calculated for each scan position in advance, in synchronization with the scanning of the specimen.

In step S647a, the loop for the phase modulation patterns is terminated.

In step S648a, the plurality of sampling points F for calculating the first phase distribution WF1 is determined like in step S350 described above, and the first phase distribution WF1 at each of the sampling points F is calculated based on the $t^{th}$ phase modulation pattern set in step S646a at each t from t=1 to Nt, and Nt signals obtained in step S646a. Then, the controller 40 associates the calculated first phase distribution WF1 at each of the sampling points F with the coordinates of each of the sampling points F and stores them in the storage 42.

In step S649a, the loop for the phase data measurement areas PA is terminated.

The determined total number of the sampling points F is set as NF, and it proceeds to the next processing after the main flow, i.e., step S660 of the flow in FIG. 21.

In general, in the deep portion of the specimen 24, since deterioration of imaging performance due to the aberration caused by the specimen 24 is increased, the detailed structure of the specimen 24 cannot be observed, the appropriate sampling points F for measuring the first phase distribution WF1 cannot be selected, and the measurement error of the first phase distribution WF1 may increase.

In the observation method of the sixth embodiment, for each loop of the group ig of the phase layers L, the imaging performance can be improved when the second phase distribution WF2 is set, and the measurement accuracy of the first phase distribution WF1 can be improved. In addition, the first phase distribution WF1 at the sampling points F in the shallow area of the specimen 24 is measured, and the phase distribution of the phase layers L virtually disposed at the shallow z position of the specimen 24 is determined. Then, during measurement of the first phase distribution WF1 at the sampling point F located at a deep position of the specimen 24, the imaging performance can be improved by correcting the aberration induced by the specimen 24 to the depth in the middle of the specimen 24, and the sampling points F can be selected as appropriate, and measurement accuracy of the first phase distribution WF1 can also be improved.

In the microscopes 1a to 1g of the embodiments and variants described above, a method of measuring the first phase distribution WF1 is not limited to the above-mentioned method. For example, the phase distributions on the pupil surfaces IPP and DPP of the illumination light IL or the signal light DL measured by the method disclosed in the documents described below can be used as the first phase distribution WF1.

WO2011/006106 (corresponding to Japanese Unexamined Patent Application, First Publication No. 2015-092253) is provided as an example of the documents. "Adaptive wave front correction in two-photon microscopy using coherence-gated wave front sensing PNAS", 103 (46) 17137-17142 (2006) is provided as another example. In addition, "Scattering compensation by focus scanning holographic aberration probing (F-SHARP)", Nature Photonics, 11, 116-123 (2017) is provided as another example.

In addition, "Adaptive optics via self-interference digital holography for non-scanning three dimensional imaging in biological samples", Biomedical Optics EXPRESS. Vol. 9. No. 6 (2018) is provided as still another example of the documents.

Further, the plurality of light sources may be used as the light source 10 used in the microscopes 1a to 1g of the embodiments and the variants, and illumination light emitted from different light sources may be used during measurement of the first phase distribution WF1 and during acquisition of an image of the specimen 24.

In the microscopes 1a to 1g of the embodiments and the variants, the signal light DL emitted from the specimen 24 does not necessarily need to be detected after passing through the same objective lens 21 as the illumination light IL.

For example, the signal light DL may be detected through another objective lens for detection rotated by an arbitrary angle with respect to an illumination objective lens that irradiates the illumination light IL.

In addition, as the signal S1, the intensity of the probe light irradiated to the specimen 24 may be detected separately from the illumination light IL passing through the phase modulation element 14. In this case, the first phase distribution WF1 can be measured based on the change in detection intensity of the probe light.

In addition, the signal to be detected is not limited to the signal light DL, but may be, for example, an acoustic signal generated by a photo-acoustic effect when the specimen 24 is irradiated with the illumination light IL. In this case, the signal S1 is, for example, a sonic wave detected by a sonic wave transducer and transformed into an electric signal.

A representation model of observation position dependent aberration in the microscopes 1a to 1g of the embodiments and the variants and the observation methods of the embodiments are not limited to the above-mentioned phase layer model. For example, the observation position dependent aberration may be expressed using a basis function system whose arguments are the coordinates of both the pupil surface and the image surface disclosed in document "Orthogonal Aberration Functions for Micro-lithographic Optics", (OPTICAL REVIEW Vol. 11 No. 4 (2004) 199-207). In addition, a model that considers light diffraction with the refractive index distribution of the specimen as model parameters may be used.

The second phase distribution WF2 calculated in each of the above-mentioned embodiments may be used in aberration correction of one or both the illumination light IL to the specimen 24 and the signal light DL from the specimen 24 in a known super-resolution microscope method such as a localization microscopy (PALM, STORM), a structured illumination microscopy (SIM), an image scanning microscopy (ISM), a stimulated emission depletion microscopy (STED), a saturated excitation microscopy (SAX), or the like, or a known fluorescence lifetime imaging microscopy (FLIM).

The second phase distribution WF2 calculated in each of the above-mentioned embodiment may be used for purposes other than correction of aberration caused by the specimen 24 when imaging the specimen 24. For example, it may be used for aberration correction with respect to stimulation light when photic stimulation into the specimen 24 is performed. In addition, PSF in a plurality of observation areas may be calculated using the second phase distribution WF2, and may be used in deconvolution processing with respect to the acquired image without correcting the aberration caused by the specimen 24. In addition, only some of the aberration components in the second phase distribution WF2 may be corrected by the phase modulation element 14 to acquire the image, and deconvolution processing using the PSF calculated based on the remaining aberration component may be performed with respect to the acquired image.

Effects of Microscope of Each Embodiment and Each Variant (1) Each of the microscopes 1a to 1g of the above-mentioned embodiments and variants includes the light transmitting optical system ILO configured to irradiate the specimen 24 with the illumination light IL from the light source 10, the light receiving optical system DTO configured to receive the signal light DL emitted from the specimen 24, and the phase modulation element 14 provided in at least one of the light transmitting optical system ILO and the light receiving optical system DTO and configured to add a predetermined phase distribution to the illumination light IL or the signal light DL. Then, the phase distribution measuring unit 46 configured to measure the first phase distribution WF1 corresponding to the aberration induced by the specimen 24 at each of the plurality of sampling points F in the sampling points F of the specimen 24 is provided. Further, the phase distribution calculation unit 47 configured to create the phase data model showing a phase change amount received when the illumination light IL or the signal light DL passes through a predetermined position in the specimen 24 based on the first phase distribution WF1 with respect to each of the plurality of measured sampling points F and configured to calculate the second phase distribution WF2 to be added to at least one of the illumination light IL and the signal light DL by the phase modulation element 14 in order to detect at least one of the detection points U of the specimen 24 based on phase data model in a state in which the aberration induced by the specimen 24 is reduced is provided. Then, the phase distribution setting unit 49 configured to set the second phase distribution WF2 to the phase modulation element 14 is provided.

According to this configuration, it is possible to reduce time required for measurement of the first phase distribution WF1 and calculation of the second phase distribution WF2 in order to correct the aberration caused by the specimen 24, and reduce observation time of the specimen 24. In addition, the measurement time of the first phase distribution WF1 corresponding to the aberration induced by the specimen 24 can be reduced, discoloration of the specimen 24 can be reduced, and phototoxicity provided to the specimen 24 can be reduced. Accordingly, the specimen 24 can be more accurately observed.

Effects of Observation Method of Each Embodiment and Each Variant (2) The observation method of each of the above-mentioned embodiments and variants includes irradiating the specimen 24 with the illumination light IL from the light source 10, detecting the signal light DL emitted from the specimen 24, and observing the specimen 24, the observation method including measuring the first phase distribution WF1 corresponding to the aberration induced by the specimen 24 at each of the plurality of sampling points F of the specimen 24. Then, the method includes creating a phase data model showing a phase change amount received when the illumination light IL or the signal light DL passes through a predetermined position in the specimen 24 based on the first phase distribution WF1 with respect to each of the plurality of measured sampling points F, and calculating the second phase distribution WF2 to be added to at least one of the illumination light IL and the signal light DL in order to detect at least one of the detection points U of the specimen 24 in a state in which aberration induced by the specimen 24 is reduced based on the phase data model. Further, the method includes detecting the detection points U by adding the second phase distribution WF2 to at least one of the illumination light IL and the signal light DL.

According to this configuration, time required for measurement of the first phase distribution WF1 to correct aberration caused by the specimen 24 and time required for calculation of the second phase distribution WF2 can be reduced, and observation time of the specimen 24 can be reduced. In addition, since the measurement time of the first phase distribution WF1 corresponding to the aberration induced by the specimen 24 can be reduced, discoloration of the specimen 24 can be reduced, and phototoxicity applied to the specimen 24 can be reduced. Accordingly, the specimen 24 can be more accurately observed.

Embodiment of Program

A program of the embodiment is stored in the storage 42 of the controller 40 and executed by the calculating device 41, as described in the descriptions of the microscopes 1a to 1g of each embodiment and each variant, and thus, controls the microscopes 1a to 1g through parts of the controller 40.

The program causes the microscopes 1a to 1g to perform predetermined operations via the calculating device 41 according to each flow described in the observation method of each embodiment mentioned above.

As an example, the program causes the phase distribution measuring unit 46 to measure the first phase distribution WF1 and the phase distribution calculation unit 47 to calculate the second phase distribution WF2 through the calculating device 41. Then, the program causes the phase modulation element 14 to set the second phase distribution WF2 through the calculating device 41 and the phase distribution setting unit 49.

The program for realizing the above functions is recorded on a computer-readable recording medium, and the program recorded on this recording medium may be read from the optical drive 43 or the like to the controller 40 as a computer system and executed.

Further, the "computer system" disclosed herein includes an operating system (OS) or hardware of peripheral equipment. In addition, "the computer-readable recording medium" means a portable recording medium such as a flexible disk, a magneto-optic disk, an optical disk, a memory card, or the like, and a storage device such as hard disk built in the computer system.

Further, "the computer-readable recording medium" may include a medium configured to dynamically hold a program for a short time such as a communication wire when the program is transmitted via a network such as the Internet or the like, or a communication line such as a telephone line or the like, or a medium configured to hold a program for a certain time such as a volatile memory in a computer system that is a server or a client in this case. In addition, the above-mentioned program may be provided to realize a pan of each function mentioned above, or may be further provided to realize each function mentioned above by combining with the program already recorded in the computer system.

In addition, the above-mentioned program can be provided through data signals of the Internet or the like. For example, the controller 40 including the calculating device 41 and the storage 42 shown in each drawing such as FIG. 1 or the like has a connecting function (the interface part IF) to the network line NW. An external server (not shown) connected to the network functions as a server computer that provides the above-mentioned program, and transmits the program to the recording medium such as the storage 42 or the like. That is, the program is carried by carrier waves as a data signal and transmitted via a network cable NW. In this way, the program can be supplied as computer-readable computer program products in various forms such as a recording medium, carrier waves, or the like.

Although various embodiments and variants have been described above, the present invention is not limited to these contents. In addition, each embodiment and variant may be applied alone or in combination. Other aspects conceivable within the range of the technical spirit of the present invention are also included within the range of the present invention. In addition, to the extent permitted by law, the disclosures of the various technical documents, and patent documents cited herein are incorporated herein by reference.

What is claimed is:

1. A microscope comprising:
   a light transmitting optical system configured to irradiate a specimen with illumination light from a light source;
   a light receiving optical system configured to receive signal light emitted from the specimen;
   a phase modulation element that is provided in at least one of the light transmitting optical system and the light receiving optical system and that is configured to add a predetermined phase distribution to the illumination light or the signal light;
   a phase distribution measuring unit configured to measure a first phase distribution, which corresponds to specimen-induced aberration at a sampling point of the specimen, at each of a plurality of the sampling points;
   a phase distribution calculation unit
   (i) that is configured to create, based on the first phase distributions measured at the plurality of sampling points, a phase data model showing an amount of phase change which the illumination light or the signal light receives when the illumination light or the signal light passes through a predetermined position in the specimen, and
   (ii) that is configured to calculate, based on the phase data model, a second phase distribution which is added to at least one of the illumination light and the signal light by the phase modulation element in order to detect at least one detection point of the specimen in a state in which specimen-induced aberration is reduced; and
   a phase distribution setting unit configured to set the second phase distribution to the phase modulation element, wherein:
   the phase distribution measuring unit is configured to sequentially provide a plurality of phase modulation patterns to the phase modulation element;
   the illumination light is irradiated by the light transmitting optical system at least to the sampling point, which is a measurement target of the first phase distribution, every time the phase modulation pattern is provided; and
   the first phase distribution at each of the plurality of the sampling points is calculated based on the signal light which the light receiving optical system receives.

2. The microscope according to claim 1, wherein an amount of information with respect to the second phase distribution applied to one of the detection points is greater than an amount of information with respect to the first phase distribution measured at one of the sampling points.

3. The microscope according to claim 1, wherein the phase distribution measuring unit measures the first phase distribution at least for each of the plurality of sampling points which are separated in an in-plane direction of a first surface that intersects a first direction in which the illumination light is irradiated to the specimen.

4. The microscope according to claim 1, wherein the phase modulation element does not change a phase of partial areas of the illumination light or the signal light while measuring the first phase distribution.

5. The microscope according to claim 1, wherein the second phase distribution is set to the phase modulation element, and measurement of the first phase distribution is performed at the plurality of sampling points.

6. The microscope according to claim 1, wherein the phase modulation element is provided in the light transmitting optical system,
   the light transmitting optical system focuses the illumination light and irradiates the specimen, and includes a scanning unit configured to scan a focusing point of the illumination light relative to the specimen.

7. The microscope according to claim 6, wherein, while measuring the first phase distribution, a change of a phase distribution added to the illumination light or the signal light by the phase modulation element and the scanning of a predetermined area of the specimen are alternately performed, and selection of the sampling point is performed from the predetermined area.

8. The microscope according to claim 6, wherein the phase distribution setting unit sets the second phase distribution to the phase modulation element in synchronization with the scanning.

9. An observation method of irradiating a specimen with illumination light from a light source, detecting a signal light emitted from the specimen, and observing the specimen, the method comprising:
   measuring a first phase distribution, which corresponds to specimen-induced aberration, at each of a plurality of sampling points of the specimen;
   creating, based on the first phase distributions measured at the plurality of sampling points, a phase data model showing an amount of phase change which the illumination light or the signal light receives when the illumination light or the signal light passes through a predetermined position in the specimen;
   calculating, based on the phase data model, a second phase distribution which is added to at least one of the illumination light and the signal light in order to detect at least one detection point of the specimen in a state in which specimen-induced aberration is reduced; and
   detecting the detection point by adding the second phase distribution to at least one of the illumination light and the signal light, wherein:
   the method further comprises sequentially providing a plurality of phase modulation patterns;
   the illumination light is irradiated at least to the sampling point, which is a measurement target of the first phase distribution, every time the phase modulation pattern is provided; and
   the first phase distribution at each of the plurality of the sampling points is calculated based on the received signal light.

10. The observation method according to claim 9, wherein amount of information with respect to the second phase distribution applied to one of the detection points is greater than amount of information with respect to the first phase distribution measured at one of the sampling points.

11. The observation method according to claim 9, wherein, when measuring the first phase distribution, the first phase distribution is measured at least for each of the plurality of sampling points which are separated in an in-plane direction of a first surface that intersects a first direction in which the illumination light is irradiated to the specimen.

12. The observation method according to claim 9, wherein a phase of some areas of the illumination light or the signal light is not changed while measuring the first phase distribution.

13. The observation method according to claim 9, wherein both the first phase distribution and the second phase distribution are added to the illumination light, and the illumination light is focused and is irradiated to the specimen, and a focusing point where the illumination light is focused and the specimen are relatively scanned.

14. The observation method according to claim 9, wherein the second phase distribution is added to at least one of the illumination light and the signal light and measurement of the first phase distribution at the plurality of sampling points is performed.

15. A non-transitory computer-readable medium storing a program that controls at least a part of a microscope system configured to observe a specimen, the program causing a processing device including a computer to execute:

reading position information of a plurality of sampling points of the specimen and information related to a first phase distribution corresponding to aberration signal light occurring in illumination light or signal light emitted from the specimen at each of the sampling points;

causing the processing device to create, based on the position information of the plurality of sampling points and the information related to the first phase distribution of the plurality of sampling points, a phase data model showing a phase change amount which the illumination light or the signal light receives when the illumination light or the signal light passes through a predetermined position in the specimen; and calculating, based on the phase data model, a second phase distribution which is added to at least one of the illumination light and the signal light in order to detect at least one detection point of the specimen in a state in which specimen-induced aberration is reduced, wherein:

the program further causes the processing device to sequentially provide a plurality of phase modulation patterns;

the illumination light is irradiated at least to the sampling point, which is a measurement target of the first phase distribution, every time the phase modulation pattern is provided; and the first phase distribution at each of the plurality of the sampling points is calculated based on the received signal light.

* * * * *